United States Patent [19]
Peters et al.

[11] Patent Number: 5,893,098
[45] Date of Patent: Apr. 6, 1999

[54] SYSTEM AND METHOD FOR OBTAINING AND COLLATING SURVEY INFORMATION FROM A PLURALITY OF COMPUTER USERS

[75] Inventors: Graham Peters; Peter Barwell, both of St Leonards, Australia

[73] Assignee: Dolphin Software Pty Ltd, St. Leonards, Australia

[21] Appl. No.: 772,311

[22] Filed: Dec. 20, 1996

[30] Foreign Application Priority Data

Sep. 14, 1994 [AU] Australia ................................. PM8133

[51] Int. Cl.$^6$ ..................................................... G06F 17/30
[52] U.S. Cl. ........................... 707/10; 707/3; 395/200.03; 395/800; 705/26; 705/27; 705/10; 711/117; 711/146; 711/147; 384/1
[58] Field of Search .............................. 395/210, 200.03, 395/800; 707/10, 3; 705/26, 27, 10; 711/117, 146, 147

[56] References Cited

U.S. PATENT DOCUMENTS

| | | | |
|---|---|---|---|
| 4,355,372 | 10/1982 | Johnson et al. | 364/900 |
| 4,958,284 | 9/1990 | Bishop et al. | 364/419 |
| 5,075,771 | 12/1991 | Hashimoto | 358/84 |
| 5,097,408 | 3/1992 | Huber | 4/707 |
| 5,261,094 | 11/1993 | Everson et al. | 201/707 |

FOREIGN PATENT DOCUMENTS

| | | |
|---|---|---|
| 336586 | 10/1989 | European Pat. Off. . |
| WO 94/03861 | 2/1994 | WIPO . |

OTHER PUBLICATIONS

Gates et al, "Development of customer survey instruments for reliability worth evaluation in electric power systems", IEEE, Jan. 1995.

Graphics, Visualisation, and Usability Centre, "HTML Information Survey Form" (James Pitkow) Georgia Institute of Technology Jan. 1994.

The GVU Centre's WWW Users Survey, "Results from the first World–Wide Web User Survey" (James Pitkow, Margaret Recker), May 25, 1994.

"Using the Web as a survey tool: Results from the second WWW User Survey" (James Pitkow, Margaret Recker), Oct. 1994.

"Simple connection changes business" (Lynn Haber) Midrange Systems, v6, n20, p. 44(1), Oct. 26, 1993.

*Primary Examiner*—Thomas G. Black
*Assistant Examiner*—Jean M. Corrielus
*Attorney, Agent, or Firm*—Davis and Bujold

[57] ABSTRACT

A system for obtaining information from a plurality of computer users (7 to 12), comprising a processing apparatus (2) including an input mechanism (3 and 4) via which a survey author may input data, and a survey authoring mechanism (FIG. 2) enabling construction of a survey questionnaire document including at least one question formulated from data input by the survey author, transmission mechanism (6) for transmitting the survey questionnaire document to a plurality of respondent users (7 to 12); and a processing apparatus (2) including a collating mechanism arranged to receive transmissions from the transmission mechanism, to identify response documents which include responses to the at least one question from the plurality of respondent users and to load a database in accordance with the responses.

56 Claims, 23 Drawing Sheets

SURVEY

WHICH OF THE FOLLOWING OPTIONS BEST DESCRIBES YOUR VEHICLE?

NUMBER OF CYLINDERS

```
        4   6   8   12
       [ ] [ ] [ ] [ ]
SEDAN
       [ ] [ ] [ ] [ ]
COUPE
       [ ] [ ] [ ] [ ]
STATION WAGON
       [ ] [ ] [ ] [ ]
CONVERTABLE
```

[PREVIOUS]   [NEXT]

FIG. 6

LEAVE

WILL YOU BE TAKING LEAVE FROM WORK BETWEEN 1 MAY 94 AND 1 JULY 94 ?

○ YES I WILL BE TAKING LEAVE DURING THIS PERIOD

○ NO I WILL NOT BE TAKING LEAVE DURING THIS PERIOD

○ I AM NOT SURE AT THIS TIME

<<< PREVIOUS        NEXT >>>

FINISH

THAT CONCLUDES THIS SURVEY
THANKYOU FOR COMPLETING IT.

THIS SURVEY RESPONSE WILL BE AUTOMATICALLY 'E-MAILED' BACK TO
THE SURVEY ORIGINATOR.

PLEASE PRESS THE FINISH BUTTON BELOW - THANKYOU

<<< FINISH >>>

FIG. 11b

SYSTEM AND METHOD FOR OBTAINING AND COLLATING SURVEY INFORMATION FROM A PLURALITY OF COMPUTER USERS

This application is a divisional of copending application Ser. No. PCT/AU95/00615 filed on Sep. 14, 1995.

FIELD OF THE INVENTION

The present invention relates to a system and method for obtaining and collating information from a plurality of computer users. More particularly, but not exclusively, the invention relates to a method and system for asking questions of computer users having access to electronic mail, and to a method and system for collating their responses and presenting them in a database.

BACKGROUND OF THE INVENTION

In recent years, developments in communication systems and computer technology have enabled communication between computers over vast distances utilising communications networks. Employing electronic mail, it is possible for a user of a personal computer (or any other type of computer) with access to a modem or other network communications interface, to communicate with any number of users of remote computers e.g., via the internet. Distance is no barrier. Further, in small or large companies electronic mail networks are often used to connect user terminals to enable communication in-house between users.

The possibility of communication with any number of users having access to electronic mail opens up vast information gathering potential.

To obtain and process such large amounts of information, however, presents a number of problems. Using electronic mail for a user of a computer may ask a question or questions of a relatively large number of remote users, by addressing mail including a question or questions to those users.

The task of processing responses to the question or questions becomes extremely difficult. Where a large number of users provide responses, the task can be almost impossible. This difficultly will be aggravated where a large number of questions are asked. The amount of information to process can be staggering and the user who asked the questions may be faced with the onerous task of sorting through a large amount of mail, item by item, to extract and collate the information he requires. Where a large amount of information is required from a large number of people, it is impractical for one person to deal with.

Consider the example of opinion polls, whether for marketing, political or other purposes. Presently, large numbers of field operators are required to gather numerous responses from members of the public. Once those responses have been gathered, hundreds and even thousands of man-hours are required to process the responses to extract the required information and present it in a form which allows for analysis. Thousands of questionaries may need processing, each with many Questions and responses. It should also be noted that the time taken to gather and process the responses can mean that the information finally revealed from the opinion poll has lost it's relevance or at least become less relevant. Consider a political opinion poll, where peoples opinions may be varying from day to day, significantly enough to affect the election result. An opinion poll which takes two or three days to process will be out of date and irrelevant by the time the results are available for publication.

There are really two major problems with presently available "surveying". Firstly, there is the problem of how does a person ask the questions of all the people he wishes to ask the questions of, without expending many man hours or employing a number of people as field operators? This problem is somewhat alleviated by the existence of systems such as electronic mail, which enable a person to select a number of people to send a single document to. There is the problem here, however, that no convenient means exists of asking a series of complex, linked questions. For example, a persons answer to a particular question may determine whether or not a subsequent question is relevant to that person. If the person is asked whether they are taking leave from employment that year to go on holiday, and answer no, there is no point in asking them where they are going on holiday. Electronic mail communication systems do not deal with that problem.

Even though electronic mail may be used to somewhat alleviate the problem of getting a question to a number of people, such systems do nothing to alleviate the problems associated with processing the answers. There is no alternative but for the person asking the question to sort through return mail item by item to, first of all, identify which mail is in response to his questions, and, then, to collate and process the responses to enable a meaningful analysis.

These problems are not limited to large surveys, such as political opinion polls. Even quite small surveys can present problems of time management. For example, imagine if a director of a company with fifty or so employees wishes to plan staff leave for the year. He has to ask all his employees when they would like to take leave. He may also wish to know where they want to go. He can do this by sending out a memo and awaiting the results, or perhaps even sending out a memo on intra office computer mail and awaiting the results. He still has to process all the results. Processing results, analysing them and planning the leave even of only fifty people can be quite time consuming, particularly for a person with many other responsibilities who does not really have the time to spend on such a task. Further, the managing director may wish to ask many different types of questions of his staff on a on-going day-to-day basis. His only option for processing the responses is to do it himself, item by item, or, if he has not got time (as is usually the case) to employ somebody to do it.

SUMMARY OF THE INVENTION

In a preferred embodiment, the present invention advantageously provides a way of asking a question of any number of users, preferably via electronic mail or an equivalent communications media, and automatically receiving, identifying and processing responses to the question.

From a first aspect, the present invention provides A system for obtaining information from a plurality of computer users:

comprising a processing apparatus including an input means via which a survey author may input data, and a survey authoring means enabling construction of a survey questionnaire document including at least one question formulated from data input by the survey author;

transmission means for transmitting the survey questionnaire document to a plurality of respondent users; and a processing apparatus including a collating means arranged to receive transmissions from the transmission means, to identify response documents which include responses to the at least one question from the plurality of respondent users and to load a database in accordance with the responses.

A "survey author" is any person who wishes to use the survey document authoring means to construct a survey questionnaire document.

The transmission means is preferably electronic mail. Please note that the terminology electronic mail is not only used in a narrow sense, but used in a more general sense, to mean any way of communicating between computer users utilising telecommunications media (telephone, optical fibre, satellite, etc.) which enables a user or group of users or a location e.g., a "relative" location such as a "bulletin board" to be designated by an address, preferably a unique address. The transmission means may even include transmission of floppy disks including the response document, by ordinary mail, although this is not preferable.

Where electronic mail is employed, the collator means is preferably arranged to monitor all electronic mail being received by the processing apparatus in which the collator means is included, to sort the electronic mail to identify response documents. Electronic mail not including a response document is not processed any further by the collation means. Where a response document is identified, further processing takes place. Preferably, the further processing includes locating the database which is to receive the responses to the survey document, and loading the database in accordance with the responses.

In at least preferred embodiments, the apparatus and method of the present invention advantageously enables the user of a processing apparatus such as a computer to prepare a survey document asking for information on any subject he desires, utilising at least one question or any number of questions determined by the user, to transmit the survey document to any number of remote processing apparatus, preferably by electronic mail, to receive and automatically collate response documents containing or specifying responses to the survey document provided by users of the remote processing apparatus to which the survey document is transmitted, and loading the database with answers, so that the answers are all conveniently presented in a database for subsequent analysis.

The invention preferably provides the ability to gather information very easily and quickly over vast distances and to automatically present the information in an already-collated and format. It can be used for any number of information gathering applications.

The information obtained by embodiments of this invention is preferably "fresh". It can be obtained very quickly and is therefore more likely to be relevant than information obtained by prior art methods, such as opinion polling. Because the information is automatically processed and presented in a database, there is no need to undertake the laborious job of individually processing each response document. An immense amount of time can be saved. Because of the automatic collation, a single survey author may poll thousands of respondent users, their responses being processed for him automatically almost as soon as they arrive. It can be considered akin to the survey author simultaneously having a "conversation" with thousands of people. Instead of the responses being a jumble of noise, as it would in a real life conversation with such a crowd, the user receives the information presented in an immediately understandable format of his choice.

The database used may be any type of computer data storage arrangement. It may be a relational database or series of databases of the type presently known. The database preferably includes a plurality of fields for receiving answers dictated by the responses. Each database field for an answer is preferably uniquely identified by a column label, which may relate to the question asked, and a "row" label which relates to the identity of the respondent user. The terms "columns" and "rows" are not used in any limited sense to indicate that all the databases are physically matrixes (although they can be represented that way), but to indicate that each answer field has a unique identifier. The row label is preferably the electronic mail name and address of the respondent user. One or more "columns" in the database may be required to contain the row electronic mail address.

Note that the possibility exists of allowing for more than one answer by the same user to the same survey document. For example, a respondent user may be asked to answer the survey document every week. In that case, the system may be arranged to override the previous weeks data field values or add a further row, including the latest response and identifying it by date and time of response as well as electronic mail name and address.

The data base field values may be derived from the response provided by the respondent user or may actually be the response provided by the respondent user, e.g., where the response is text information.

Once the database has been loaded with values, then the information can be manipulated in any way the user requires, utilising all the database facilities. For example, graphical plots may be made of responses.

A particular advantage of using E-Mail is that it is possible to store the address of respondent users in the database, for later use. It would then, for example, be possible to mail back further questions to persons giving a particular response to one or more questions in a previous survey document. For example, if a particular survey question was "Do you like chocolate", and half the respondents said yes and the other half said no, it would be possible to prepare a further survey document asking; "Would you like to have a free sample of our new chocolate bar brand X", and only mail it to the respondent users who said "yes" to liking chocolate. Using the properties of databases the second survey document could be prepared and transmitted very quickly, merely by instructing the processing apparatus that the survey document is only to go to those people that said yes to the "Do you like chocolate?" question. This illustrates the "conversational" advantages of at least preferred embodiments of this invention, as discussed previously. It is possible to obtain responses from people in a very short time period and use the information from those responses to ask further questions.

The system therefore preferably has the ability to mail to respondents of previous surveys, to facilitate this "conversational" style of communication. Note that the process of "conversation" may be particularly important when the analysed data shows a trend that the Survey Author did not expect and did therefore not include any questions to cover this eventuality. He can produce further survey documents to send to the respondents including those questions that he did not include in the first place. Conversation is further facilitated by the ability to choose which respondents to mail to, may be depending upon their responses to previous questions, combined with the ability to store electronic mail name and address lists of respondents.

The database is preferably created automatically by the survey authoring means, preferably when the survey document has been completed, and, more preferably, immediately before transmission of the survey document. It is not generally necessary for the user to input any data specifically to prepare the database, although a facility is preferably available to enable the user to choose labels for database columns and/or rows.

As the survey author constructs the survey document, the survey preparation means is preferably arranged to allow labels for database columns to be inserted. If the user does not wish to insert any labels himself, the survey document preparation means is preferably arranged to select the headings itself, i.e., by default.

The database is preferably constructed as a matrix, having at least one question column and a plurality of user rows, the rows and columns specifying a plurality of database answer fields for receipt of answers (being derived from the respondent users responses) to the at least one question, each row being associated with a particular respondent user who may receive or has received the survey document and may provide or has provided an answer document (response document). The question column is associated with the at least one question asked. It will be appreciated, as discussed above that the matrix format is preferred, but it will also be appreciated that the invention extends to cover any type of database structure.

The survey questionnaire document or a subset thereof may be stored to enable re-transmission of the survey document at a later stage, as a reminder should any of the pre-selected users not have provided a response document. The database is also preferably constructed just prior to transmission. Where the respondent user identities are known the entire database may be constructed (pre-populated).

It will be appreciated that the option does exist of constructing a database as answer documents are received and processed, e.g., a particular user row will only be added when an answer document is processed. This embodiment may have applications where, for example, the survey document is posted on a "bulletin board" for use by any persons who wish to answer the survey. Each row or row label will therefore only be added as responses come in and are processed by the collation means. The response document preferably includes an identifier identifying the database survey it belongs to, so that the collation means can load the appropriate database with the response and construct a further row label.

The use of electronic mail enables selection of any type of user, group of users, posting on a bulletin board, etc.

By "user" is meant any natural person or group of persons, company or generally an "identity" who may be specified by the survey author.

The survey document may be saved on a respondent users system this enables the remote user (respondent user) to send responses back to the collator when and as often as desired. This could be useful in any circumstances where data is collected on a regular basis. For example, recording telephone sales inquiries.

The survey document may include any number of questions and may also include branched-to questions linked to another question or questions such that the branched-to question or questions will only be required to be answered by a respondent user if the respondent (remote user) user gives a predetermined answer to the question or series of questions to which the branched-to question is linked. A survey document may include a string of questions linked to each other and the branched-to question or questions may be asked if the remote user has given one or more predetermined answers to the string of questions and to the question to which the branched-to question is linked. In a preferred embodiment, the survey document is presented to the respondent user as a plurality of screens (where there are a plurality of questions), each screen asking, generally, one question. A screen presenting a branched-to question will not be presented by the display to the remote user unless he makes one or more predetermined answers to a previous question or questions. Whether a branched-to question is presented may also depend on whether another or other questions have been presented or will be presented to the remote user (respondent user). In other words, if the respondent users answers have meant that he has "bypassed" a question or questions, then a particular branched-to question may be presented. Note that it is also possible to ask a number of questions on a single screen and whether a particular question is presented may depend on his answer or combination of answers to any one or more of these questions. The survey document in this preferred embodiment is "dynamic", in the sense that it will only present questions to a respondent user if the respondent user has made a predetermined answer or answers to a linked question or questions. The survey document will guide the respondent user on a path through the document which is determined by the respondent users answers. Questions which are not relevant to the respondent user, as determined by his answers to other questions, will never be asked of the respondent user. This has the advantage that it is not necessary for the respondent user to wade through a series of displayed questions to find the ones that are relevant to him. He will be automatically guided through the document. It saves time.

The survey authoring means preferably includes a branch control means which enables construction of a complex linked survey document structure on the basis of data input by the survey author. The branch control means includes branch control operator commands which are selectable by the survey author to govern the link structure. These are a tools which the survey author can use to construct a complex document with many pathways through it.

Preferably, the step of preparing the survey document includes specifying an allowable answer or a plurality of allowable answers to the at least one question, so that remote users of may specify at least one of the allowable answers, when processing the survey document on their computer(s). Preferably, a database field value is specified for each allowable answer. In a preferred embodiment, when the answer document is processed, the database field value is entered in the appropriate database field.

The field value may be comprised of numeric or alphanumeric characters, may be any desired symbol or symbols. In a preferred embodiment, the specified field value for a particular question may be generated automatically from components of the question itself, components of the allowable answer, or may be an automatically generated default.

The allowable answers in some cases may be text to be inserted by the respondent user. In these cases, a length for the allowable text may be specified by the survey author. The database field value will be whatever text the respondent user inputs, within the allowable field length. This allows for anything from simple answers to more complicated text answers.

Where a question or questions is not asked of a particular user, i.e., it may have been bypassed because the users responses to other questions in the survey document meant that it was not appropriate for him to be asked that question or questions (see above) then, preferably, a "never seen" value is entered in the appropriate database field on collation.

The person accessing the database can therefore see at a glance whether or not a particular user actually "saw" a particular question. The never-seen value may include any choice of character or group of characters and may be specified by the survey author or as a default by the survey document preparation means.

The step of preparing the plurality of allowable answers may include preparing a grid, having rows and columns providing a matrix of cells for receiving the allowable answers. A title head is preferably prepared for each row and column in the matrix.

In a preferred embodiment, there are three types of grids which may be applied. An option buttons grid, a numeric field grid and a check box grid.

For an option buttons grid only one question column is generally required in the database even though there may be a plurality of cells in the grid for receiving the allowable answers. Preferably, the field values associated with each allowable answer are taken from components of the row and/or column heading for each particular cell. Option button grids may also be provided including sub-groups of option buttons each requiring an answer. In this case, there will be as many question columns in the database as there are groups of option buttons requiring an answer. The groups are preferably in rows and columns.

For numeric field grids and check box grids, in the preferred embodiment a question column in the database is required for each cell of the grid. The headings of these question columns may preferably be formed from components of the row and/or column head of the grid.

Preferably, the step of preparing the Survey Document further includes the step of scanning the Survey Document when it has been completed by the survey author and identifying any errors in the question structure, utilising a scan test means included in the processing apparatus including the survey authoring means. Generally, each question in the Survey Document must come from at least one previous question and lead to at least one further question, apart from the first and last questions in the Survey Document which will come from the start of the document (N.B., the first question will be designated by the author of the document. In fact, in the preferred embodiment, it is open to the author to formulate the questions first and then designate their sequence in the structure of the document separately) and lead to "finish", respectively. In a complex document including branched-from and branched-to questions there will be a number of different "pathways" through the Survey Document. It will be appreciated that the structure can be extremely complex. It is quite possible that during preparation of the Survey Document, the local user (the survey author) will make an error in preparation which will lead to one or more of the pathways being incomplete or broken, i.e., a question exists (other than the first question) which does not come from any other question (an "orphan") or which does not lead from all the questions it is supposed to lead from, and questions may exist which do not lead to any other question ("cul-de-sacs") or do not lead to all the questions they are supposed to lead to. Any such errors should be identified before the Survey Document is transmitted. This is preferably done by applying a scan test function, which scans through all the pathways in the document to identify errors, particularly of the "orphan" or "cul-de-sac" type, although it may identify other "mechanical" errors of this type which may lead to breakdown of pathway in the Survey Document. The scan test means applying the scan test function will also test for missing, duplicate and illegal database names (e.g., the database name not allowed by the particular database which is being constructed, e.g., in DOS only eight characters are allowed for a database name).

The scan test function preferably also provides a display listing of all the variable information in the Survey Document, variable information generally being any item in the document that the local user may exercise a choice in selecting, for example, "Goto's", whether the question is branched to or not, database field titles, etc., but does not display, in general, any textual information from the question content of the Survey Document. The listing enables the local user to check that the mechanical structure of the document (the pathways leading through the Survey Document) is correct, by visually checking the listing. Further, in one embodiment, the items in which errors have been identified are indicated in the listing, preferably by highlighting these particular items. By clicking on any of the items on his screen the local user will automatically be taken to the actual item. It is therefore possible for him to easily be able to check the document and correct any errors indicated.

In the preferred embodiment, the steps of preparation of survey questionnaire document, transmission, processing of the survey document by a respondent user (remote user) return of the survey document to the collation means and collator, operate as follows:

1. A survey master document is originally constructed and includes operator commands for controlling the display of the respondent users computer to display questions, and, in response to the remote users input, to display selected ones of the questions depending upon the linkage structure of the document. It also includes a return E-Mail address for the collation means. E-Mail addresses of respondent users are inserted prior to transmission. The database is constructed from instructions input by the survey author and/or defaults. The survey questionnaire document (preferably a subset of the master) is transmitted and at the same time saved so that reminders can be transmitted if required (note the survey document is preferably transmitted as a "subset" SVQ, of the originally prepared master, sum, and it is the SVQ which is stored). In one preferred embodiment, the survey document is transmitted with respondent control means, used to control the respondents terminal to run the survey document. In an alternative embodiment, a respondent control means is pre-loaded on the respondents computer, and is arranged to control the respondents terminal to process a survey document when one is received.

At this time the database is preferably constructed.

2. The respondent users terminal is controlled from commands in the survey document and the respondent control means to process the survey document and produce a response document which includes responses based on data input by the respondent user. The response document is automatically transmitted back to the collation means address on completion of a response by the respondent user. The survey response document may include a database construction means which enables construction of the database. This is useful where a disaster has occurred and the database has "crashed", for some reason. It may also be useful where the collator has moved location and does not have access to the database or does not know the databases address.

3. The collation means monitors electronic mail at the processing address including the collation means and identifies response documents. It checks the identifier including the response document to identify the database it belongs to. It then locates the appropriate database and commences to process the survey document to load the database with answers determined by the respondent users responses. Note that the collation means and survey author may be on separate processing apparatus. The survey author may also be a different person from the person who is accessing the database to obtain the information. For example, the survey author may be a pollster employee, and the person accessing the information may be the pollster. The survey author can put together the surveys on the basis of instructions provided by the pollster as to what type of information he wants. All the survey author needs to know about the collation means is the collation means electronic mail address. The database may be loaded on the same processing apparatus as the collation means or on any other processing apparatus.

The collation means may be collating any number of surveys. It may collate surveys for any number of survey authors.

The response document may be encrypted for security reasons.

Preferably, the collation means is also arranged to identify electronic mail addresses of respondent users from response documents are attached messages and to load the database with the electronic mail addresses. These electronic mail addresses can then be easily accessed for future surveys.

Where a range of databases are used, a great deal of information can be obtained over time about a particular respondent user who has received a number of surveys.

All "documents" are preferably in "data processing representation" form. In other words, they are in an electronic or other form able to be manipulated by a data processing apparatus, e.g., a computer, and, in some aspects, to control a computer. By "computer" is meant any processing apparatus which is able to manipulate data. This includes computers which use other means apart from electrical signals to process data.

From a second aspect, the present invention provides a processing apparatus for enabling construction of a survey questionnaire document, comprising an input means via which a survey author may input data, a survey authoring means enabling construction of a survey questionnaire document including at least one question formulated from data input by the survey author and a location address of a processing apparatus including a collator means arranged to collate response documents produced by respondent users processing the survey questionnaire document.

The survey authoring means may include any or all of the features of the survey authoring means discussed above, for preparing a survey document with any or all of the features of the survey document discussed above.

From a third aspect, the present invention provides a survey questionnaire document structure, the document being employable by digital document processing systems to gather information from a plurality of respondent computer users, the document structure including:

a location address for a collation means for receiving response documents to the survey questionnaire document from respondent users; and instructions enabling control of a computer to display one or more questions to be answered by a user.

From a fourth aspect the present invention provides a processing apparatus for collating response documents received from a plurality of respondent users in response to their receiving a survey questionnaire document from a processing apparatus, including a collator means arranged to monitor incoming transmissions from a transmission means and identify response documents, which include responses and to load a database in accordance with the responses.

From a fifth aspect the present invention provides a processing apparatus for receiving and processing survey questionnaire documents produced by an apparatus, including a respondent control means arranged to process the survey questionnaire document in accordance with data input by a respondent user, to produce a response document including a response to the at least one question.

From a sixth aspect the present invention provides a computer-readable memory including a set of instructions for enabling a processing apparatus to enable construction of a survey questionnaire document, the document being employed to gather information from a plurality of respondent users, the instructions enabling the computer to operate as a survey authoring means enabling construction of a survey document including at least one question formulated from data input to the computer by a survey author, and a location address for a collation means for receiving and collating response documents respondent users in response to their processing the survey questionnaire document.

From a seventh aspect the present invention provides a computer-readable memory storing a set of instructions that can be used to direct a processing apparatus to operate as a collator means, for collating response documents in response to a survey questionnaire document produced by a processing apparatus, the instructions operating the processing apparatus to monitor incoming transmissions for response documents, and to load a database in accordance with responses.

From an eighth aspect the present invention provides a computer-readable memory storing a set of commands that can be used to direct a processing apparatus to process a survey questionnaire document produced by the apparatus, to produce a response document including a response to the at least one question, to be transmitted on a location for a collation means for collating responses.

From a ninth aspect the present invention provides a method of obtaining information from a plurality of computer users, comprising operating a processing apparatus including an input means via which a survey author may input data, to construct a survey questionnaire document including at least one question formulated from data input by the survey author, transmitting the survey document to a plurality of respondent users, and controlling a processing apparatus to carry out a collation operation including the steps of receiving transmissions from respondent users, identifying response documents including responses from the plurality of respondent users, and loading a database in accordance with the responses.

The tenth aspect of the present invention provides a method of controlling a processing apparatus to construct a survey questionnaire document for obtaining information from a plurality of respondent users, the method comprising the steps of:

controlling the processing apparatus to construct a survey questionnaire document including at least one question formulated from data input to the processing apparatus by a survey author; and to include a location address of a processing means for collating responses to the survey from respondent users to load a database in accordance with the responses.

The eleventh aspect of the present invention provides a method of collating response documents prepared by respondent users in response to a survey document in accordance with claims 67 or 68, the method comprising the steps of:

controlling a processing apparatus to monitor incoming transmissions to the processing apparatus and identify response documents to the survey, and to process the response documents to load a database in accordance with the responses to the at least one question.

The thirteenth aspect of the present invention provides a method of controlling a processing apparatus to process a survey questionnaire document produced, to produce a response document formulated from data input by a respondent user, the method comprising the steps of:

controlling the processing apparatus to display the at least one question for input of a response by the respondent user; and controlling the respondents computer to prepare a response document for transmission to the collating processor.

BRIEF DESCRIPTION OF THE DRAWINGS

Features and advantages of the present invention will become apparent from the following description of an embodiment thereof, by way of example only, with reference to the accompanying drawings, in which:

Figure 11B:
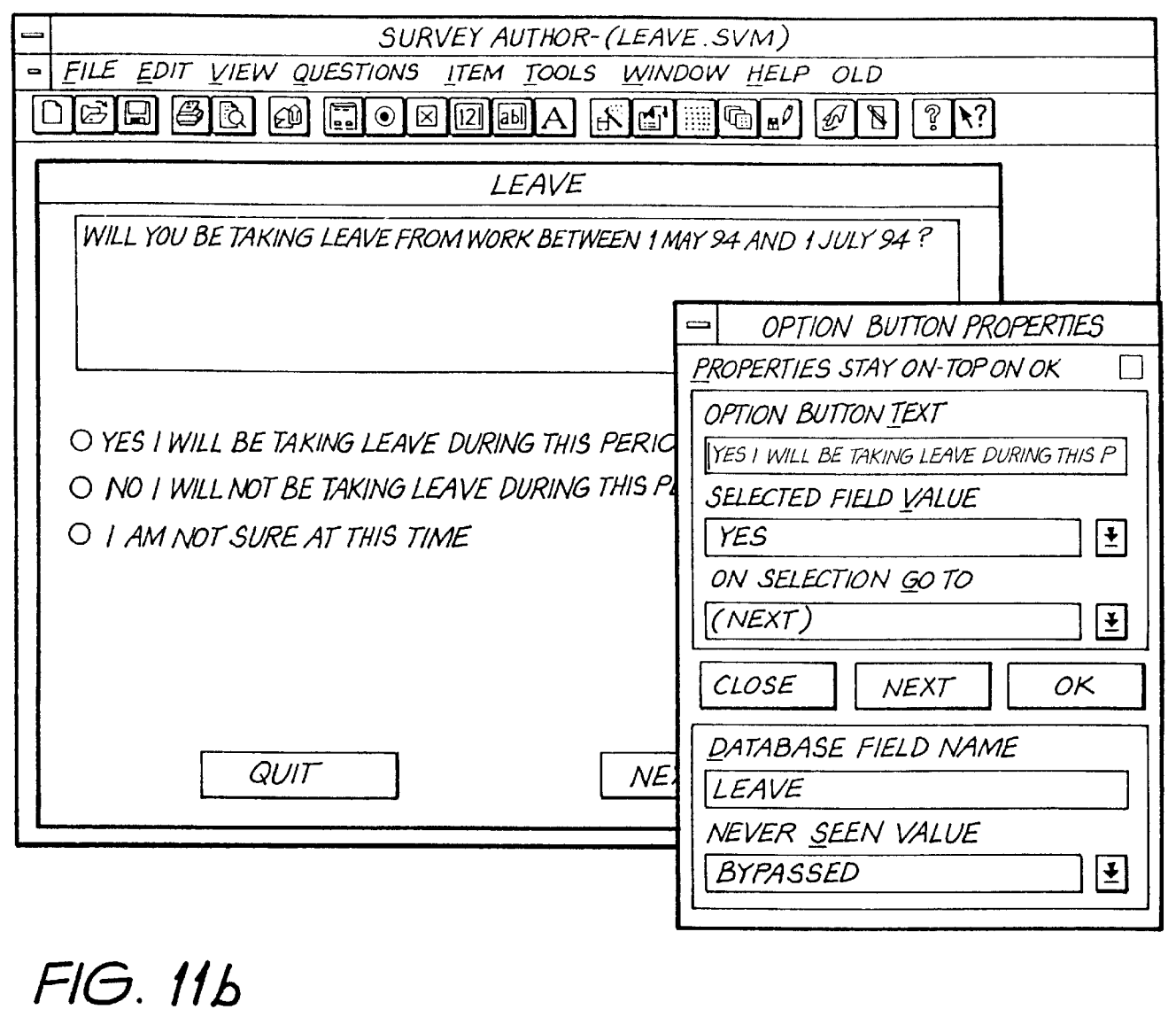

FIGS. 2 through 11e show samples of video display screens showing information presented during various stages of preparation of a survey document and answer document (response document), such as may be presented by a display means of a processing apparatus in accordance with an embodiment of the present invention;

DETAILED DESCRIPTION OF THE PREFERRED EMBODIMENTS

The following terminology is used interchangeably in this document for specifying the same thing.

Response document=answer document.

Author=local user.

Respondent or respondent user=remote user.

Survey authoring means=survey document preparation means.

Local processing apparatus=processing apparatus including survey authoring means.

Remote processing apparatus=respondent users processing apparatus or computer.

Response document=answer document.

Responses=answers.

Figure 1:
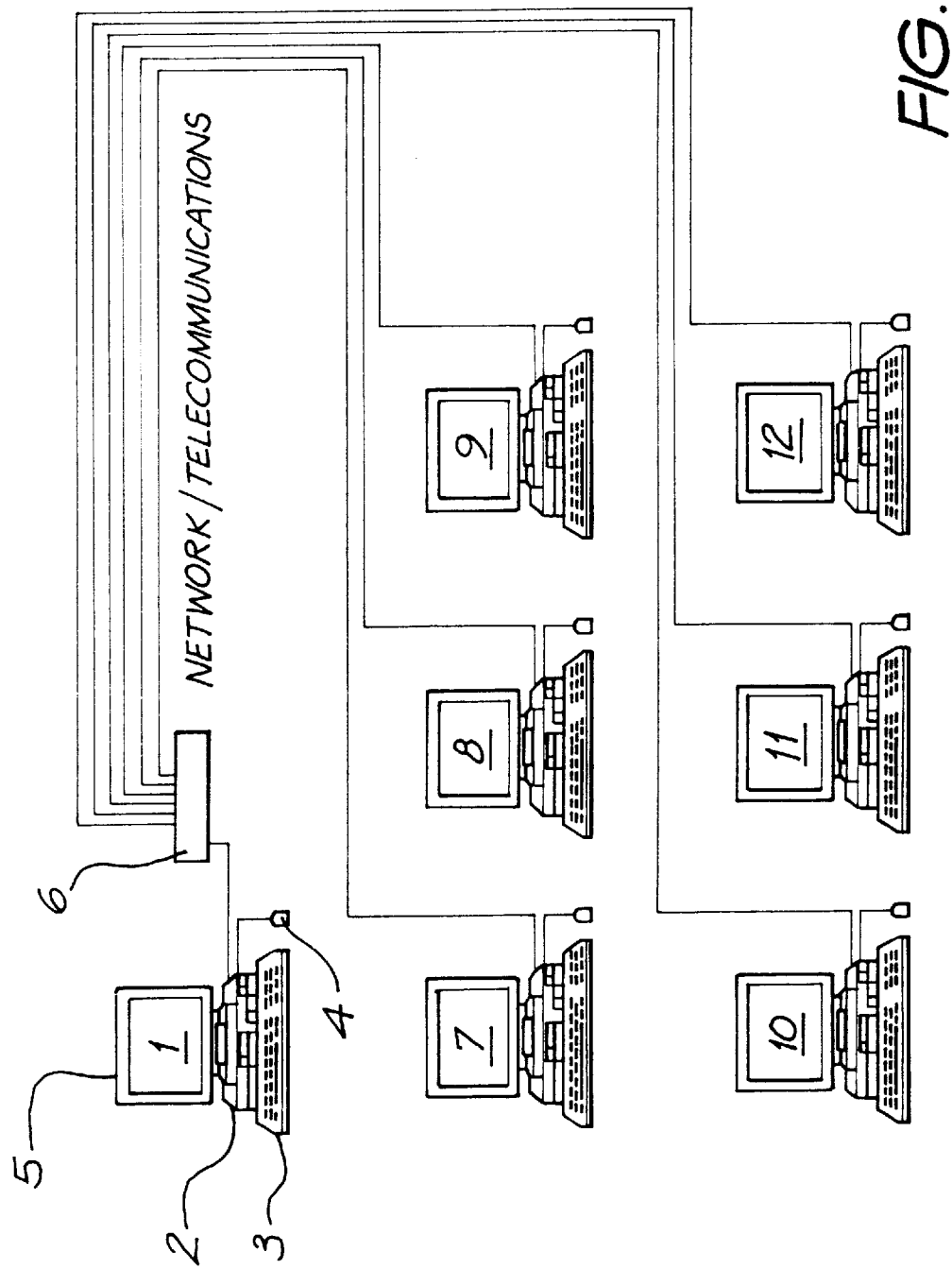
FIG. 1 is a schematic block diagram of a system in accordance with an embodiment of the present invention incorporating apparatus in accordance with an embodiment of the present invention.

In FIG. 1, reference numeral 1 illustrates a is local processing apparatus (a processing apparatus including the survey document preparation means) in the form of a personal computer (PC), comprising a data processing means 2, an input means 3, 4, comprising a keyboard 3 and mouse 4, and a video display unit 5. The local processing means 1 is connected by a communications system 6 to a plurality of remote processing apparatus (a respondent users processing apparatus), each indicated by blocks 7 through 12. It will be appreciated that the local processing apparatus 1 may be connected to any number of remote processing apparatus by any type of communication system 6. Blocks 7 through 12 are given as examples only. Note that the communications system 6 is an illustration only. Preferably, communications is via E-Mail (electronic mail). E-Mail can employ telephones, satellites, optical fibres, etc. All that is required for a user to be connected to E-Mail is that he have an E-Mail address. The E-Mail user may log onto any computer terminal and receive mail.

The local processing apparatus 1 includes a survey document preparation means to enable preparation of a survey document containing at least one question and preparation of a database document having at least one database answer field for receiving answers to the at least one question, and a collation means for monitoring incoming E-Mail to identify response documents produced from processing of a survey document, to locate the database relating to the particular survey, and to process the response document to load the at least one database answer field with the answer.

Each of the remote processing apparatus are programmed with respondent control means to enable a respondent user to process a received survey document and produce an answer document (response document) from the processing, including responses (answers) formulated from data input by the user of the remote processing apparatus.

In a preferred embodiment, the survey document ("survey") can be prepared and launched using Windows™ with access to mail. To prepare the survey document, in a preferred embodiment a Survey Authoring (SA) module is utilised. The following is a description of preparation of a survey document using a Survey Authoring module in accordance with an embodiment of the present invention. Throughout the description representations of examples of video display unit screen displays produced by this embodiment of the present invention will be referred to, as in FIGS. 2 through 11, to illustrate operation of the invention.

Figure 2:
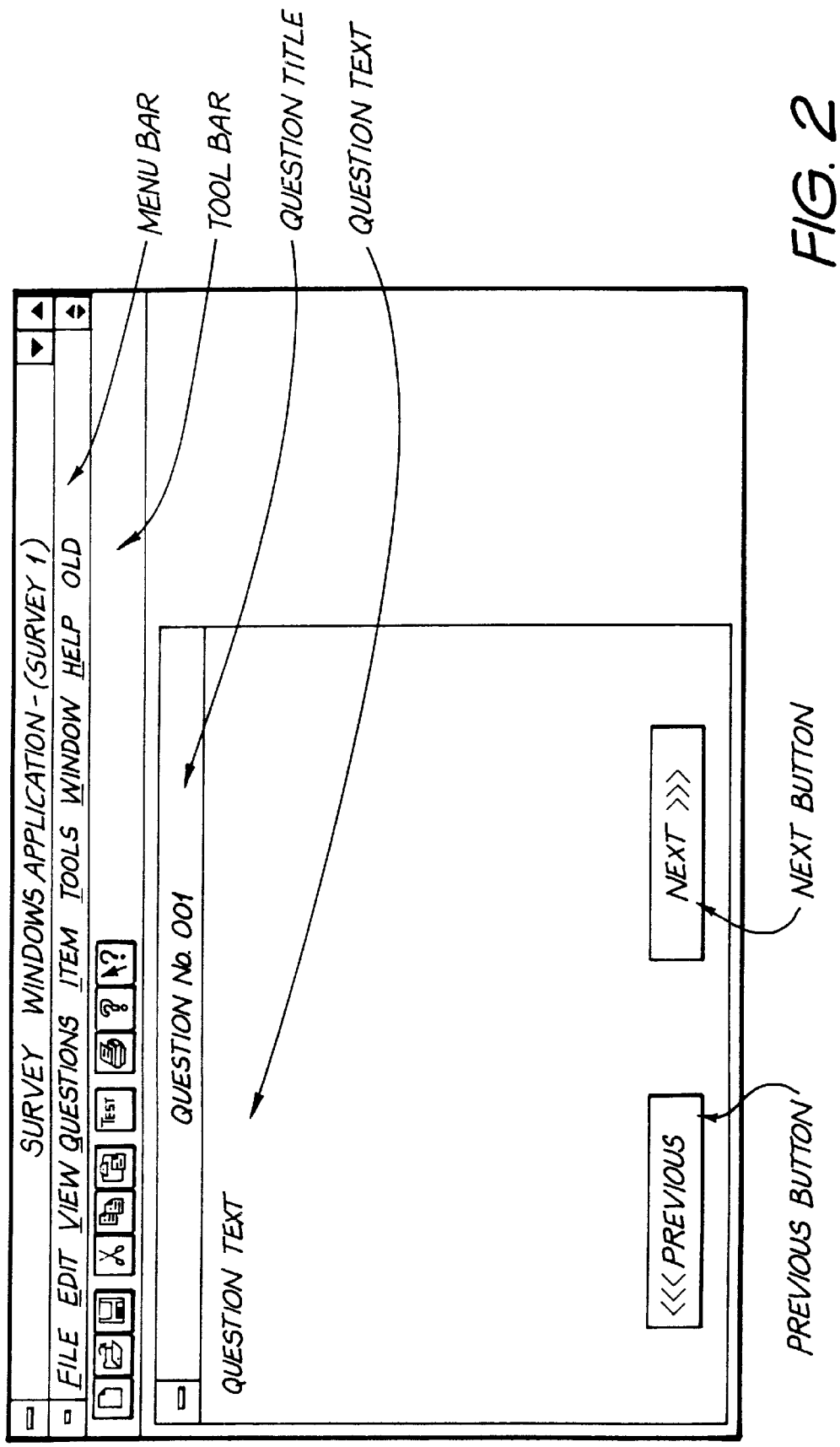
Figure 3:
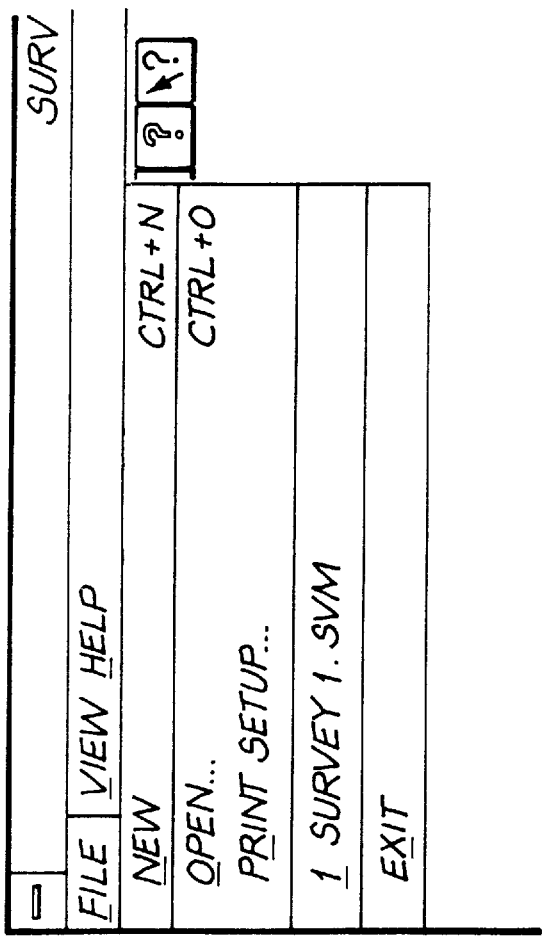
Figure 4:
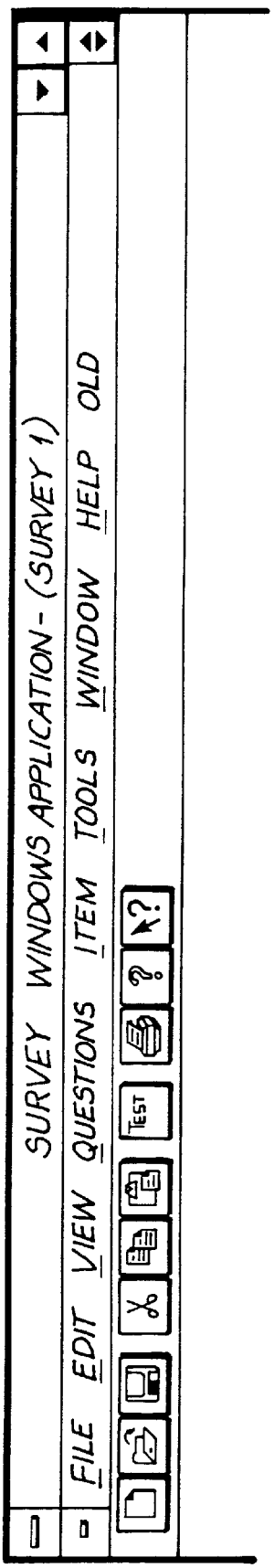
Figure 5:
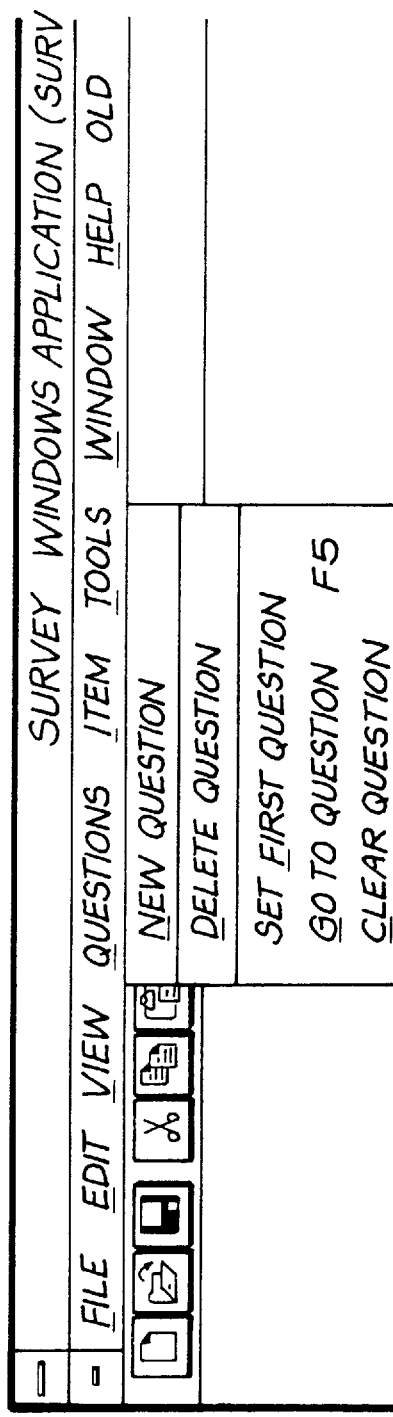
Figure 7:
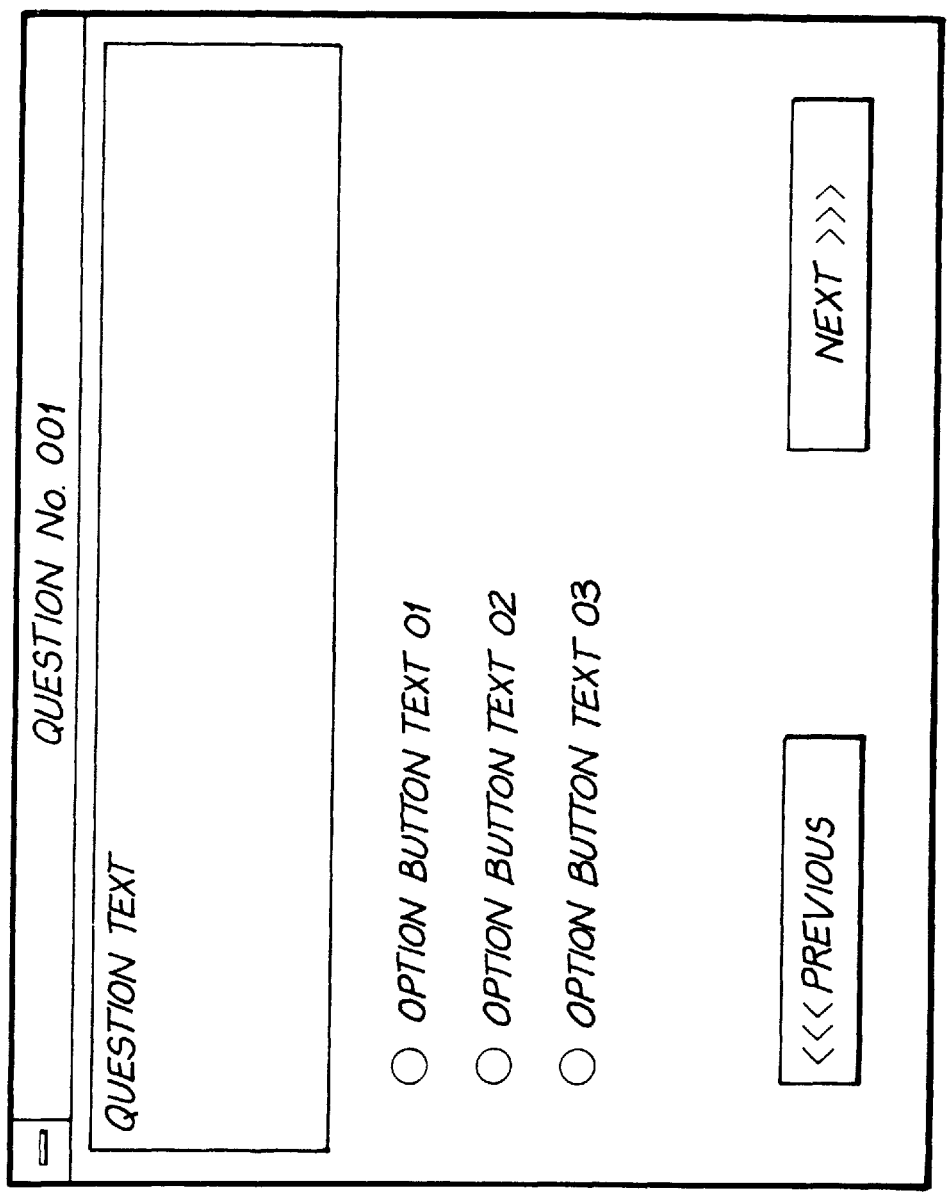

After launching the Survey Author Module from Window Program Manager the user of the local processing apparatus (Item 1. FIG. 1.), the author ("local user"), will see the Survey Author Module screen featuring a Menu Bar and Tool Bar. FIG. 4. Also, on launching, the Survey Author Module automatically creates a new survey document. In order to continue authoring this new survey document the author (local user) will need to create the first question. To do this he will choose the QUESTION/NEW QUESTION menu option (FIG. 5). The author (local user) will now be presented with the first blank question box (a frame section on the screen) (FIG. 2). This question box contains the standard NEXT and PREVIOUS buttons as well as an area for question text.

As the new question box appears, menu options for a range of question types for the author (local user) to choose from are enabled by the menu system. These types are:

Option Button—With a series of Option Buttons the software will accept only one selection by the eventual respondent (remote user). It is like a multiple choice question. The author (local user) will need to make this menu selection for each option button he requires in the current question box.

Check Box—A check box enables the eventual respondent (remote user) to enter a "check" (a cross "X" mark signifying a yes or true status) in each check box placed in the question box by the Survey Author (local user).

Numeric Field—Same as Check Box except that the respondent (remote user) will enter numbers instead of "checks".

Text Field—Same as numeric field except that the respondent (remote user) will enter any alpha numeric characters rather than numbers.

Option Buttons Grid—Grids in general are the same as the first three possible question types mentioned above. The difference is that they are arranged in a grid format. Therefore the author (local user) needs to specify the number of items and the arrangement of those items within the question box. For example: he may specify 12 buttons and an arrangement of 3×4, 4×3, 2×6 or ×2.

Check Box Grid—The same as the Option Buttons Grid except that it behaves like a series of Check Boxes. An example of a Grid Check box is given in FIG. 6.

Numeric Field Grid—The same as the Option Buttons Grid except that it behaves like a series of Numeric Fields.

Figure 11A:
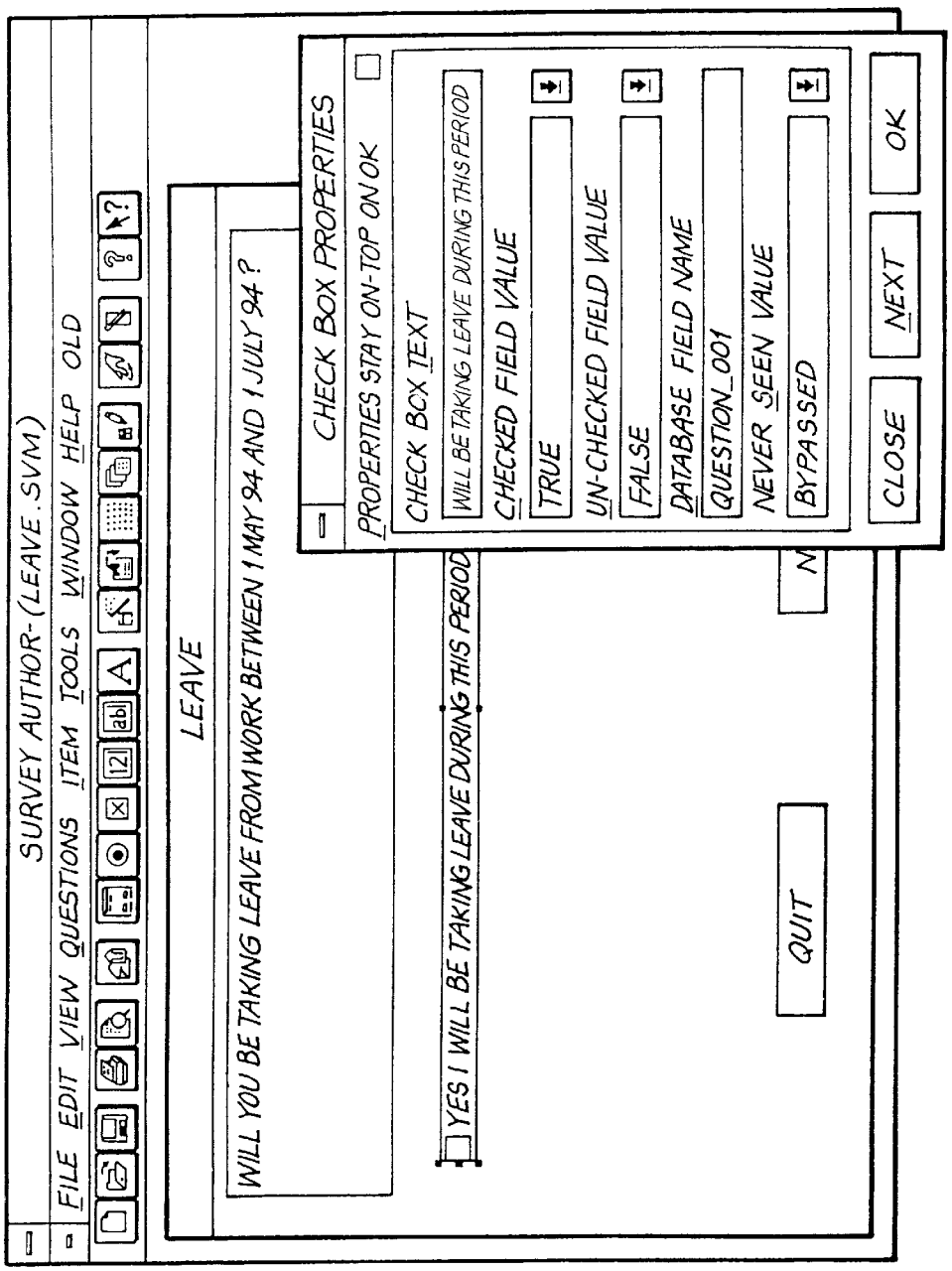
Figure 11C:
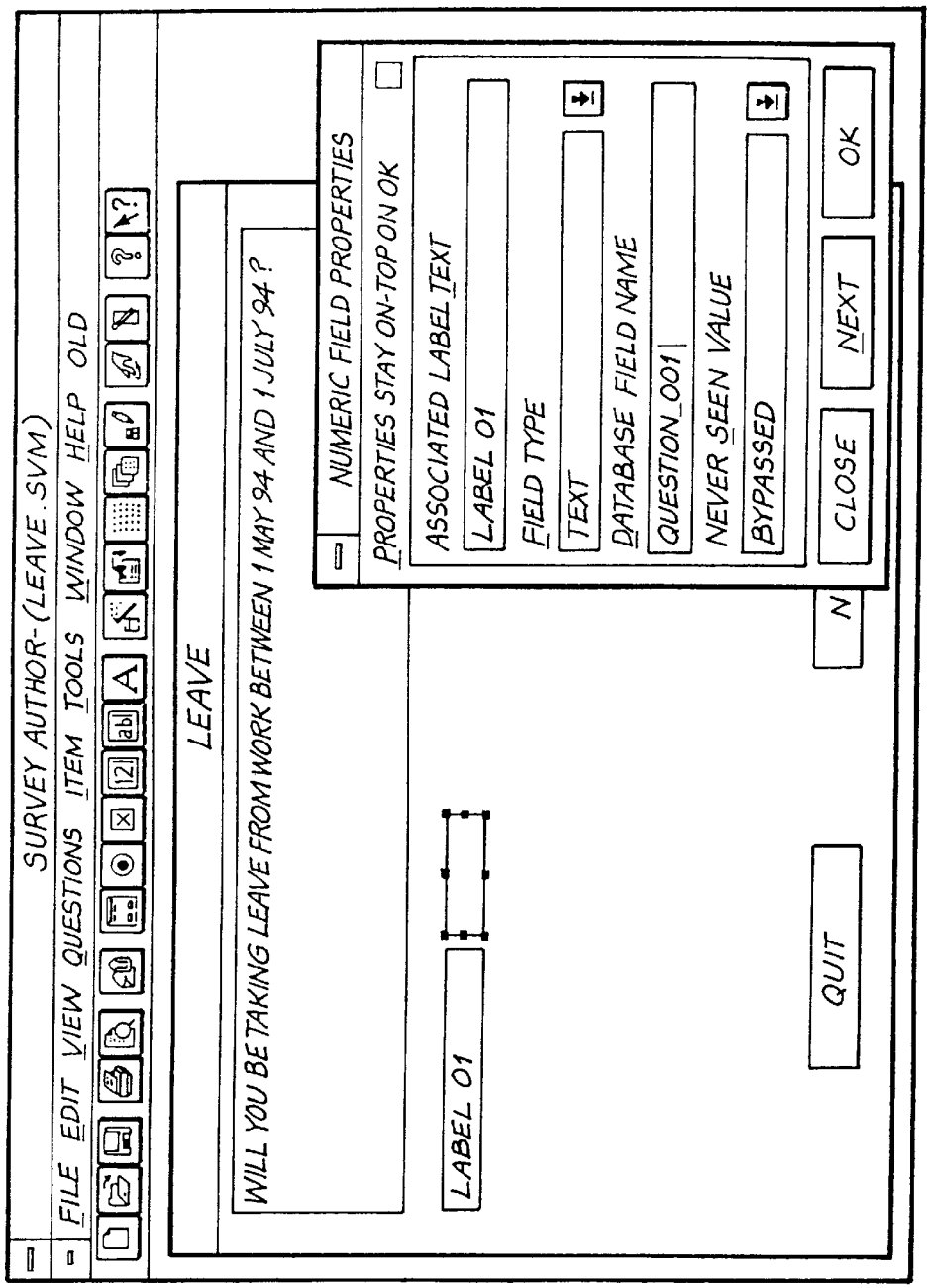
Figure 11D:
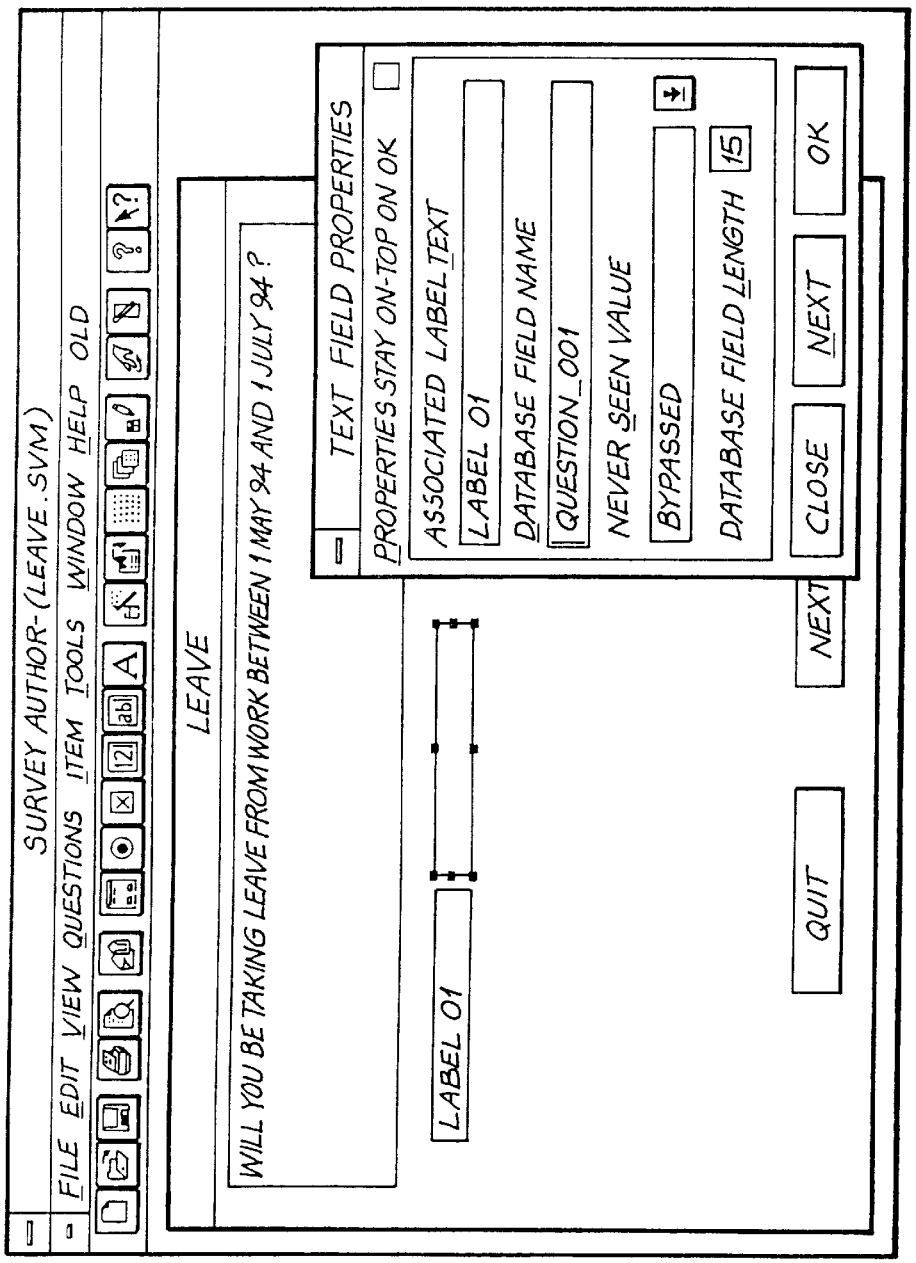
Figure 11E:
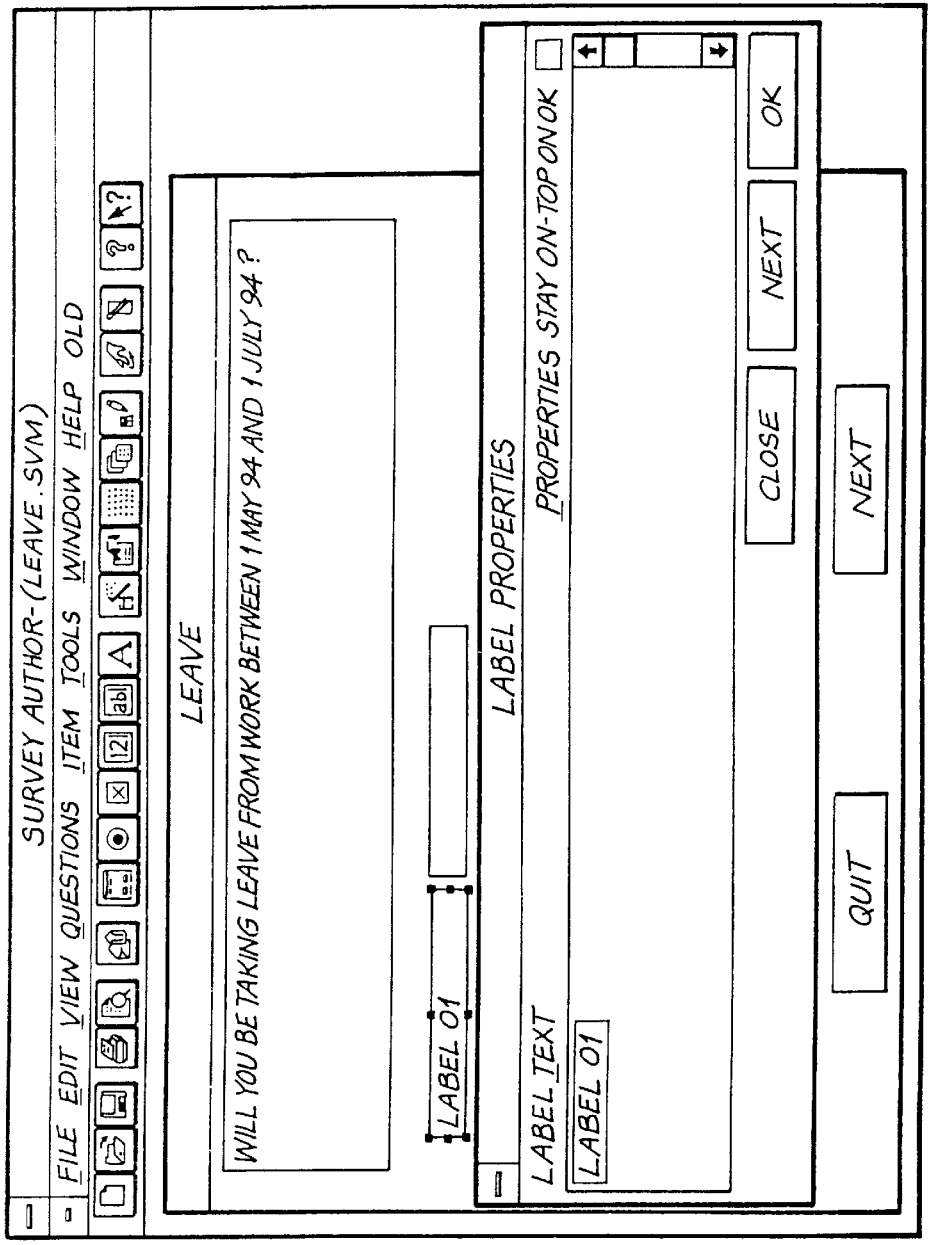
Figure 11F:
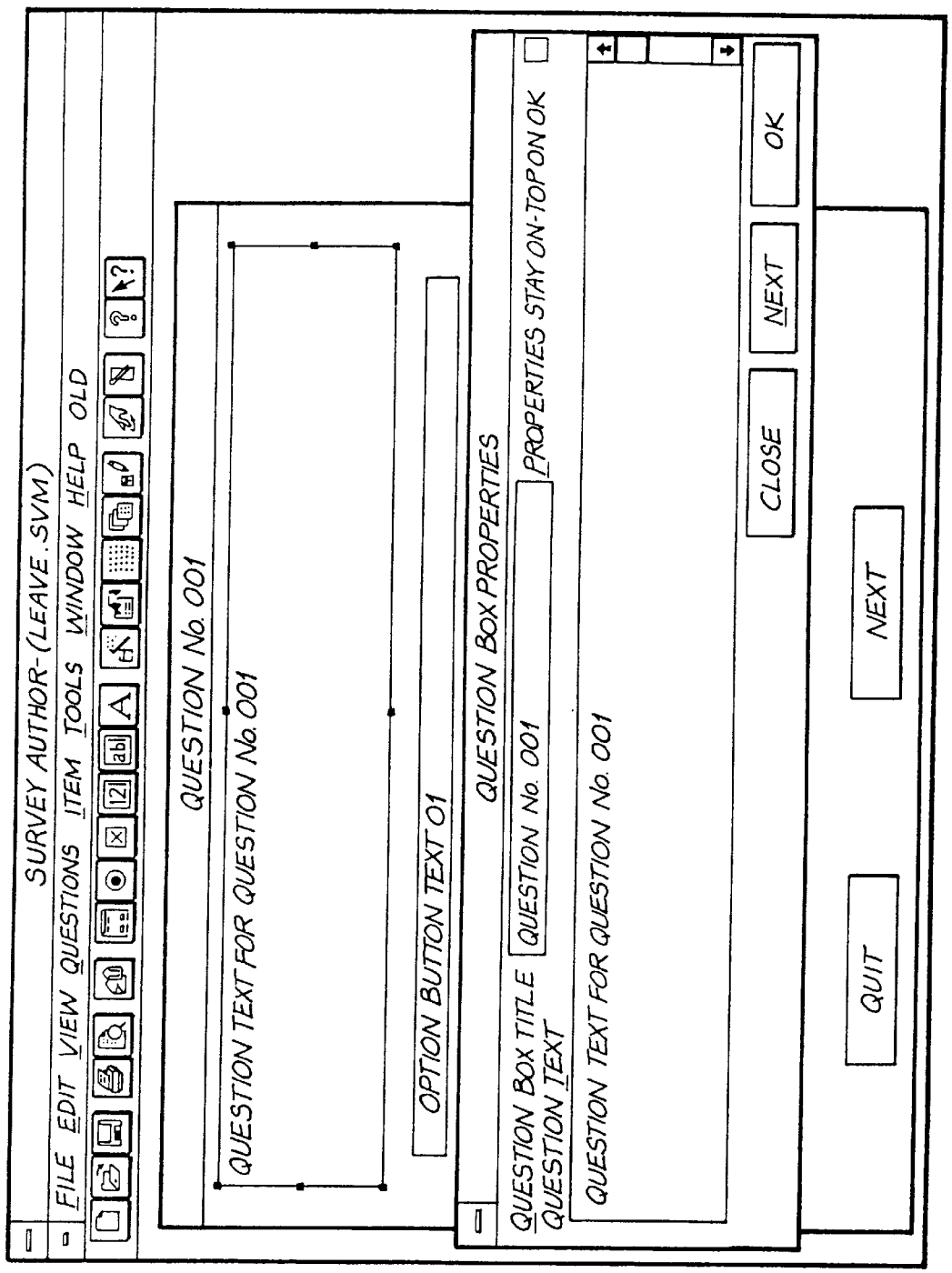
Figure 11G:
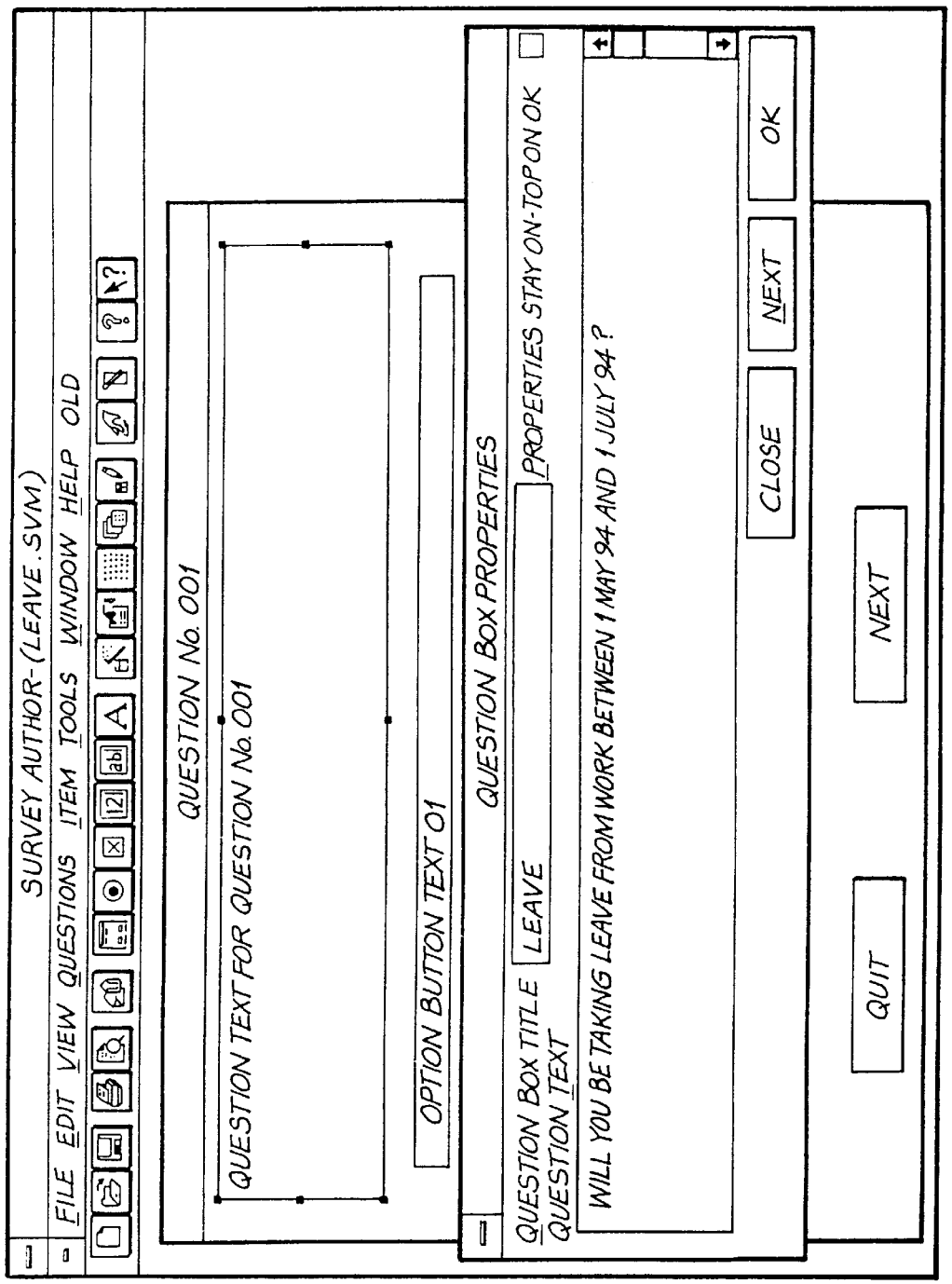

The question format may include any combination of the above, e.g., a combination of an option buttons grid and a check box grid:

FIGS. 11a through 11b illustrate, respectively, means which show dialogue boxes for:

1. one option button properties (FIG. 11b) for specifying properties of option buttons.
2. Numeric field properties, for specifying properties for a numeric field (FIG. 11c).
3. A text field properties dialogue box for specifying properties for a text field (FIG. 11d).
4. A label properties dialogue box (FIG. 11e) for specifying "label" for a text field.

Displays for option buttons grid, check box grid and numeric field grid are not shown. The requirements for such a display, however, are apparent from the previous and following description on how the display looks is generally a matter for taste of the software engineer and the requirements of the system interface.

To construct the survey document, the survey author will need to specify the following:

a). Question title (optional);
b). Question text;
c). Option, check, numeric or alpha label text or any combination thereof;
d). Where to GO TO after this question (optional). This would be inserted where the author wishes to link the question to another—see later;
e). Alter any database column names (optional);
f). Select or alter default on selected database field values (optional); and
g). Select or alter default on never seen field values (optional).

The author (local user) may specify any one of the above types of question. Lets say the author (local user) wishes to use three "Option Buttons" because he wants to give the respondents (remote users) three possible options to choose from for a specified question. To do this the author (local user) could use their mouse (Item 4. FIG. 1.) to select ITEM/OPTION BUTTON from (see "ITEM" menu, FIG. 15) the menu bar. They would need to do this twice. The first click will cause display of two option buttons. The second will cause display of a third option button. Alternatively the author (local user) could use their mouse to click twice on a "Option Button" Icon on the Tool Bar. Once the author (local user) has finished one of these two actions the frame work of his first question is complete.

This first question contains three main features (see FIG. 7):

1. Two buttons at the bottom of the screen marked "Next" and "Previous".
2. Three equally spaced "Option Buttons" with "Option Button Text 01", "Option Button Text 02", "Option Button Text 03" printed next to them.
3. A "Question Text" area towards the top of the dialogue box.

The author (local user) is now required to edit the variables for this question box. To do this the author (local user) double clicks on any clear space within the question box. The Question Properties dialogue box will appear on the screen containing the following variables Question Text—This is the area that the author (local user) enters the question that he wants the respondents (remote users) to answer. To enter the "Option Button Text 01", "Option Button Text 02", "Option Button Text 03" printed next to them.

3. A "Question Text" area towards the top of the dialogue box.

The author (local user) is now required to edit the variables for this question box. To do this the author (local user) double clicks on any clear space within the question box. The Question Properties dialogue box (FIGS. 11f and 11g) will appear on the screen containing the following variables Question Text—This is the area that the author (local user) enters the question that he wants the respondents (remote users) to answer. To enter the question text the author (local user) needs to select with his mouse the words "Question Text" and then over type it with the new text.

In this example the author (local user) wishes to obtain information from respondents (remote users) as to what leave they will be taking between May and July. The respondents (remote users) may all belong to the same company, for example, and the author (local user) wishes to plan company leave. The author (local user) enters the following question text:

"Will you be taking leave from work between May 1, 1994 and Jul. 1, 1994?".

Question Title—These titles are used as reference to their particular question. These references are used in question selection menus, for selecting a current question to edit, and to nominate the branching of the questions (see later).

The system generates a default "Question No. 001" where the number part increments for each new question box. The titles may be edited but must be a unique reference within the survey document. In this example the author (local user) will change the Question Title to "LEAVE".

The next step is to enter the relevant defaults for each of the three Option Buttons. To do this the author (local user) simply points at the first Option Button and double clicks with the mouse. The Option Button Properties dialogue box will appear. The main features of this dialogue box are:

Option Text—This is where the author (local user) will specify the text that corresponds to that particular option. In the question text the author (local user) asked about staff leave. He should now nominate the text for one of the options that the respondents(remote users) will be able to choose from.

For Example: "Yes I will be taking leave during this period".

Database Field Name—This is the name of the column in the database to be prepared in accordance with this embodiment, that will contain answers to this question (the "database column heading"). The column heading may be prepared on the basis of data input by the author (local user) specifically for the column heading. In a preferred embodiment, a default column heading is inserted should the author (local user) not wish to input his own. More preferably, the default may be automatically prepared from components of the question text. This is particularly useful for the check box grid and numeric field grid type questions. Each check box grid or numeric field grid comprises a matrix of rows and columns, each row and column having a header title. Each point (cell) designated by the row and column in the grid matrix is a point where a respondent (remote user) will enter, selectively, an answer. In a preferred embodiment, a database column heading is automatically prepared from components of the row and/or column heading of the check box grid or numeric field grid matrix. In this example this field need only be filled in once as there is only the one Database Column associated with this question. The author (local user) will name the Database Column Heading as "LEAVE". The default will be the same as the question title.

Branched-To Question—This is where the author (local user) enters the next question that this option would take the respondent (remote user) to if the option were selected. Obviously the author (local user) is not able to nominate the next question at this point because he is currently working on the first and only question. However, the author (local user) can nominate one of three special branching destinations. Any of these destinations, {FINISH}, {NEXT} and {NONE} can be used for just this particular question option, or they can be set as the default for this survey document or the entire system. Specifying {FINISH} will mean that the respondent (remote user) will go straight to the Finish Question Box at the end of the survey document.

The {NEXT} destination will automatically branch to the next question the author (local user) generates.

The {NONE} destination will become a "cul-de-sac". In other words the question will lead nowhere. When testing the survey document (see later) it will be indicated to the author (local user) that a question exists which is an orphan or a cul-de-sac and the author (local user) will be able to make appropriate corrections. In this example the Option Button text says "Yes I will be taking leave during this period", and the author (local user) may therefore require additional information so he would want this option to branch to another question. In this example there is only one other question so the author (local user) can select {NEXT} even though the question has not been generated yet. (In an alternative embodiment branching control instructions may be included—see later).

On Selection Database Field Value—This is where the author (local user) specifies the entry he would like to appear in the database answer field if the respondent (remote user) were to select this option. In this example the Option Button text says "Yes I will be taking leave during this period", so an appropriate On Selection Database Field Value would be "Y" or "YES".

In some cases, the on selection database field value may be chosen automatically. In particular, where the question is in the form of a option buttons grid, having a plurality of rows and columns, each row and column having a heading and specifying a plurality of points (cells) in the grid for selection by a respondent (remote user), a single column heading may be available in the database and the field value entered in response to answering of the question by a respondent (remote user) may be automatically selected from components of the row and/or column heading for the particular option selected. It will be appreciated that selected field values could be automatically selected for other types of question, as well as option buttons grid.

Never Seen Database Field Value—If the question has not been presented to the respondent (local user) due to the fact that their answers have taken them down another route the never seen database value will appear in the database answer field.

For Example: There may be a series of questions within the survey document that apply to one particular group and not another ie. Males—Females, Wage earner—Salary earner etc.

The database field value defaults to "BY PASSED" or "NOT ACCESSED". This can be edited here on each question, or can be permanently changed for this and all future survey documents by using the TOOL/OPTIONS menu. In this example the author (local user) will not change the Never Seen Database Field value. Now the author (local user) presses Enter or clicks OK.

This has now completed the process of editing the variables for the first option of the first question. If the author (local user) presses Enter or clicks OK, he will now see the question option text appear in the question box.

To complete the range of options available to the respondents(remote users) the author (local user) must repeat the above mentioned process on the next two options. However, as this is an option button based question there will be only one database column and therefore there is no need for the author (local user) to nominate either the Database Column Heading or the Never Seen Database Field Value again.

Lets assume that your three options are as follows:

| Option Button Text | On Selection Database Field Entry | Branching to |
|---|---|---|
| Yes I will be taking leave during this period. | Y | {NEXT} |
| No I will not be taking leave during this period. | N | {FINISH} |
| I am not sure at this time. | M | {FINISH} |

See FIG. 8 for a screen display of the question text and allowable answers.

The author (local user) then saves the work he has done so far by selecting the FILE/SAVE menu option. The survey document may be given a unique and descriptive name. Such as HOLIDAY.SVM.

The author (local user) can now go ahead and create the final question in the survey document. To start a new question the author (local user) must select the QUESTION/NEW QUESTION menu option. This will present the author (local user) with a new question box containing, as before, the "NEXT" and PREVIOUS buttons as well as the Question Text area. The author (local user) can now proceed as per the first question but using the new set of variables.

Lets assume that the final question is an option-type question and the parameters are as follows:

| Field | Variable |
|---|---|
| Question Text | Where will you be holidaying |
| Question Title | Destination |
| Database Column Heading | Destination |
| Never Seen Database Field Value | BY PASSED |
| Option One: Option Text | New South Wales |
| Option One: Branching To: | {FINISH} |
| Option One: On Selection Database Field Value | NSW |
| Option Two: Option Text | Australia, but not NSW |
| Option Two: Branching To: | {FINISH} |
| Option Two: On Selection Database Field Value | AUST |
| Option Three: Option Text | Overseas |
| Option Three: Branching To: | {FINISH} |
| Option Three: On Selection Database Field Value | OS |

Now that the second and final question of this brief survey document has been completed the author (local user) can take a look at the linking of options from question one (LEAVE) to question two (DESTINATION) or FINISH (end of survey document).

Earlier the Branched-To Question field was mentioned and the author (local user) used the {NEXT} and {FINISH} options because he could not nominate the "Question Title" of the next question at that point. Now that the next question has a title, "Destination", the "Branching To" field in the previous question that contained the {NEXT} option will automatically change to read (DESTINATION).

So in summary, the author (local user) has asked a question relating to leave being taken and another relating to where the respondent (remote user) will be taking this leave. Now clearly if the respondent (remote user) has answered either option two or three (No and Not sure) to the first question (LEAVE) there is no need for them to answer the second question (DESTINATION) and therefore they should go straight on to (FINISH). Option one (Yes I will be taking leave during this period) of question one (LEAVE) should lead to question two (DESTINATION). As the second question is also the last the author (local user) may choose settings of {FINISH} as all options will need to lead to the end of the survey document.

Although in this example the author (local user) has chosen the {NEXT} option to automatically handle his linking it can be done manually using the following process.

Figure 9:
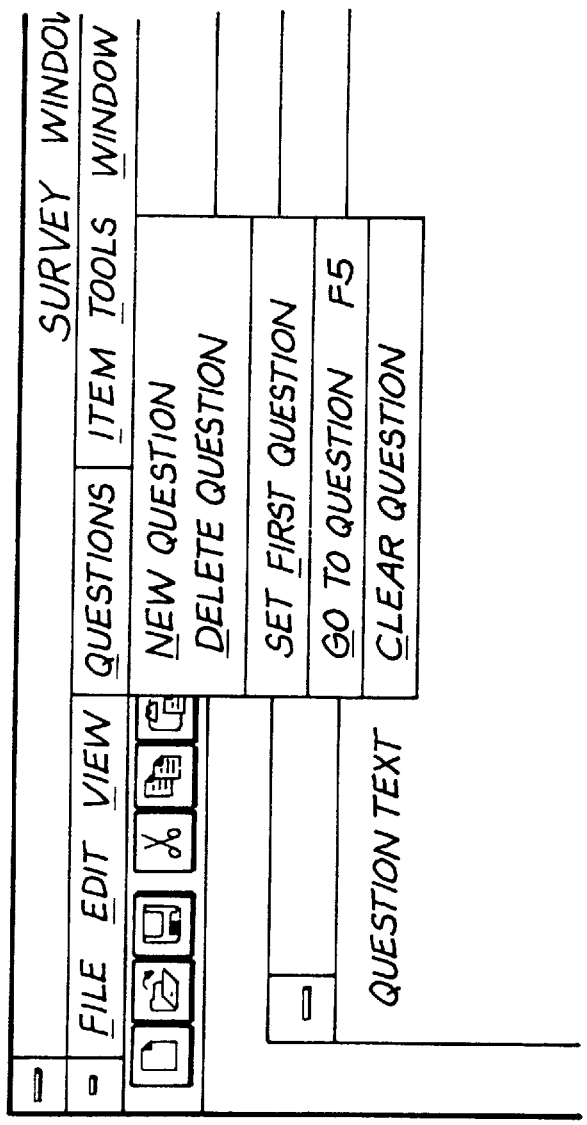

The first thing to do is to get the first question (Leave) back on the screen. This is done by is selecting the QUESTION/GOTO QUESTION menu, and the choosing of "LEAVE" of the list (FIG. 9).

Question one (LEAVE) is now displayed on the screen. Double clicking on the first option (Yes I will . . . ) will display the option button properties dialogue box. From the list displayed in the Branched-To Question section select the second questions title "DESTINATION" and press Enter or click OK.

The final step before testing is to nominate which question is the first question to be presented to the respondent (remote user). This is done by selecting the QUESTION/SET FIRST QUESTION menu and nominating the Question Title of the appropriate question.

Figure 15:
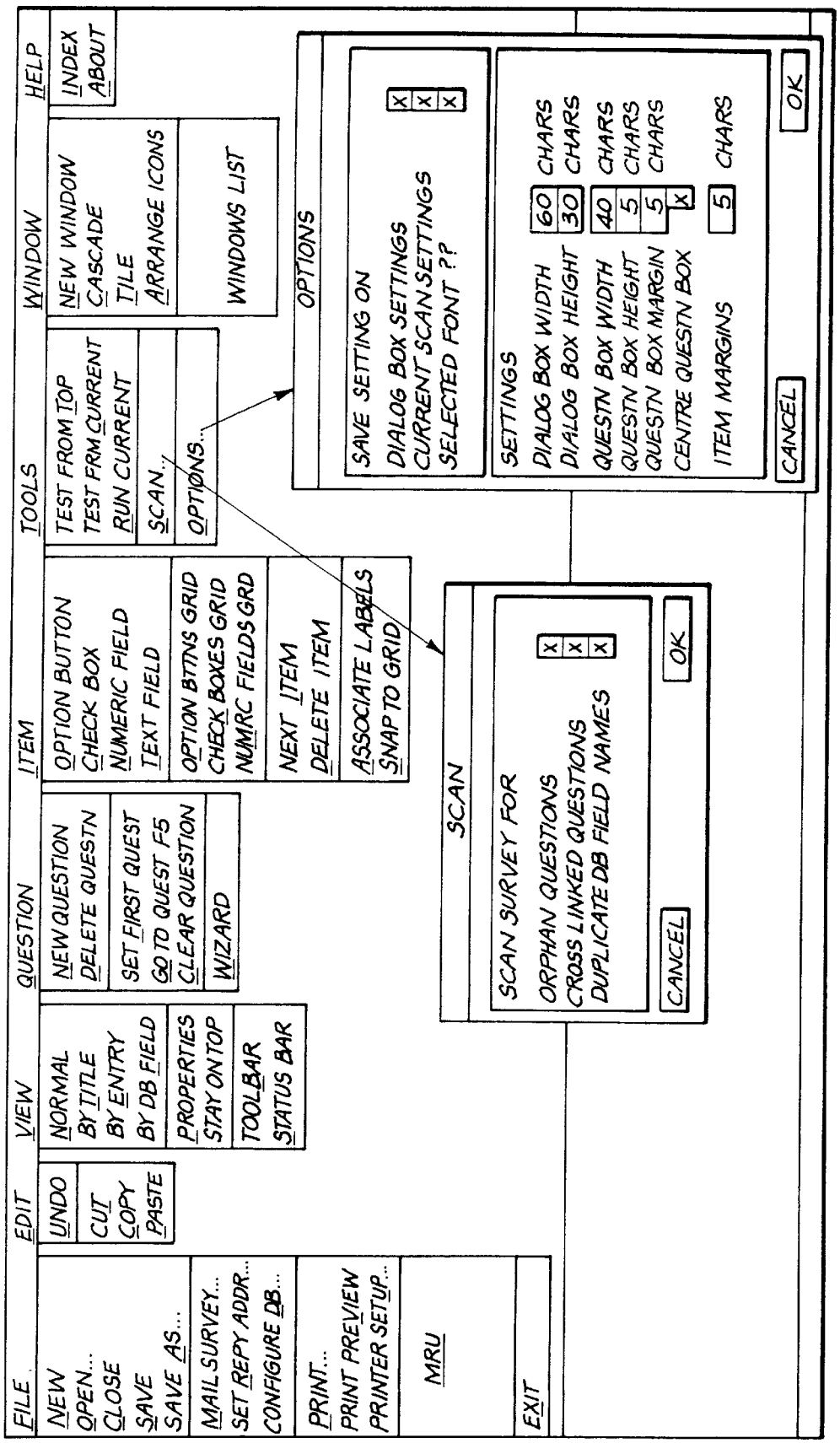
FIG. 15 is an illustration showing the various menu options available to a Survey Author in accordance with a preferred embodiment of the present invention.

The first test that the author (local user) should perform is the SCAN TEST. This is accessed through the TOOLS/SCAN menu option (FIG. 15).

On selecting SCAN TEST the arrangement scans through the survey document and searches for any errors in the question structure. This is particularly important for complex survey documents which incorporate a number of branched-to questions. SCAN TEST generates a report of "orphans" and "cul-de-sac" ie., questions which no other questions lead to and questions which do not lead to anything. The arrangement is aware that there is a single question which will not have a preceding question (the question selected as the first question in the survey document) and a single question which will not have a succeeding question (the last question in the survey document). It may test all the other questions simply to determine for orphans or cul-de-sacs. Once any existing orphans or cul-de-sacs have been identified the author (local user) can access them to correct them.

In addition to orphans or cul-de-sacs SCAN TEST also identifies any Cross Linked Questions (A child question that branches to any preceding question) and Duplicate Database Field Names. It will also test for illegal names (e.g. over eight characters for DOS based database) and missing names.

In one embodiment, an entire list of the items appears on the authors (local users) screen. Clicking on one item immediately takes the author (local user) to that item. By "item" is meant any item which may be determined by the local user in preparing the Survey Document, e.g., Goto's, not accessed, branching-to questions, DatabaseFieldName, etc. The listing will not include information such as question text (although the Question title is listed) and the like which do not effect the mechanical structure of the Survey Document (e.g., the pathway through the Survey Document). It is a mandatory requirement, however, that the author enter Question Text. While this will not affect the mechanical operation of the document (the way it runs on the respondents processor), if no Question Text is provided, the respondent user will view a blank question (i.e., no question). A test for question text is therefore important and is included. There may be other mandatory items such as question labels.

The listing enables the author to briefly check that the document structure reads as desired. Any items identified by the scan test as being in error are preferably highlighted in the listing so that the user can click on them and take the appropriate action to correct the error. An embodiment is envisaged where all variables in the Survey Document which could be effected by the author or system configuration are listed.

Once the SCAN TEST has been completed without error the author (local user) can be confident that the mechanics of their survey document are in order.

The Respondent Test is accessed either via the TOOLS/TEST FROM TOP (FIG. 15) or by a simple click on a "Test" icon on the tool bar.

Activating Respondent Test will take the author (local user) through the survey document as if he where a respondent (remote user).

Figure 16:
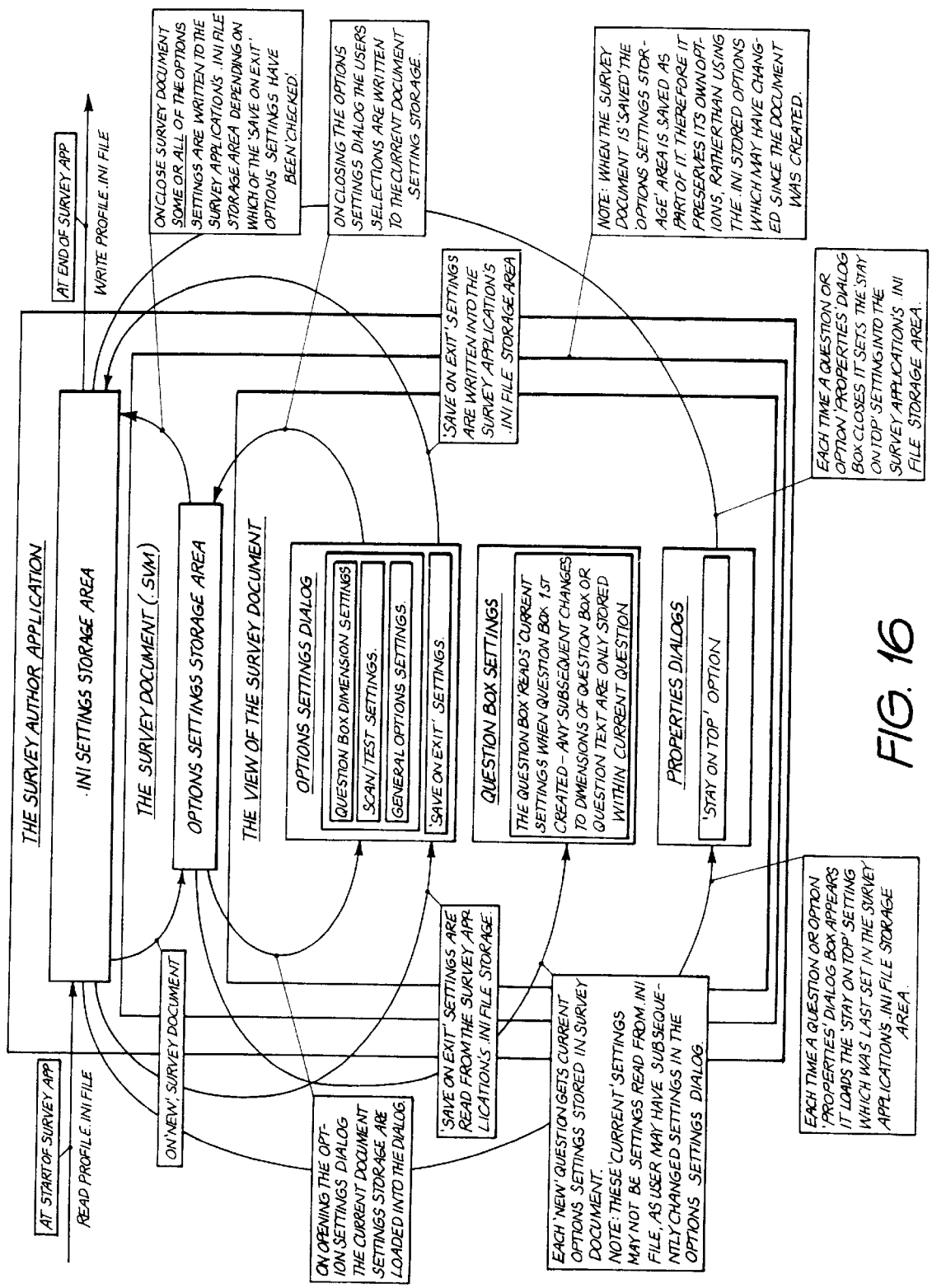
FIG. 16 graphically illustrates available setting options for the structure of the survey document of the preferred embodiment, and their operation.

A further test is TOOLS/TEST FROM CURRENT (FIG. 16) this allows the local user the option of testing the Survey Document from any particular question he is currently displaying.

Prior to sending the survey document the author (local user) determines the electronic mail address the response documents are sent to FILE/SET REPLY ADDR (FIG. 15) and then nominates the return address.

Once the author (local user) is satisfied that the survey document works and that the response will be going to the correct mail address he may send it to his target audience.

Figure 10:
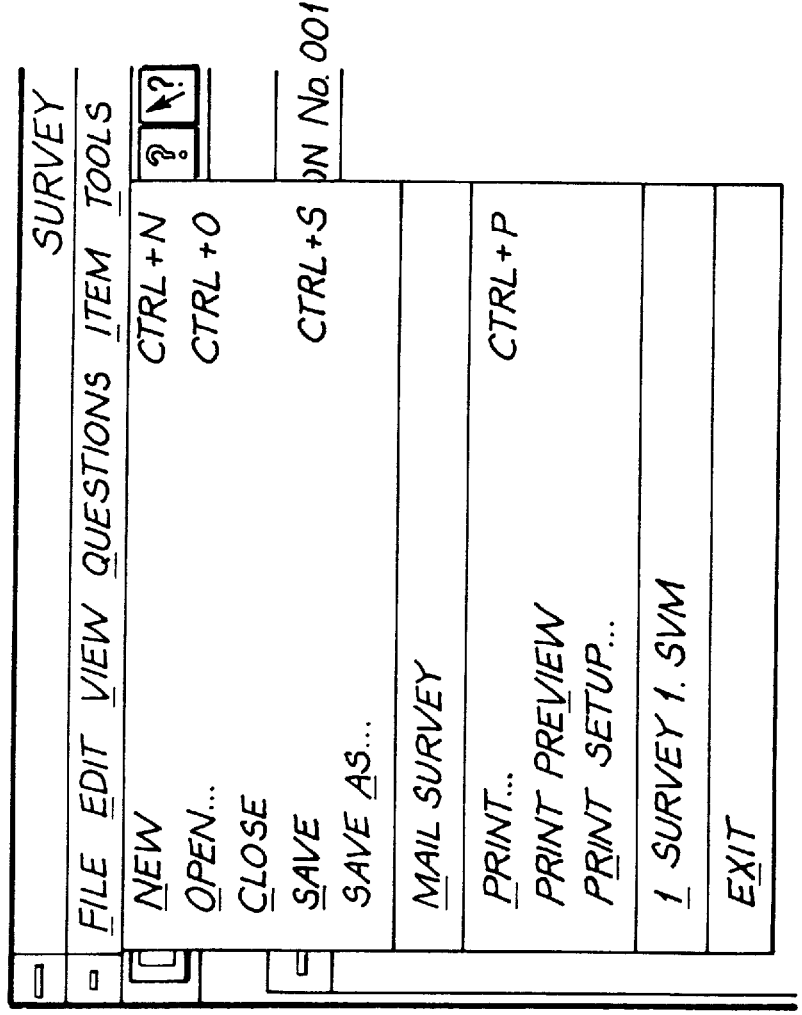

To do this he selects the FILE/SEND SURVEY (FIG. 16) menu option (FIG. 10).

The Survey Author Module assumes that the author (local user) will be sending the survey document that is currently loaded.

It will present a dialogue box listing of all the respondents (remote users) and groups of respondents (remote users) that the author (local user) could mail to. The survey author may also mail to the respondents of previous surveys. A listing of the respondents of previous surveys is kept. The dialogue and box will also list all the previous surveys so that the author may click on a selected previous survey to send to remote users who filed responses for that survey. Methods may also be used to select sub groups within the targeted database. The author (local user) will make his selection and press Enter or click OK. Another dialogue box will appear enabling the author (local user) to attach a message to the survey document. For example the author (local user) could use this to introduce the survey document to the respondents (remote users) and explain the benefits to them or the organisation of responding to it quickly. Once the author (local user) is satisfied that everything is OK he can press Enter or click OK. The small survey document will then be on its way to its target audience. At the same time (in the preferred embodiment, just prior to transmission) the apparatus will automatically create the database in preparation for the responses. Also, at the point that the local user selects the FILE/SEND survey menu from the File menu they are offered a dialogue box requesting them to name the SVQ (survey document to be sent out) file that is about to be sent out. The default name is that of the SVM (the survey document master—see later). Once the local user has either selected a new name for the SVQ or accepted the default name the local user will be offered another dialogue box asking for them to select the database type that they would like to create for this survey to be collated into. At this point the local user will ask for either a database name and/or table name. The default will be the SVQ name. However, the local user can change it.

The database can be fully populated if the author is mailing the survey to a list of known users. However, there is the option for the database not to be populated if their survey is sent to a group, for example, or put on a bulletin board. In the present example, the database is fully populated.

Figure 14:
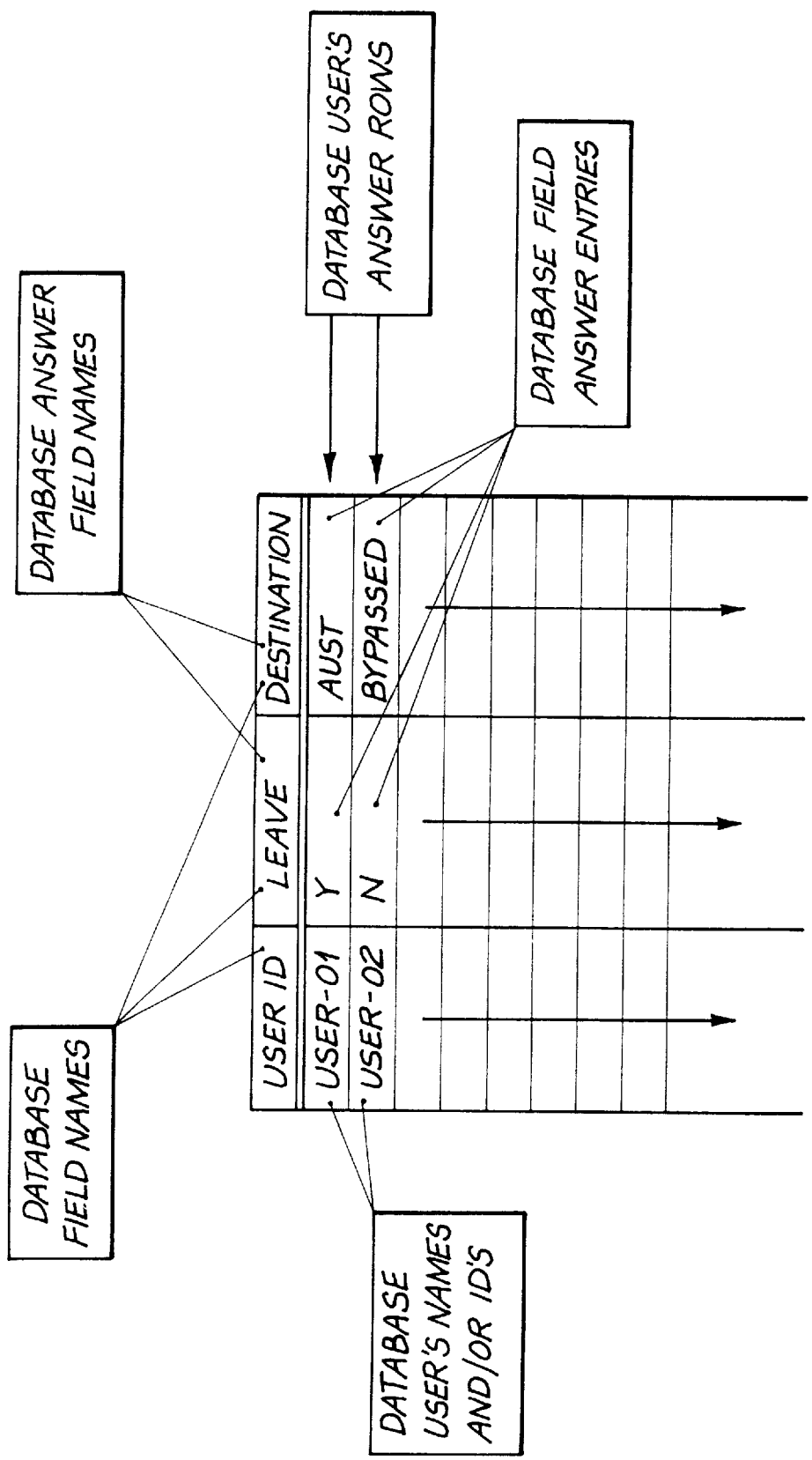
FIG. 14 is a schematic representation of a database document which may be prepared in accordance with an embodiment of the present invention.

See FIG. 14 for a diagrammatic representation of the database. The database is comprised of three columns and N+1 respondent (remote user) rows, where N is the number of respondents (remote users) (+1 is the row containing the column headings). The three columns include two columns for the two respective questions, and a column which contains respondent (remote user) ID. Note that a number of fields may be necessary for a users mail address. The columns and rows intersect in matrix form to provide database answer fields in the form of cells, for the entry of the appropriate field value as answer documents are processed.

Each remote processing apparatus may be configured with a "Survey User Module" or recipient module (response module) to enable preparation of an answer document in answer to the survey document. The Survey User Module will be installed either on the server that the respondent (remote user or recipient) is attached to in the network, or on the respondents (remote users) machine.

Alternatively, the recipient module may be transmitted with the survey document, so that a respondents users computer need not even be configured to be able to process the survey document. Instead, the recipient module transmitted with the survey document will configure the respondent users computer.

The respondent (remote user) will generally access the survey document through their normal electronic mail procedure. Where the respondent (remote user) is not connected to electronic mail, he may receive the survey document by another communications medium, eg. by normal mail, or by any other means. They will read the mail that has accompanied the survey document and then use their mouse to select and launch the survey document. On their screen will appear the question one (LEAVE) dialogue. They will use their mouse to select the option that applies to them. They will then click on next. Depending on their selection either the (FINISH) or the (DESTINATION) dialogue box will appear. Once they have answered all the questions the (FINISH) screen (FIG. 11) will appear thanking them for the involvement in the survey. Once they press Enter or click Finish all of their answers will be transmitted back to the Survey Collator Module automatically.

The local processing apparatus, in particular the Survey Collator Module is arranged to monitor incoming transmissions via electronic mail other means, even manual entry) to identify answer documents for the particular survey. The "Survey Collator Module" is applied to gather all the incoming responses and load them in the database. In the preferred embodiment, as described below with reference to FIG. 12, the Survey Collator Module has a number of functions, operation of which may be dictated by the collator (local user).

Note that the Survey Collator Module may be entered on a different processing apparatus to the processing apparatus which the author (local user) used to prepare the survey document. This arrangement will be particularly useful where the author (local user) makes heavy use of a particular computer and, although he may wish to prepare the survey document using that computer, he does not wish machine time to be taken up with collation of answer documents. He can therefore designate another machine to receive and collate the answer documents.

Survey Collator Module—As previously explained this module of the application gathers all the incoming responses and puts them in a database ready for analysis. When this module is first launched the collator (local user) must select the SURVEY/PROCESS menu. The collation process is automatic. An options menu is provided which enables the local user to select whether a particular survey should be "activated", "suspended" or "terminated". When a survey is "activated" the collator will automatically collate all response documents relating to that survey. When a survey is "suspended" (d1 in FIG. 12), the collator will receive and identify response documents relating to the survey but will not process them. It will merely store them. When a survey is "terminated" the collator will identify all response documents relating to that survey and delete them upon arrival.

The Survey/Process menu will now attempt to logon and start the collation process. On loading the collator module it will not start the collation process until the Survey/Process menu has been selected. The way that the collator gets to know about the surveys is when the first response document comes in. When this happens the collator puts its name up on the screen along with information relating to the last date and time it received an entry and the total number of entries it has received for that survey to date. The collator will continue to collate the "activated" survey entries until the local user "suspends" the process. The local user can also decide to "terminate" the survey, in which case all incoming responses will be deleted upon arrival (see later for description of "activated, suspended, and terminated"). All surveys will list on the screen regardless of which of the three states they are in. The local user could decide to delete a survey from the list. However, if an answer document comes in it will attempt to restart the collation process.

FIG. 12(a) illustrates the main Survey Collator Module screen of this embodiment. The Survey Collator Module can handle a plurality of different surveys, exemplified in FIG. 12(a) by "survey 1" and "survey 2" under "survey name".

Once the collator (local user) has done this the Survey Collator Module will automatically start the electronic mail if it is not already running and then start to scan for incoming responses.

On the screen the collator (local user) will notice that the Survey Collator Module tells him how many responses it has received and what percentage that amount represents of the total the survey document was sent to ("Total #", "# Read", "% Process"). The "total" and "percentage process" will only appear when the survey has been sent to a known list of respondents and a pre-populated database option has been chosen. Where the database is unpopulated, obviously the collator will not know how many respondents will be required to fill the database.

If after a few days the collator (local user) notices that the responses have slowed down to a trickle he may like to send all those who have not yet responded a quick reminder. This can be done automatically by selecting the SURVEY/REMIND menu option (FIG. 12 (b)). Having done this the collator (local user) will be asked to type a brief reminder message. Once the collator (local user) presses Enter or Clicks OK the Survey Collator Module will interrogate the nominated survey database and send the mail to all the non-respondents. This should prompt a few more to respond to the survey. However, if in a few more days the collator (local user) still has not received all the responses he may select SURVEY/RE-SEND menu (FIG. 12 (c)). This works the same way as REMIND but along with a message from the collator (local user) it will retransmit the survey document.

Once the collator (local user) is happy with the number or percentage of the responses received he can de-activate the survey document by selecting the SURVEY/TERMINATE menu option (FIG. 12(d) and 12(e)). This means that Survey Collator Module will discard all responses for this survey from now on. The database will contain audience responses for each user. If the respondent (remote user) does not respond this may be indicated in an extra database column (the "respond column").

There is also the option of gathering various information available automatically on the E-Mail system. For example, postcodes, telephone numbers, etc. Various database columns would be prepared to receive this automatically gathered information, which would not be part of the survey document received by the remote user. Further options include date/time stamping depending on the time the answer-document-was received and/or the ability to log whether this is a reply to an original survey or a reply to a reminder or a reply to a re-sent survey. Appropriate database columns would be required.

FIG. 12(g) illustrates "Options" available with the survey collator.

Figure 13:
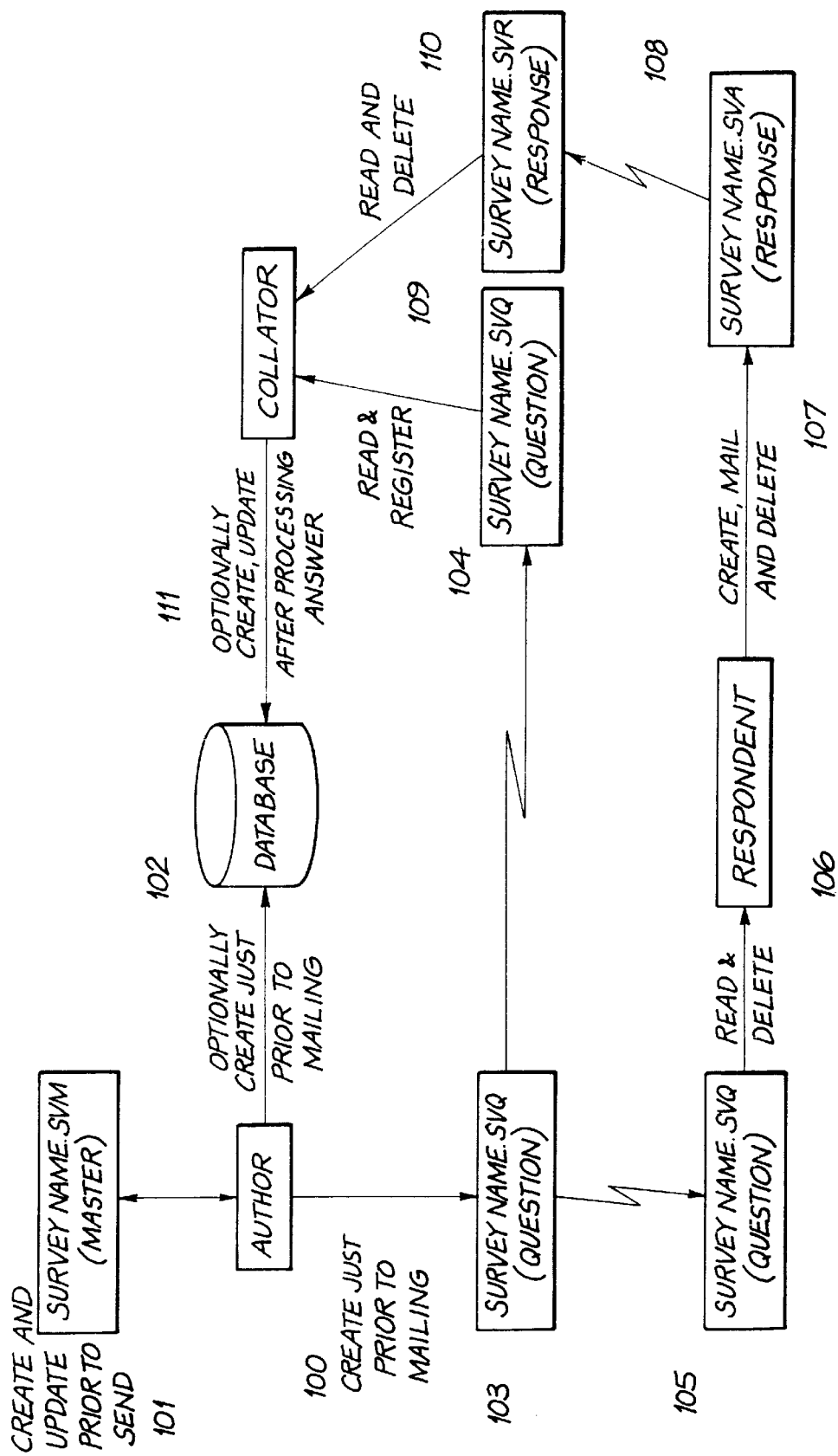
FIG. 13 is a functional diagram of operation of an embodiment of the present invention.

FIG. 13 shows a functional diagram of the survey system. The functional diagram shows in brief the steps discussed above of operation of the apparatus and method in accordance with the embodiment discussed above. At 100 the author creates a survey with a survey name 101 and mails it out to a remote user 105. Further, just prior to mailing of the survey, the database is created at 102, the questionnaire is prepared at 103, and the questionnaire is mailed to the Collator at 104.

At the remote user end of the system, at 106 the user reads and processes the survey and creates an answer document at 107 and sends 108 by mail back to the collator.

At the local user end, at 109 the collator reads the questionnaire and notes the existence of the survey in its register. Later at 110 the collator reads the answer document and updates the database at 111 with the answer.

In operation, when the survey document has been completed prior to transmission it is a master. The document sent out is a subset of the survey master, known as the SVQ. The SVQ is saved for subsequent re-transmission, e.g., if reminders are required. At the point that the local user selects the FILE/SEND survey MENU OPTION from the file menu they are offered a dialogue box requesting them to name the SVQ file that is about to be sent out. The default name is that of the SVM. Once the local user has either selected a new name for the SVQ or accepted the default name the local user will be offered another dialogue box asking for them select the database type that they would like to create for this survey to be collated into (see above). As discussed above, at this point the local user will be asked for either a database name and/or table name. The default will be whatever the SVQ was named, although the local user can change it. The safeguard here is that the local user will not be able to select an existing database name or table name within an existing database.

Note that the SVQ is also preferably saved in collator, as reminders will most probably be sent from them.

One advantageous feature of a preferred embodiment of the invention, as briefly discussed above relates to the naming of the database column headings when a question and allowable answer utilise a numeric field grid or check box grid. For example, referring to FIG. 6, which illustrates a check box grid, it will be appreciated that there are 16 possible answers (check box cells) to this question. If the remote user has more than one car, he may check more than one cell. Sixteen database columns are therefore required. Manually choosing a name for each of these database columns would be laborious. To overcome this problem, the apparatus and method of a preferred embodiment of the present invention automatically designate database column headings which are formed from components of the column and row grid headings. For example, the name for the database column heading corresponding to the top left hand corner check box cell may automatically be set at "sedan 4". Similarly with the rest of the check box cells. This naming technique can also be applied for a numeric field grid. The column heading may be formed from combining the entire column and row headings of the grid, as above, by combining components of both of them, or by using the column or row heading only or a component thereof.

For option button grids, where only one option is allowed to be chosen, in a preferred embodiment of the invention, as discussed briefly above, it is only necessary for the database to contain one database column, no matter the number of possible answers. In this case, the database field value to be entered in the database column in dependence on the remote users answer is chosen from components of the column and row headings of the grid. With the option buttons grid therefore, the actual field value to be entered is named from the headings of the rows and columns of the grid box cell selected. As discussed previously, option button grids may include a series of sub-groups requiring the remote user to select a single option item in each of the sub-groups. In this case, as many columns in the database will be required as their are sub-groups.

An advantageous feature of a preferred embodiment of the invention allows the database to be fully loaded prior to the survey document being sent out, in order to test whether the apparatus can accommodate the fully loaded database.

In the embodiment described above, when the remote user receives the survey document (SVQ) and processes it on his apparatus to produce an answer document (SVR), the SVR is sent back and the original mail message and the SVQ are deleted or the remote user is told to delete, so that they cannot be used again by the remote user. A further option exists for the Survey Author (local user) however, to provide an instruction that tells the remote users not to delete the SVQ when the answer document is sent back. This enables a requirement for regular information (weekly, monthly, quarterly) to be met by the remote user by simply re-running the SVQ on a regular basis. If such an option is utilised, the databases prepared to include a "time received" database column to indicate a time at which the particular answer document is received from the particular user.

The following is a description of the structure of a software implementation of the preferred embodiment of the present invention, a working example of which has been explained above generally from the point of view of user operation of the embodiment.

Software code has not been listed. The following description of the software modules and the various "features" they are required to execute will be sufficient, together with the following descriptions of the various documents (survey master document, survey question document and survey response document), and the previous description of the functions of the system, to enable a person skilled in the art to construct software.

This description does not describe the specifics of the user interface, as, except where certain operational rules are enforced, the specifics are fundamentally irrelevant to the description of the current embodiment. The operational rules will be covered at the end of this description.

The computer language used within this description when detailing structures is generic, but a person skilled in the art will easily be able to convert these details to an appropriate computer language.

Overview

The preferred embodiment is composed of three separate but related software modules:

Survey Authoring Module—herein known as the Author (local user)

Survey Recipient Module—herein known as the Recipient (remote user)

Survey Collating Module—herein known as the Collator (local user)

In the current embodiment all three modules are designed as Microsoft Windows applications, having been written and complied in Microsoft Visual C++ using Microsoft's MFC Class Library. All three modules interface to Microsoft E-Mail through the MAPI interface. Both the Author and the Collator modules access databases through Microsoft ODBC interface, allowing the system to work with almost all available databases.

Standard programming techniques have been used as much as possible to allow portability to other systems that support MFC.

There are three areas where slightly non-standard techniques have been used:

1. The presentation of the dialogue boxes in the Respondent module (and equally their presentation in test mode within the Author module) utilises a Windows feature of being able to present a dialogue box from a template in memory instead of the usual method of presentation from a static resource. This allows dynamic control of the appearance and content of the dialogue boxes from information stored in the questionnaire (SVQ).

2. At the point when the survey questionnaire is to be mailed to the remote users the Respondent module (Response Exe) is pre-pended to the actual questionnaire document (SVQ), given the 'file-name' of the survey master document (SVM) and the extension 'Exe'.

It should be noted that the SVQ is a C++ 'object', and to achieve data persistence its MFC archiving methods are used both to write it at the Author, and to reload it at Respondent.

When the remote user runs the composite file, the Respondent module start-up-code offsets the file pointer in the MFC standard archive read method to point to the SVQ section of itself. It then loads the data to 're-instantiate' itself, processes the data through the normal SVQ methods and presents the questions to the user. The composite file transmitted to the Respondents operates as a true 'object' with encapsulated SVQ data.

(Note that an 'object', as will be understood by a skilled person, is a collection of executable methods that are specific to the encapsulated data types and structure (an 'instance' of which is held within the object), and (generally) those methods are the only way for external agents (people or processes) to operate on that data).

3. Following on from (2) above, the final size of the composite file is largely determined by the number of executable SVQ methods which are mailed with the SVQ data. To increase efficiency through the E-Mail system the size of the composite file should be as small as possible. By using conditional compiles on the SVQ object, a common minimal 'set' is used by the Respondent module, while the full 'set' is available to the Author module.

The common minimal set will be a matter of choice of the skilled person, who will be able to establish the minimal set of methods required to run the SVQ by the respondent module.

The Author Module

The main functions of the Author module are the design of the questionnaire, preparation of an appropriate database, and the transmission of the questionnaire to the remote users.

All Author functionality is derived from the Survey Master Document (SVM) methods.

Note: the SVM contains the Survey Questionnaire Document (SVQ) inside itself so that all SVQ methods are available to the Author. Further the SVQ contains an array of 'Question-Box objects' inside itself so that all Question-Box methods are available to the Author. The data members for the SVM/SVQ/Question-Box 'objects' and the functionality of the more relevant methods are detailed below.

The Menu structure, as will be realised from the preceding description, is based as closely as possible on Microsoft 'Office' products to achieve the highest degree of user interface compatibility with Microsoft standards and therefore facilitating ease of use.

The user interface for the dialogue box editing used in the creation of the question boxes is preferably based on several Microsoft and Borland 'dialogue editors'. Other techniques could be used.

One of the underpinning interface design criteria has been to shield the Author user from the need to have any knowledge about databases.

The Author module generates default database field names based on the Question names, e.g., user question name as the field name. Users can change the database field names if they wish but there is no need to do so.

The database field types required are, in this preferred embodiment, deliberately limited to Boolean (Logical), Text and Numeric. Except for 'Numeric' fields, the other types are automatically deduced by the Author module, and the user is shielded from the need to set the database field types. For 'Numeric' fields the database field types default to 'Integer' but the user may change them to 'Decimal' (assumed 2 places) if they wish.

The database field length is automatically deduced for Boolean and Numeric fields, and a default calculation is performed for the length of Text fields based on the length of the field on the users's screen (which may be set by the survey author, as discussed previously).

In the interests of making life easier for the user various 'features' are designed into the system for the preferred embodiment.

For the Quenstion's goto directives the Author defaults to a system specific value of '{Next}'. When a new Question is added, the Author module automatically retrofits the new Question's name into the previous Question's goto directives if they were set to '{Next}'.

Equally if the user changes the names of a Question all other questions are scanned to see if any of the other Quenstion's goto directives point to the current Question, and if so, their goto directives are changed to reflect the new names.

The scan test (part of the author module) tests for as wide a range of errors possible:

1. 'Orphan' or 'Cul-de-sac' questions.
2. Question Box text which has not been changed from the system default 'Question Text for Question No. 001'.
3. Item (Option Buttons, Check Boxes, and Labels) text which has not changed from the system defaults ('Option Button Text 01', 'Check Box Text 01', and 'Label 01' respectively).
4. Duplicate database field names.
5. Any missing fields.

The author module automatically checks for missing, or duplicate or illegal database table names at the point of creation of the survey database.

A wide range of system defaults exist for the user to set the default size and position of the Question Box, default values for all the items, default values for the 'Never Seen Value' and the default goto directive.

The author automatically generates the last Question ('{FINISH}') when a new survey document is created.

When the user decides to mail out the survey to the remote users the following sequence occurs:

1. The user is presented with a list of E-Mail users (via the MAPI mail interface) for the remote users (or groups of remote users) to be selected.
2. The user is presented with a suitable 'Subject and Note' dialogue box to advise the remote users about the survey.
3. The user is presented with a list of E-Mail users (via the MAPI mail interface) for the Collator E-Mail address to be selected.
4. The user is presented with standard ODBC dialogues for the selection (or creation) of the Data Set Name (DSN) for the required database.
5. This is followed by a dialogue box where the user is asked to enter the 'table name' for the survey (defaults to the name of the survey).
6. The table is created in the ODBC database.
7. The SVQ section of the SVM is written to disk.
8. Respondent module (Response Exe) is pre-pended to the SVQ, given the 'file-name' of the Survey Master Document (SVM) and the extension 'Exe'.
9. The 'composite object' of Response Exe and the SVQ is mailed to the selected respondents (and to the Collator E-Mail address) via the E-Mail system.

The Respondent Module

The composite file, containing both the Response Exe (the executable methods for the SVQ) and the SVQ 'persistent data', appear as an executable file attached to the E-Mail message containing the 'Subject and Note' texts (mentioned in the Author module above). When the is user launches the attached executable its start-up-code offsets the file pointer in the MFC standard archive read method to point to the SVQ data section of itself. It then loads the data to 're-instantiate' itself, processes the data through the 'common minimal set' of SVQ methods and presents the questions to the user. The answers are stored in the SVQ as the user works through the questionnaire. When the user finally exits the '{Finish}' terminating question, the answers are copied to the Survey Response Document (SVR).

As there may be hundreds (or thousands) of SVR documents arriving at the Collator's E-Mail address, the size of the SVR is extremely important. For this reason the SVR has been created separately from the SVQ. While the SVR's data members are exact copies of the associated data members in the SVQ the number of members is reduced to the bare essentials—see below for a description of the SVR structure.

Collator

The Collator works with 3 document types:

1. Its own 'survey register' document, which is a list of current surveys including relevant associated information—see below.
2. The Survey Questionnaire document (SVQ).
3. The Survey Response Document (SVR).

The Collator's main function is to read incoming survey response documents (SVR) and update (or add) the respondents answer information to the appropriate ODBC database.

The Collators other functions are:

1. To read incoming survey questionnaire documents (SVQ) and register the new survey in the Collator's 'register'.
2. To send reminders to entries in a pre-populated database that have not yet responded (i.e., the Mail Received Date field is still set to the default).
3. To re-send the Survey Questionnaire Document (SVQ) to E-Mail users that request a resend, or to entries in a pre-populated database that have not yet responded (i.e., the Mail Received Date field is still set to default).

Outside of the methods available to Collator through the document 'objects' that it is 'aware' of, the Collator is a straight forward and simple program.

Upon starting the Collator reads the E-Mail message queue to ascertain if there are any relevant messages of it.

Figure 12:
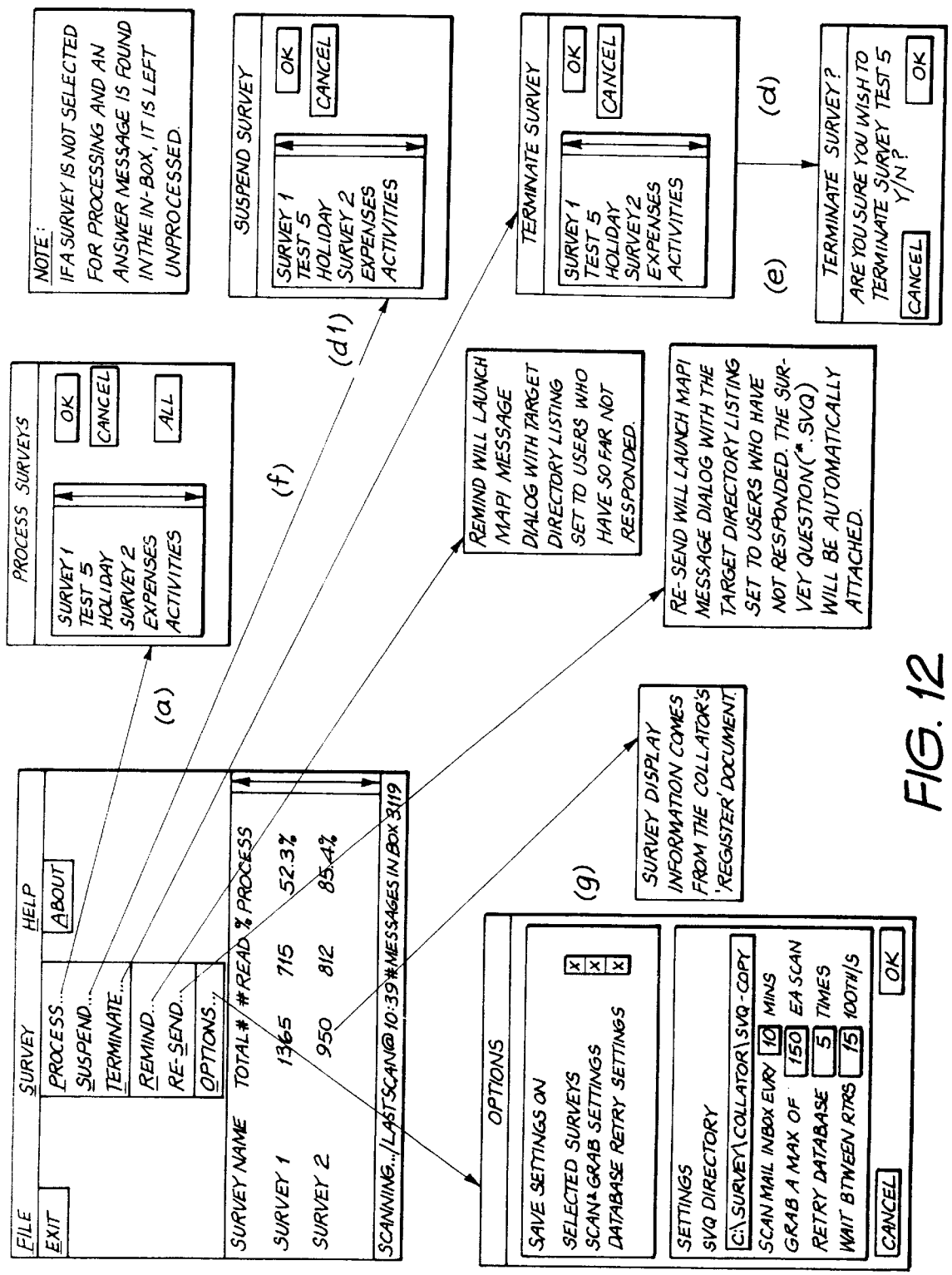
FIG. 12 illustrates a number of displays which may be presented by a display means of an apparatus in accordance with an embodiment of the present invention, illustrating operation of a collation means in accordance with an embodiment of the present invention.

If there are no relevant messages it goes to 'sleep' for a period of time controlled through its user definable options (see FIG. 12).

If there are messages to process then it sits in a loop reading and processing messages up to a number specified again in its user definable options (see FIG. 12), or until there are no more messages to process, where upon it will put itself to 'sleep' again.

If it has been 'asleep', it will re-enter the loop as if it had just started.

When it processes an SVR (assuming the associated survey has been registered) it will update the appropriate database and delete the E-Mail message containing the processed SVR.

When it processes an SVQ it will register the new survey in its 'register' and copy the SVQ to a user definable directory for safe keeping. The surveys are registered with a default status of 'Active' but the user may choose to set that initial status to 'Suspended' to have manual control over when surveys are processed.

Collator E-Mail Messages

The Collator monitors the E-Mail in-tray. It searches for 2 types of E-Mail messages.

1. The copy of the Survey Questionnaire Document (SVQ) sent by the Authoring module at questionnaire transmission time, and
2. The Survey Response Documents (SVR) returned by the respondents (remote users).

Both these messages are coded with a signature so that they can be picked out from the normal E-Mail that may arrive. The signature indicates what types of message they are, but not which particular survey or database they belong to. Collator has to open the messages and read them to ascertain that specific information.

Collator Survey Status

Collator maintains a 'register' where all the current and recent surveys that it is 'aware' of are listed. Each survey has an associated status as discussed previously:

1. Active—the survey is being processed normally. The responses are being read, the database is being updated or added to and the read messages are being deleted once they have been successfully processed.
2. Suspended—the survey responses are ignored. Collator reads the message, ascertains that the survey is in a suspended state and advances to read the next E-Mail message. This state is set to temporarily isolate the database from the incoming E-Mail. This is useful for accessing the database before the survey is terminated, for staged analysis or repair. A suspended survey can either be re-activated or terminated. A survey may optionally be set to suspended the instant that it is registered.
3. Terminated—the survey is concluded. Any E-Mail associated with this particular survey will be read to ascertain its identity and then deleted without any processing.

Collator Survey Registration

Collator registration occurs as a result of receiving either the SVQ or an SVR E-Mail message for a survey that has not yet been 'registered'. The survey is immediately stored in Collator's internal register, and the status is either set to 'Active' or 'Suspended' depending on the user options that have been set. A user may choose to set the 'Suspended-on-registration' option if the user wishes to set the survey 'cut-off' values before any of the responses are processed.

The associated database and the number of responses received is also stored in the register on a survey by survey basis.

If the default status for a newly registered survey is 'Active' but a problem occurs when the associated database is being accessed, the survey will be automatically placed in a suspended state with a message indicating that an error occurred linking to the database when the survey was being registered. The E-Mail message will remain in the in-tray in this case until it is able to be processed correctly, or unless its status is changed to 'Terminated'.

A survey entry in the Collator's register can be deleted if it is old and has been previously terminated. If an old response arrives after an entry has been deleted the Collator acts as if it is a new survey and will attempt to re-register the survey and to link to the database and process the response, unless the default registration option is to set a suspended state.

Collator Survey 'Cut-Off' Levels

If the survey is using a pre-populated database then the exact number of responses is known and a 'cut-off' level can be set in terms of either a 'percentage complete' or a specific number of responses. If the survey is not using a pre-populated database then the 'cut-off' level can only be set as a specified number of responses.

Once the 'cut-off' level is reached the survey status is immediately set to 'suspended'. The 'cut-off' level can be left empty and the Collator will continue to process until the survey is manually 'suspended' or terminated.

Collator Database Creation

An additional feature of the Collator and the format of the Survey Response Document (SVR) is that the database can be re-created from the information in the SVR. If the original database was pre-populated the fully populated database cannot be re-created, but the correct database structure can be reproduced and Collator, being aware of the 're-creation', can change the database 'updates' to 'additions'.

This has two main advantages:

If for any reason the original database has been corrupted, destroyed or lost, and a sufficient number of responses has not yet been processed, the Collator can re-create the database, and the Author does not have to burden the remote users to re-respond to a previous survey.

If the survey instigator is in a location physically removed from the original database, but wishes to run Collator and process the responses, a new database can be created.

Collator Options

The Collator can be set to process continually or to sleep for a range of minutes and then awaken to process a specified number of responses only.

The Collator 'resister' document structure

| WORD | wNumOFSurveys | Number of Surveys |
|---|---|---|
| WORD | wSleepMinutes | num of minutes to sleep |
| WORD | wMaximumGrab | max num SVRS to process |
| WORD | wDBNumOfRetries | max ODBC retries |
| WORD | wDBRetryWait | 100th secs between retries |
| STRING | strSVQPathName | SVQ directory name |
| BOOLEAN | bSortByName | sort by name or date |
| BOOLEAN | bAscending | sort ascending or descending |
| BOOLEAN | bHideTerminated | hide terminated from display |
| BOOLEAN | bSuspendOnRegister | suspend on registration |
| DATETIME | LastScan | timestamp of last scan |
| ARRAY | SurveyRegister | array of Survey info |

The Survey Register Structure

| WORD | wSurveyStatus | Status of the survey |
|---|---|---|
| WORD | wtotalResponses | total SVRs received |
| WORD | wProcessedResponses | number SVRs processed |
| WORD | wDeletedResponses | number SVRs deleted |
| WORD | wTotalRows | pre-populated total |
| WORD | wCutOffCount | holds cut off level |
| BOOLEAN | bRecreatedDatabase | indicates DB recreation |

-continued

| WORD | wNumOFSurveys | Number of Surveys |
|------|---------------|-------------------|
| BOOLEAN | bPrePopulated | indicates pre-populated DB |
| BOOLEAN | bRetainAfterReply | indicates SVQ is kept |
| DATETIME | tmRegistered | timestamp when registered |
| DATETIME | tmCurrentStatus | timestamp of current status |
| DATETIME | tmLastRead | timestamp of last SVR read |
| DATETIME | tmRemind | timestamp of last Reminder |
| DATETIME | tmResend | timestamp of last Resend |
| STRING | strSVQFileName | name of SVQ file |
| STRING | strSurveyName | full SVM pathfilename |
| STRING | strTableName | Name of the Table |
| STRING | strDataSetName | Data Set Name (DSN) |
| STRING | strDataSetConnection | Full DSN Connect string |
| ARRAY | DataSetDataTypeArray | Available Data Types Array |

The above-described modules access 3 document file formats collectively known as the Survey Documents:

1. the Survey Master Document (SVM),
2. the Survey Questionnaire Document (SVQ), and
3. the Survey Response Document (SVR).

The design of these Survey Documents underpins the Preferred embodiment. Whilst the preferred embodiment is implemented for MS Windows the design of the Survey Documents could easily be transferred to any computer system. The Survey Master Document (SVM) contains the Survey Questionnaire Document (SVQ), and also contains additional survey 'author' information not required in the questionnaire (SVQ) section. The Survey Response Document (SVR), contains the answers and sufficient information to link to the database and sufficient information to re-create the database in the case of a catastrophic error. The Survey Master Document (SVM)

The SVM is composed of four main sections:
1. The Survey Questionnaire Document (SVQ);
2. Subject and Note Texts;
3. Array of Recipients; and
4. Document defaults and options.

1) Survey Questionnaire Document (SVQ)

The following lists the document variables in order.

| String | strSurveyMasterPathName | PathName of this survey - long name for document |
|--------|-------------------------|--------------------------------------------------|
| BOOLEAN | bFlagPrePopulate | Pre-populate Database |
| BOOLEAN | bFlagRetainAfterReply | Retain SVQ after Reply |
| BOOLEAN | bFlagFollowup | Indicates secondary Survey |
| String | FirstQuestionName | The first one to start with |
| String | SelectedQuestionName | Currently selected Question Name |
| String | NextQuestionName | Next Question Name to be selected |
| WORD | NumofQuestions | Number of Questions in the survey |
| Strut | ReplyToInfo | The Collator's mail address |
| String | strTableName | Name of the Table |
| String | strDataSetName | Data Set Name (DSN) |
| String | strDataSetConnection | Full DSN Connection string |
| Array | DataSetDataTypeArray | Array of Data Types available |
| Array | QuestionsArray | Each element is a "QuestionBox" |

The following is a description of the document variables.

The strSurveyMasterPathName is the full pathname of the survey master document itself.

The bFlagPrePopulate indicates that a pre-populated database is being used. The default value of this flag is False. If True this flag has several implications;

1. the Survey Authoring Module will create and pre-populate the database with the E-Mail name and address, default mail received date and each question's 'bypass' values;
2. the Respondent Module will set the Survey Response Document (SVR) to 'update' and not 'insert' records to the database;
3. the Collating Module responds to received SVR with this flag set to true by displaying percentage received figures as well as numbers of responses received. Also the Collating module allows the use of 'reminds' and re-sends' if this flag is set to true; and
4. all three modules are aware that if this flag is set then the index on the database is unique only on the name and address, and does not include the mail received date. Equally, if this flag is false it indicates to all three modules that the database is indexed on name, address and mail date received, so as to allow multiple responses from each respondent.

The bFlagRetainAfterReply indicates to the Respondent Module that it should indicate to the remote user to keep the current Survey Questionnaire Document (SVQ) rather than delete it on completion. The default state of this flag is false.

The bFlagFollowUp indicates to the all modules that some of the mail addresses being used are from previous surveys and may no longer be valid on completion. The default state of this flag is false.

The FirstQuestionName stores the name of the question to be first selected from the QuestionsArray.

The SelectedQuestionName is simply a current storage place for the name of the current Question.

The NextQuestionName is loaded by the control logic with the name of the next Question to select.

The NumOfQuestions is simply a storage area to record the number of Questions in the survey.

The ReplyToInfo structure contains the E-Mail name and address to reply to the Collator via the E-Mail system. The structure contains:

| String | MailName |
|--------|----------|
| String | MailAddress |
| LONG | MailEntryIDSize |
| Array | MailEntryIDData |

The fields are specific to MS Mail, but can be extended for any electronic mail or electronic bulletin board systems. The purpose of these fields is to store the Collator's mail address in the message that is sent to the Respondents. Note the Collator's mail address may not be the same as the Author's mail address (see previous description). The Author selects the Collator's mail address just prior to the Survey Document being sent to the Respondents.

The strTableName contains the name of the table to use within the specified database.

The strDataSetName contains the DSN that specifies on the local user's computer which database to use. The DatabaseSystem is specific to MS ODBC, but can be extended for any database system.

The strDataSetConnection contains the full ODBC connection string that is the complete identification string required to access the ODBC database.

This facility is useful where the local user may require periodic update of the same survey, eg. political poling. Out of date information would be overwritten by the new information coming in from the remote users, and the database "date received" field would indicate the latest date which an answer has been received from the remote.

2. Subject and Note Texts

| String | MailSubjectText | E-Mail Subject Text |
|---|---|---|
| String | MailNoteText | E-Mail Note Text |

The MailToSelection stores the operator's selection of who the mail recipients are.

The MailsubjectText is a simple one line description of the mail being sent to the Recipient.

The MailNoteText is used for a description of the survey, read by the Recipient before they begin the survey.

3) Array of Recipients

The recipients data is exactly the same as reply to info accept that it is an array of them.

| Array | RecipientsArray | Each element is a "RecipientDate' |
|---|---|---|

Again the actual 'RecipientDate' structure implemented in the current embodiment is specific to MS mail, but can be extended for any electronic mail system.

Note this is not a fully expanded list—just simply what the operator chose. It may be any combination of individuals or E-Mail groups, or the E-Mail names and addresses of Respondents from previous surveys.

4. Document defaults and options

| WORD | wQuestionBoxLeftMargin |
|---|---|
| WORD | wQuestionBoxTopMargin |
| WORD | wQuestionBoxWidth |
| WORD | wQuestionBoxHeight |
| WORD | wQuestionTextWidth |
| WORD | wQuestionTextHeight |
| WORD | wQuestionTextLeftMargin |

The DataSetDataTypeArray is a list of the data types available for the chosen database. This information is used in the creation of the database.

The QuestionsArray is an Array of Question Box structures which contain all necessary information to present a question to the remote user. The 'QuestionBox' structure is explained after the description of the Survey Document's main sections (see 'The Question Box Structure' below).

Note: the Question Box array is accessed by use of the desired Question Box's 'RefName'; equally when a Question Box is placed in the array the 'RefName' is extracted from the Question Box structure and used as the index associated with the array.

Note that the bFlagPrePopulate flag is set to false where, for example, the Author is sending a survey to an electronic bulletin system.

As has previously been mentioned, application of the invention to a "bulletin system" would involve posting a Survey Questionnaire Document (SVQ) on a "bulletin board" for selection and answer by any user having access to the bulletin board. That is, the users would not be preselected for the Survey Document to be sent to. In such a case, the database size would depend upon the number of answers received to the Survey Document.

As discussed above bFlagRetainAfterReply flag when false indicates to the Recipient that it should erase the copy of the composite file when the Recipient has successfully sent back an answer (SVR). However if this flag is false then the SVQ may be preserved and used again. The bFlagRetainAfterReply flag when true also tells the Author and the Collator that each recipient may send more than one answer (SVR), and therefore an extra 'DateReceived' field is generated in the database. This extra field is used to make the answer rows in the database unique for indexing purposes, and also to track the arrival of each of the multiple answers.

| WORD | wQuestionTextTopMargin |
|---|---|
| WORD | wControlsLeftMargin |
| WORD | wItemsLeftMargin |
| WORD | wCentreQuestionText |
| String | strNeverSeenValue |
| String | strNeverSeenSelection |
| String | strOptionChosenValue |
| String | strOptionChosenSelection |
| string | strCheckBoxTrueValue |
| string | strCheckBoxTrueSelection |
| String | strCheckBoxFalseValue |
| String | strCheckBoxFalseSelection |
| String | strNumericFieldType |
| String | StrNumericTypeSelection |
| String | strGotoDlgName |
| String | strGotoDlgSelection |

These fields are used as a place to store Author defaults for the creation of each of the Question Boxes by the Author. They are a convenience for the operator of the system, but not relevant to this description.

The Question Box Structure Overview

From the Recipient's perspective a Question Box is simply a standard graphical user interface 'dialogue box' with:

1. The question text in an area at the top of the Question Box;
2. some user controls; either option buttons, check boxes, numeric data entry fields, or text data entry fields; and
3. two push buttons at the bottom of the Question Box, marked 'Previous' and 'Next'.

The Question Box structure must contain and/or achieve the following:

1. Sufficient information to display the Question Box via the graphical user interface;
2. define the Question Box's database field's name, type and size in the Author or Collator created database;
3. store the Recipient's answers in all the Question Box's database fields;
4. store the 'Never-Seen' values as the Recipient's answers in all the Question Box's database fields if the particular question is never asked due to Question Box 'branching';
5. store the 'Branch Control Language' script for this particular question if required (see later); and
6. define the name of the next Question Box to 'goto' depending on the user's current or previous answers.

To achieve this there is a three tiered structure:

1. The Question Box or header containing several 'GroupData' structures;
2. the 'GroupData' structures which in turn contains several 'ControlData' structures; and
3. the 'ControlData' structure.

These three structures are detailed after the next section.

Constants/definitions used by all three structures

Each control is assigned a 'TYPE' indicator. This is used to ensure consistency between the control and its Group. The controls are grouped by 'TYPE'.

```
define    CTL-TYPE-NULL              0x00000000L
define    CTL-TYPE-QUESTIONTEXT      0x10000000L
define    CTL-TYPE-NEXTPREVBUTTONS   0x20000000L
define    CTL-TYPE-OPTIONBUTTONS     0x00000001L
define    CTL-TYPE-CHECKBOX          0x00000002L
define    CTL-TYPE-NUMERIC           0x00000004L
define    CTL-TYPE-TEXT              0x00000008L
These defines indicate the 'TYPE' of each Group.

define    GRP-TYPE-NULL              0x00000000L
define    GRP-TYPE-QUESTIONTEXT      0x10000000L
define    GRP-TYPE-NEXTPREVBUTTONS   0x20000000L
define    GRP-TYPE-OPTIONSBUTTONS    0x00000001L
define    GRP-TYPE-CHECKBOX          0x00000002L
define    GRP-TYPE-NUMERIC           0x00000004L
define    GRP-TYPE-TEXT              0x00000008L
define    GRP-TYPE-GRID              0x00000100L
```

The Question Box needs to indicate what 'TYPEs' of group/controls it contains. Note;

1. The first 4 are simple types.
2. The 'GRID' is used in conjunction with the first 4 TYPEs to indicate which TYPE of 'grid' it is.

```
define    DLG-TYPE-NULL              0x00000000L
define    DLG-TYPE-BASE              0x30000000L
only PUSHBUTTONS & STATICTEXT define    DLG-TYPE-FINISH            0x30000000L
only PUSHBUTTONS & STATICTEXT define    DLG-TYPE-OPTIONBUTTONS     0x00000001L
define    DLG-TYPE-CHECKBOX          0x00000002L
define    DLG-TYPE-NUMERIC           0x00000004L
define    DLG-TYPE-TEXT              0x00000008L
define    DLG-TYPE-GRID              0x00000100L
```

Following defines are for masking out the 3 sets of TYPEs:

```
define    STANDARD-TYPES-MASK        0xF0000000L
Standard (StaticText & PushButtons)
define    ACTIVE-TYPES-MASK          0x000000FFL
Active (Option, Check, Numeric, Text)
define    COMPLEX-TYPES-MASK         0x0000FF00L
```

Complex (Grid and Combo indicators)

The ControlData Structure

The ControlData structure is mainly concerned with displaying the controls within the Question Box's dialogue; therefore they are based on MS Windows ControlData structure. However it is the additional fields that are important, as each graphical user interface will store its control's data slightly differently.

Also please note the standard MS Windows IDOK define is allocated to the 'Next' button, and the IDCANCEL to the 'Previous' button. This is pure convenience—any define will do.

Attributes as per MS Windows structure

| WORD | wX | X pos in dlg units |
|---|---|---|
| WORD | wY | Y pos in dlg units |
| WORD | wWidth | Width in dlg units |
| WORD | wHeight | Height in dlg units |
| WORD | wControlID | ID for messages from the control |
| DWORD | lControlStyle | Window Style - Option/Check, Default, Group etc |
| BYTE | bClassID | Class ID - Button, Edit, Static, etc |
| String | ControlText | Control Text |
| BYTE | bBytesToNextControl | Always null |

Attributes additional to MS Windows structure

| DWORD | lControlType | Type of Control (Option Button, Check Box, etc) |
|---|---|---|
| String | FieldValueSelected | Value of database-field if this Control is selected |
| String | ItemLabel | Name used to reference the control through the BCL |
| String | GotoQuestionName | See explanation below |

The lControlType is used to cross check the control within the parent group structure.

The FieldValueSelected holds the value to place in the database field should Control be selected by the Recipient's operator. Note this is only applicable to Option Buttons and Check Boxes, as Numeric Field and Text Field entries are not predetermined. The database field itself is in the parent group structure.

The ItemLabel field is used to name the control ('item' in the Author operators menu) so that it can be referenced by the 'Branching Control Language' (BCL—see later). The ItemLabel must be uniquely named within the Question Box but does not have to be unique across the whole Survey Document. The Author module will produce default labels based on the item type (Option Button, Check Box, Numeric Field, etc) and its sequence number within the Question Box.

The 'GotoQuestionName' field is known by four different names when referred to from outside the ControlData structure. These are:

1. GotoQuestionName — if the Control TYPE for this is a CTL-TYPE-OPTIONBUTTON, then this field contains the GOTO QuestionName, which will placed in the 'Next' buttons 'NextQuestionName' should the Recipient's operator select this control. The value (RefName) of the GotoQuestionName is chosen by the Author at design time.

2. NextQuestionName — if the Control ID for this is 'NEXT' ie ControlID - IDOK, then this field contains the GOTO Next QuestionName - chosen by the Author at design time or by the Recipient at runtime (if Option Buttons questions).

3. PrevQuestionName — if the Control ID for this is 'PREV' ie ControlID = IDCANCEL, then this field contains the previous QuestionName that the Recipient just came from (at runtime).

-continued

| 4. FieldValueUnChecked | if the Control TYPE for this is a CTL-TYPE-CHECKBOX, then the GOTO Name is Not Used ! However an extra 'UN-CHECKED' field value is required for a CheckBox - so this field is used to save space. |
|---|---|

The GroupData Structure

The GroupData structure is independent from the requirements of displaying a dialogue box through the graphical user interface. The GroupData structure contains all the information about a database field, and contains an array of the ControlData structures that are associated with that database field (which contain or will contain the Recipient's answer).

Each group contains ONE database-field, so:

1. There may be MANY Option buttons in a group.
2. There may only be ONE Check box in a group.
3. There may only be ONE Numeric Data Field in a group.
4. There may only be ONE Text Data Field in a group.

Attributes

```
DWORD        lGrpType
Specifies Group Type - Option, Check, Numeric, Text
CString DataBaseFieldName
DataBase Field Name for this group of control(s)
WORD         wDataBaseFieldType
DataBase Field Type
WORD         wDataBaseFieldLength
DataBase Field Length
String       NeverSeenFieldValue
Value for database field if never displayed to Recipient
String       ResultantFieldValue
Final Value for database field when selections made
WORD         wSelectedControlID
ID of the Control the Recipient selected
BYTE         bNumOfControls
Number of controls in the Group
Array        ControlDataArray
Each element is a 'ControlData'
```

The lGrpType specifies the Group Type (Option Button, Check Box, Numeric Field, etc.) and is used as a cross check against the Group's ControlData elements.

The DataBaseFieldName, wDataBaseFieldType, wDataBaseFieldLength are used in the creation of the database by the Author. Also these fields are used by the Collator when loading the Recipient's answers into the database. The DataBaseFieldName must be uniquely named across the whole Survey Document.

The NeverSeenFieldValue holds an Author designated value to be placed in the database field if the Question Box was never displayed to Recipient. When the Recipient first opens the Survey Document then the ResultantFieldValue (see next) is pre-loaded with the NeverSeenFieldValue. Equally the ResultantFieldValue are loaded with the NeverSeenFieldValue if the Recipient's operator presses the 'Previous' button thereby nullifying a selection.

The ResultantFieldValue holds the Recipient's answer to the question or the NeverSeenFieldValue field if the Question Box was never displayed to Recipient.

The wSelectedControlID holds the binary ID of the Control that the Recipient's operator selected. This is preserved in the answer document for debugging purposes, and allows the Recipient's selections to be replayed from the first Question Box.

The bNumOfControls tells the code accessing the Group structure the number of ControlData elements stored in the ControlDataArray (see next).

The ControlDataArray stores the 'ControlData' elements. Note that the mechanisms that store and retrieve ControlData elements from/to the ControlDataArray does a cross check of the Control's Type and the Group's Type.

The QuestionBox Structure

The QuestionBox structure is based on MS Windows DialogHeader structure. However it is the additional fields that are important, as each graphical user interface will store its dialogue's data slightly differently.

Attributes as per MS Windows structure

| DWORD | lQuestionStyle | Specifies the Dialogue's-Window Style |
|---|---|---|
| BYTE | bNumOfControls | Number of controls in the dlg box |
| WORD | wX | X pos in dlg units |
| WORD | wY | Y pos in dlg units |
| WORD | wWidth | Width in dlg units |
| WORD | wHeight | Height in dlg units |
| String | MenuName | Menu Name - usually nul |
| String | ClassName | Class Name - usually nul |
| String | Caption | Title. / Caption on the dlg window |
| WORD | wPointSize | Pointsize of loaded font |
| String | FontName | Name of loaded font |

Attributes additional to MS Windows structure

| DWORD | lQuestionType | Question Box Type |
|---|---|---|
| String | RefName | Question Box reference name |
| String | PrevRefName | Records where Recipient came from |
| String | NextRefName | Records where Recipient went to |
| String | GotoScript | Optional 'BCL' Script to be activated by 'Next' button. |
| WORD | wQuestionNumber | Records the Question creation sequence |
| WORD | wNumOfGroups | Number of Groups in the Question box |
| Array | GroupArray | Each element is a 'GroupData' |

The lQuestionType is used by this embodiment to restrict the Group 'TYPEs' per Question Box—i.e., only one group of Option buttons, or several Check box groups, but not a mixture of both. The 'lGrpType' sets the 'TYPE' of the Group and does not check for compatibility with its parent question box 'TYPE'—this restriction is controlled through the Question Box only—allowing for extensions to multiple group 'TYPEs' if required for other embodiments.

The RefName is used when accessing the desired Question Box within the Question Box array, equally when a Question Box is placed in the array the 'RefName' is extracted from the Question Box structure and used as the index associated with the array.

The PrevRefName is used to store which 'previous' Question Box's RefName the Recipient came from, so that if the Recipient's operator presses the 'Previous' button then the Recipient can return to the previous Question Box.

The NextRefName is used to store which 'next' Question Box's RefName the Recipient went to. This is preserved in the answer document for debugging purposes, and allows the Recipient's selections to be replayed from the first Question Box.

The GotoScript contains an optional 'BCL' (see below) program script to be activated by the 'Next' button. The 'Next' button can either:

Be loaded with the RefName of the next Question Box to branch to.

Cause (in the case of option buttons) the RefName of the next Question Box to be loaded from the selected Option Button's ControlData structure.

Cause, if the GotoScript is not null, the GotoScript to read and run to compute the RefName of the next Question Box.

Note, that the GotoScript if present will override any other goto logic that may have been implemented by the Author.

The wQuestionNumber records the sequence in which the Question Boxes were created, and is used to construct an initial computer generated RefName and Caption for each Question Box.

The wNumOfGroups stores the number of Groups in the Question Box's GroupArray.

The GroupArray contains 'GroupData' elements. Note that a variety of mechanisms exist for the storing and retrieving of GroupData elements in the GroupArray, including access with consideration of desired 'TYPE', etc.

The Survey Response Document (SVR)

The SRV is fundamentally a stripped down SVQ. It will be appreciated that having answered the questions we no longer need the question or answer texts. We simply need to store the answer values (bypassed or answered), the database field names, the database field types and the database field lengths. The strSurveyMasterPathName field of the SVQ is retained as it contains sufficient information to identify the survey for the Collator's needs. Equally the strTableName, strDataSetName, strDataSetConnection, and DataSet-DataTypeArray fields from the SVQ contain sufficient information to reconnect to or recreate the ODSC database created by the Authoring module.

The Survey Documents various stages

This description refers to FIG. 13.

At 103 when the Author operator chooses 'Send' the Author does the following steps:

1. The operator is asked to select an E-Mail address for the Collator, which is stored in the ReplyToInfo section of the Survey Questionnaire Document (SVQ) stored within the Survey Master Document (SVM).
2. The operator is presented with an E-Mail address selection dialogue. The operator selects various individuals and E-Mail groups. These selections are placed in the MailToSelection section of the Survey Master Document (SVM). As discussed previously, E-Mail addresses of respondents to previous surveys may also be selected.
3. The operator is also presented with a Mail Subject Text and Mail Note Text dialogue. These fields are placed in the Subject and Note Texts section of the Survey Master Document (SVM).
4. The MailToSelection is decoded by the Author into individual E-Mail addresses and stored in the Array of Recipients section of the Survey Document.
5. The database is then usually created, its reconnection information stored in the strTableName, strDataSetName, strDataSetConnection, and DataSet-DataTypeArray section of the Survey Questionnaire Document (SVQ), and a row for each of the Recipients (assuming bFlagPrePopulate is true) is preloaded with additional fields such as the Recipient's E-Mail name and MailID, and other fields as may be set by the Options section of the program.
6. If there is no room for the full database then the operation can be aborted without having sent the survey.
7. At this point the Author saves the Survey Document with its master extension .SVM.

At 100 the Survey Questionnaire Document (SVQ) section of the Survey Master Document (SVM) is extracted and written to disk, where it is combined with its associated 'methods' (Response Exe) to form a composite object (both data and executable code). The Mail Recipients and the Subject and Note texts are copied to the mail system for the SVQ to be sent to the respondents. At this point the SVQ is also mailed to the Collator E-Mail address.

At 105, 106, 107 and 108 assuming remote user completes the survey, the Respondent processes the SVQ via the following steps:

1. Executes the SVQ which reads itself and presents the questions to the remote user, storing the remote users answers in SVQ itself.
2. Builds the Survey Response Document (SVR) from information contained within the SVQ.
3. Using the Collator's Mail address information it activates the MS Mail transport to send Mail messages with the attached SVR.

At 110 and 111 the Collator processes the SVR via the following steps:

1. Reads and processes the Survey Response Document (SVR).
2. Checks that the answer is still valid for a current survey—i.e., that the associated survey exists in the Collator's register.
3. Assuming its still valid Collator updates (or inserts) the database fields with the appropriate answers extracted from each of the Question sections of the SVR.
4. Deletes the SVR and the associated message from the Mail queue.
5. After a certain number or percentage of returned answers, the operator will be alerted and may choose to terminate the survey by setting its status in the Collator's register. After this SVR's for this particular survey will be deleted after being identified rather than being fully processed.
6. Other features exist such as Collator sending reminders to non-responding Recipients and also resending the complete SVQ again if it has been lost by a Respondent.

Rules

1. When a new Question Box is added to the Survey Document it is created with an area at the top for the question text, and two buttons at the bottom labelled 'Next' and 'Previous'. These 3 user interface controls are regarded by the design of the Survey Document as non-active as they contain no operator selectable answers, or database field definition information.
2. Once a new Question Box is created n the Author module it is assigned a type of 'DLG-TYPE-BASE' which is a combination of DLG-TYPE QUESTION-TEXT and DLG-TYPE-NEXTPREVBUTTONS.
3. Once a new Question Box is created in the Author module with the type of 'DLG-TYPE-BASE' it can become any of the active or complex TPEs, however once one control is added, the Question Box becomes the TYPE of the first active/complex control. If another control type is added the question type will reflect that.
4. When a new Survey Document is created by the Author module it is made with a terminating Question Box labelled '(FINISH)'. This varies from the normal Question Box created in the Survey Document, in that it has only one button at the bottom of the Question Box. This button is labelled 'Finish'.

5. The Survey Document master SVM is the only version of the Survey which can be edited.
6. The table creation mechanism will not allow two tables with the same name to be created within a database. If a Survey Master Document is E-Mailed again it must first specify another tablename. This safeguards the integrity of the distributed survey.
7. Through the Collator, an operator may set the cut-off point based on the number or percentage of Recipient's Survey Document answers SVR that it wishes to process. At this point the Collator will automatically set the status of this particular survey to 'suspended'. Additional answer documents for this survey will remain in the 'in-tray' after this point has been reached in case the operator wishes to extend their chosen cut-off point.
8. Through the Collator an operator may terminate a survey by setting its status to 'terminated' in the Collator's internal register. As soon as the survey is terminated any answer documents for this survey will be erased by the Collator module.

'Branching Control Language' (BCL)

An embodiment may utilise "branching control language" to control branching between questions in the Survey Document. This is accessed through any given question box's property dialogue and stored in the 'Next' button's ControlData structure. The 'Next' button can either:

Be loaded with the RefName of the next Question Box to branch to.

Cause (in the case of option buttons) the RefName of the next Question Box to be loaded from the selected Option Button's ControlData structure.

Cause, if the GotoScript is not null, the GotoScript to read and run to compute the RefName of the next Question. Note if the GotoScript is present it will override any other goto logic that may have been implemented by the Author's operator.

The BCL allows two methods to access information from which to make branching decisions:

Through the DataBaseFieldName which is uniquely named across the whole Survey Document.

Through the ItemLabel field which is uniquely named within its Question Box.

The status of any control in any Question Box, or, the selected value of any database field can be interrogated by the language.

This script has a fairly simple syntax:

| IF | Questions(question reference) . 'item-label' =/<> condition |
|---|---|
| AND | Questions(question reference) . 'item-label' =/<> condition |
| OR | Questions(question reference) . 'item-label' =/<> condition |
| THEN | GOTO (specific question reference) |
| ELSE | GOTO (specific question reference) |
| ENDIF | |
| or: | |
| IF | Database('Database Field Name' =/<> value |
| AND | Database('Database Field Name' =/<> value |
| OR | Database('Database Field Name' =/<> value |
| THEN | GOTO (specific question reference) |
| ELSE | GOTO (specific question reference) |
| ENDIF | |

Where the AND/OR/ELSE sections are optional.

Where '=' represents equal to, and '<>' represents not equal to.

Where 'condition' is either 'True/Selected/On/Checked' or 'False/UnSelected/Off/UnChecked'.

Where 'value' is one of the possible values that the specific database field can be set to.

Both the selection status and the selected value syntaxes can be mixed together:

| IF | Questions(question reference) . item-label' =/<> condition |
|---|---|
| AND | Database('Database Field Name' =/<> value |
| THEN | GOTO (specific question reference) |
| ENDIF | |

At least the preferred embodiment enables formulation by the local user of a Survey Document which incorporates complex branching pathways between questions.

Generally, any question may include a branch to any other question in the document, depending on document structure design. There may be any number of complex pathways through the document, any of which may be followed by the remote user, depending upon his given answers.

The rule is that a question cannot refer to a preciously answered question, but can branch to all others. A branch can be triggered by any preceding answer or answers.

It will be appreciated that the present invention may vary from the specific features of the embodiment disclosed above. The invention has wide commercial application for information gathering purposes. It enables a use to ask any type of questions, any number of questions with any branching complexity, of hundreds or even thousands of users. Responses are automatically processed, the pertinent information extracted and loaded into an appropriate place in a database which is automatically constructed for the local user. The user can then analyse the information any way the he likes.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

```
////////////////////////////////////////////////////////////////////////
// Object Class Definition Appendix
// ---------------------------------
//
This appendix details the C++ header files for the object classes (data members & methods) that
form the three major documents types :
    Survey Master Document (SVM),
    Survey Questionnaire Document (SVQ), and
    Survey Response Document (SVR).
```

Each of the three modules (Author, Respondent & Collator) uses other classes not detailed herein.
The classes not covered by this appendix are specific to :
    the particular user interface implemented for display views,
    the particular E-Mail transport implemented,
    the particular database interface system implemented
in the current embodiment of the invention. As such their designs would vary from embodiment to embodiment.

The classes detailed here are those that underpin the 3 major document classes. Those document classes in turn
underpin the functionality of the Author, Respondent and Collator modules in the following relationships:
    class CQuestionnaire  - The Survey Questionnaire (SVQ) underpins Author and Respondent functionality.
    class CSurveyDoc      - The Survey Master Document (SVM) extends the SVQ for the Author module.
    class CResponseDoc    - The Survey Response Document (SVR) underpins Respondent and Collator functionality.

Whilst only the data member and method names (with occasional single line comments) is given, the names
of both the data members and the methods should be sufficiently 'English' and descriptive for their
function to be adequately understood.
Although only the definition of the data members methods are given when combined with the descriptions
in the rest of the Patent document, a person skilled in the art should be able to readily discern
how these methods would work, and be able to construct appropriate code to achieve the functionality of
those classes.

As these header files are used by more than one module (common to either two or three of the modules)
the following compile time definitions have been used to tailor the range of methods available
to each of the modules :
    SURVEY_AUTHOR    - set to one if the Author module is being compiled.
    SURVEY_USER      - set to one if the Respondent module is being compiled.
    SURVEY_COLLATOR  - set to one if the Collator module is being compiled.

The major underpinning document classes are detailed in the following order :

Class CRecipientData  - Object for storing E-Mail Names, Addresses and UniqueIDs (MS-Mail specific)
    Class CRecipients     - Object that is an Array of CRecipients class CDlgCtlData     - Object for storing all control (item) information

```
class CDlgGrpData       - Object for grouping CDlgCtlData objects, and also for holding database field information
class CDlgData          - Object for storing all the Question Box information - contains an array of CDlgGrpData objects Class CSurveyDataTypes  - Object for storing Survey's data type definitions
Class CDataSetDataType  - Object for storing ODBC's data type definitions (MS-ODBC specific)

class CQuestionnaire    - The Survey Questionnaire      (SVQ)
class CSurveyDoc        - The Survey Master Document    (SVM)

class CResponseGrpData  - Object for storing strip down information from an associated CDlgGrpData object.
class CResponseDlgData  - Object for storing strip down information from an associated CDlgData object.
class CResponseDoc      - The Survey Response Document (SVR)

///////////////////////////////////////////////////////////
///////////////////////////////////////////////////////////
///////////////////////////////////////////////////////////
```

```
////////////////////////////////////////////////////////////////
// Object Class Definition Appendix
//
//
This appendix details the C++ header files for the object classes (data members & methods) that
form the three major documents types :
        Suvey Master Document (SVM),
        Survey Questionnaire Document (SVQ), and
        Survey Response Document (SVR).

Each of the three modules (Author, Respondent & Collator) uses other classes not detailed herein.
The classes not covered by this appendix are specific to :
        the particular user interface implemented for display views,
        the particular E-Mail transport implemented,
        the particular database interface system implemented
in the current embodiment of the invention. As such their designs would vary from embodiment to embodiment.

The classes detailed here are those that underpin the 3 major document types used by this invention.

Whilst only the data member and method names (with occasional single line comments) is given, the names
of both the data members and the methods should be sufficiently 'English' and descriptive for their
function to be adequately understood.
Although only the definition of the data members methods are given when combined with the descriptions
in the rest of the Patent document, a person skilled in the art should be able to readily discern
how these methods would work, and be able to construct appropriate code to achieve the functionality of
those classes.

As these header files are used by more than one module (common to either two or three of the modules)
the following compile time definitions have been used to tailor the range of methods available
to each of the modules :
        SURVEY_AUTHOR       - set to one if the Author module is being compiled.
        SURVEY_USER         - set to one if the Respondent module is being compiled.
        SURVEY_COLLATOR     - set to one if the Collator module is being compiled.

The major underpinning document classes are detailed in the following order :

Class  CRecipientData    - Object for storing E-Mail Names, Addresses and UniqueIDs (MS-Mail specific)
        Class  CRecipients       - Object that is an Array of CRecipients class  CDlgCtlData       - Object for storing all control (item) information
        class  CDlgGrpData       - Object for grouping CDlgCtlData objects, and also for holding database field information
        class  CDlgData          - Object for storing all the Question Box information - contains an array of CDlgGrpData objects Class  CSurveyDataTypes  - Object for storing Survey's data type definitions
        Class  CDataSetDataType  - Object for storing ODBC's         data type definitions (MS-ODBC specific)

class  CQuestionnaire    - The Survey Questionnaire    (SVQ)
        class  CSurveyDoc        - The Survey Master Document  (SVM)
```

-78-

```
class CResponseGrpData    - Object for storing strip down information from an associated CDlgGrpData object.
class CResponseDlgData    - Object for storing strip down information from an associated CDlgData object.
class CResponseDoc        - The Survey Response Document (SVR)

//////////////////////////////////////////////////////////////////////
//////////////////////////////////////////////////////////////////////
//
// Class CRecipientData
//
class CRecipientData : public CObject
{
// Constructors / Destructor
// --------------------------
public:
    CRecipientData(CString    RecipientDataName,      // 'Friendly' Name of Recipient
                   CString    RecipientDataAddress);  // Address of Recipient CRecipientData(CString    RecipientDataName,      // 'Friendly' Name of Recipient
                   CString    RecipientDataAddress,   // Address of Recipient
                   DWORD      lRecipientUniqueIDSize, // Num of Bytes in Recipient UniqueID
                   CByteArray& RecipientUniqueIDData); // Recipient UniqueID CRecipientData(lpMapiRecipDesc pRecip);

virtual ~CRecipientData();                         // destructor

// Serialization
// -------------
    CRecipientData();                                  // create for serialization
    DECLARE_SERIAL(CRecipientData)

// Attributes
// ----------
protected:
    CString     m_strRecipientName;      // 'Friendly' Name of Recipient
    CString     m_strRecipientAddress;   // Address of Recipient
    DWORD       m_lRecipientUniqueIDSize;// Num of Bytes in Recipient UniqueID
    CByteArray  m_RecipientUniqueIDData; // Recipient UniqueID // Operations
// ----------
protected:

public:
```

SUBSTITUTE SHEET (Rule 26)

```
CRecipientData&    CRecipientData::operator=(const CRecipientData& Src);    // Assignment Operator
CRecipientData&    CRecipientData::operator=(lpMapiRecipDesc lpRecip);      // Special Assignment Operator void               Initialise();
BOOL               IsEmpty();

CString            GetRecipientName();
CString            GetRecipientAddress();
DWORD              GetRecipientUniqueIDSize();
void               GetRecipientUniqueIDData(CByteArray& RecipientUniqueIDData);
void               GetRecipientUniqueIDData(LPVOID pRecipientUniqueIDData);

void               SetRecipientName      (CString strRecipientName);
void               SetRecipientAddress   (CString strRecipientAddress);

void               SetRecipientUniqueIDData (CByteArray& RecipientUniqueIDData, DWORD lRecipientUniqueIDSize );

void               SetRecipientUniqueIDData (LPVOID      RecipientUniqueIDData, DWORD lRecipientUniqueIDSize );

// Implementation
// ----------
public:
    virtual void   Serialize(CArchive& ar);    // overridden for document i/o ifdef _DEBUG
public:
    virtual void   AssertValid() const;
    virtual void   Dump(CDumpContext& dc) const;
#endif
};

///////////////////////////////////////////////////////////////////
///////////////////////////////////////////////////////////////////
///////////////////////////////////////////////////////////////////
// Class CRecipients
//
class CRecipients : public CObject
{
// Constructors / Destructor
// ----------
public:
    CRecipients();

virtual        ~CRecipients();              // destructor

// Serialization
// ----------
```

-80-

```
protected:
    DECLARE_SERIAL(CRecipients)             // create for serialization only // Attributes
// ----------
protected:
    CObArray    m_RecipientArray;           // Each element is a "CRecipientData"

// Operations
// ----------
public:
    void            AddRecipient(CString strRecipientName, CString strRecipientAddress);
    void            AddRecipient(CRecipientData* pRecipientData);
    int             GetNumOfRecipients();
    CRecipientData* GetRecipientData(int nNum);
    void            DeleteRecipientArray();

// Implementation
// --------------
public:
    virtual void Serialize(CArchive& ar);   // overridden for document i/o ifdef _DEBUG
public:
    virtual void AssertValid() const;
    virtual void Dump(CDumpContext& dc) const;
endif
};

///////////////////////////////////////////////////////////////////////////////
///////////////////////////////////////////////////////////////////////////////
//
// class CDlgCtlData DEFINITION
// ----------------------------
//
// The DlgCtl is based around the creation of a dialog from a template
// in memory.
//
///////////////////////////////////////////////////////////////////////////////
/////////////////////////////////////////////////////////////////////////////// class CDlgCtlData : public CObject
{
public:
    CDlgCtlData (WORD   wX,                 // X pos in dlg units
                 WORD   wY,                 // Y pos in dlg units
                 WORD   wWidth,             // Width in dlg units
                 WORD   wHeight,            // Height in dlg units
```

```
              WORD     wCtlID,             // ID for messages from the control
              DWORD    lCtlStyle,          // Window Style - Radio, Default, Group etc
              BYTE     bClassID,           // Class ID - Button, Edit, Static, etc
              DWORD    lCtlType,           // Control Type
              CString  strCtlText);        // Control Text virtual  ~CDlgCtlData();               // destructor // Serialization
// ----------------
protected:
    CDlgCtlData();                         // create from serialization only
    DECLARE_SERIAL( CDlgCtlData )          // create from serialization only // Attributes as per ControlData structure
// ----------------

WORD     m_wX;              // x pos in dlg units
    WORD     m_wY;              // y pos in dlg units
    WORD     m_wWidth;          // Width in dlg units
    WORD     m_wHeight;         // Height in dlg units
    WORD     m_wCtlID;          // ID for messages from the control
    DWORD    m_lCtlStyle;       // Window Style - Radio/Check, Default, Group etc
    BYTE     m_bClassID;        // Class ID - Button, Edit, Static, etc
    CString  m_CtlText;         // Control Text
    BYTE     m_bBytesToNextCtl; // Always null // Attributes additional to ControlData structure
// ----------------

DWORD    m_lCtlType;            // Control Type (holds Survey's definition)

WORD     m_wCtlSeqNumber;       // Ctl's creation sequence number

WORD     m_wAssociatedCtlID;    // Associated Ctl's ID (usually Edit to Static)

CString  m_SelectedFieldValue;  // Value for db-field if this ctl selected

CString  m_GotoDlgName;         // Dlg to goto if this ctl selected
                                    // Note :
    //                              //    if the Control ID for this
    //         NextDlgName;         //    is 'NEXT' ie CtlID == IDOK,
                                    //    then this field contains the
                                    //    GOTO Next DlgName - chosen
                                    //    by the Author at design time
                                    //    or by the User at runtime
                                    //    (if Option Buttons questions).

//         PrevDlgName;         // Note : if the Control ID for this
```

-82-

```
                                      //     Is 'PREV' ie CtlID == IDCANCEL,
                                      //     then this field contains the
                                      //     previous DlgName that the User
                                      //     just came from (at runtime).
                                      //
                                      // Note :
                                      //     if the Control ID for this is a
                                      //     CHECKBOX - then the GOTO Name
                                      //     is Not Used !
    //                                //     However we require an extra
        UncheckedFieldValue;          //     "UN-CHECKED" field value for a
                                      //     CheckBox - so we use this field
                                      //     to save space (& add confusion).

CWnd *      m_pCtlWnd;            // ptr to Ctl's CWnd
    int         m_nSelectState;

// Operations
// ----------
protected:
public:
    CDlgCtlData&  CDlgCtlData::operator=(const CDlgCtlData& Src); // Assignment Operator if SURVEY_AUTHOR
    void    ImportData(CString LineBuffer);
endif // SURVEY_AUTHOR void    BuildTemplate(CByteArray *DlgTemplate, int n);

WORD    GetXpos()                       { return m_wX;           }   // X pos in dlg units
    WORD    GetYpos()                       { return m_wY;           }   // Y pos in dlg units
    WORD    GetWidth()                      { return m_wWidth;       }   // Width in dlg units
    WORD    GetHeight()                     { return m_wHeight;      }   // Height in dlg units DWORD   GetCtlStyle()                   { return m_lCtlStyle;    }
    void    SetCtlStyle( DWORD New )        { m_lCtlStyle = New;     }

BYTE    GetClassID()                    { return m_bClassID;     } int     GetCommandID()                  { return (int) m_wCtlID; }
    void    SetCommandID(int nCtlID)        { m_wCtlID = (WORD) nCtlID; }

CString GetGotoDlgName()                { return m_GotoDlgName;  }
    void    SetGotoDlgName(CString New)     { m_GotoDlgName = New;   }

CString GetCtlText()                    { return m_CtlText;      }
    void    SetCtlText(CString CtlText)     { m_CtlText = CtlText;   }
```

SUBSTITUTE SHEET (Rule 26)

-83-

```
CString      GetSelectedFieldValue()           ( return m_SelectedFieldValue; )
void         SetSelectedFieldValue(CString New )
                                                ( m_SelectedFieldValue = New; )

CString      GetOptionChosenValue()            ( return m_SelectedFieldValue; )
void         SetOptionChosenValue(CString New )
                                                ( m_SelectedFieldValue = New; )

CString      GetCheckedFieldValue()            ( return m_SelectedFieldValue; )
void         SetCheckedFieldValue(CString New )
                                                ( m_SelectedFieldValue = New; )

DWORD        GetCtlType()                      ( return m_lCtlType; )
void         SetCtlType( DWORD New )           ( m_lCtlType = New; )

int          GetCtlSeqNumber()                 ( return (int) m_wCtlSeqNumber; )
void         SetCtlSeqNumber( int nNew )       ( m_wCtlSeqNumber = (WORD) nNew; )

int          GetAssociatedCtlID()              ( return (int) m_wAssociatedCtlID; )
void         SetAssociatedCtlID( int nNew )    ( m_wAssociatedCtlID = (WORD) nNew; )

int          GetSelectState()                  ( return m_nSelectState; )
void         SetSelectState(int nState)        ( m_nSelectState = nState; )

// -----------------------------------------------------------------------
// Specials : See Note re 'm_GotoDlgName' above
// -----------------------------------------------------------------------

CString      GetNextDlgName();
CString      GetPrevDlgName();
CString      GetUnCheckedFieldValue();

void         SetNextDlgName          ( CString NextDlgName         );
void         SetPrevDlgName          ( CString PrevDlgName         );
void         SetUnCheckedFieldValue( CString UnCheckedFieldValue );

// -----------------------------------------------------------------------

// Implementation
public:
    virtual void Serialize(CArchive& ar);   // overridden for document i/o ifdef _DEBUG
    virtual void AssertValid() const;
    virtual void Dump(CDumpContext& dc) const;
endif
};
/////////////////////////////////////////////////////////////////////////
/////////////////////////////////////////////////////////////////////////
/////////////////////////////////////////////////////////////////////////
```

SUBSTITUTE SHEET (Rule 26)

```
////////////////////////////////////////////////////////////////////
////////////////////////////////////////////////////////////////////
// class CDlgGrpData DEFINITION
// -----------------------------
//
// The DlgGrp is a Survey construct - independant from the requirements
// of creating a dialog from a template in memory.
//
// Each group contains ONE db-field, so :
// 1) There may be MANY Option buttons in a group
// 2) There may only be ONE Check box in a group
// 3) There may only be ONE Numeric field in a group
// 4) There may only be ONE Text field in a group
// 5) There may be MANY Labels in a group
//
////////////////////////////////////////////////////////////////////
class CDlgGrpData : public CObject
{
// Constructors / Destructor
// --------------------------
public:
    CDlgGrpData(DWORD      lGrpType,
                BYTE       bNumOfCtls);     // Specifies Group Type - Option, Check, Numeric or Text, etc
                                            // Number of controls in the Group virtual    ~CDlgGrpData();              // destructor // Serialization
// --------------
protected:
    CDlgGrpData();                          // create from serialization only
    DECLARE_SERIAL(CDlgGrpData)             // create from serialization only // Attributes
// -----------
protected:
    DWORD       m_lGrpType;                 // Specifies Group Type - Option, Check, Numeric or Text, etc
    BYTE        m_bGrpNumOfCtls;            // Number of controls in the Group CString     m_DatabaseFieldName;        // Database Field Name for this (control) / (group of controls)
    WORD        m_wDatabaseFieldType;       // Database Field DataType - Survey's Data Type - Not ODBC Type
    WORD        m_wDatabaseFieldLen;        // Database Field Length - Used only for 'Text' fields
    CString     m_FieldValueResult;         // Final Value for dbfield when selections have been made
    CString     m_NeverSeenValue;           // Value for dbfield if never displayed to user
    WORD        m_wFieldSequenceNum;        // Database Field Sequence Order For Writing To Final OutPut File
    WORD        m_wSelectedCtlID;           // ID of the Control the User Selected CObArray    m_CtlArray;                 // Each element is a "CDlgCtlData"
```

```
// Operations
// ----------
public:
    CDlgGrpData&    CDlgGrpData::operator=(const CDlgGrpData& Src);    // Assignment operator void            BuildTemplate(CByteArray *ByteArray);
    WORD            GetGrpNumOfCtls()              { return m_bGrpNumOfCtls;    }
    DWORD           GetGrpType()                   { return m_lGrpType;         }
    CString         GetNeverSeenValue()            { return m_NeverSeenValue;   }
    CString         GetFieldValueResult()          { return m_FieldValueResult; }
    CString         GetDatabaseFieldName()         { return m_DatabaseFieldName;}
    CString         GetDatabaseFieldType()         { return m_wDatabaseFieldType;}
    WORD            GetDatabaseFieldLen()          { return m_wDatabaseFieldLen;}
    WORD            GetFieldSequenceNum()          { return m_wFieldSequenceNum;}
    WORD            GetSelectedCtlID()             { return m_wSelectedCtlID;   } void            SetNeverSeenValue      (CString  NeverSeenValue)       m_NeverSeenValue      = NeverSeenValue;
    void            SetFieldValueResult    (CString  FieldValueResult)     m_FieldValueResult    = FieldValueResult;
    void            SetDatabaseFieldName   (CString  DatabaseFieldName)    m_DatabaseFieldName   = DatabaseFieldName;
    void            SetDatabaseFieldType   (WORD    wDatabaseFieldType)    m_wDatabaseFieldType  = wDatabaseFieldType;
    void            SetDatabaseFieldLen    (WORD    wDatabaseFieldLen)     m_wDatabaseFieldLen   = wDatabaseFieldLen;
    void            SetFieldSequenceNum    (WORD    wFieldSequenceNum )    m_wFieldSequenceNum   = wFieldSequenceNum;
    void            SetSelectedCtlID       ( WORD   wSelectedCtlID )       m_wSelectedCtlID      = wSelectedCtlID;
    void            InitFieldValueResult()                                 m_FieldValueResult    = m_NeverSeenValue;

CDlgCtlData*    GetCtlNum(int nCtlNum);
    CDlgCtlData*    GetCtlWithCtlID(int nIDCtl);

void            AddCtlToGrp(CDlgCtlData*& pCtlData, int nCtlSeqNumber);
    void            RemoveCtlFromGrp(CDlgCtlData*& pCtlData);
    void            RemoveAllCtlsFromGrp();
    BOOL            RemoveCtlIDFromGrp(int nIDCtl);

BOOL            IsGrpActive()         { return BOOL (m_lGrpType & ACTIVE_TYPES_MASK);    }
    BOOL            IsGrpInterActive()    { return BOOL (m_lGrpType & INTERACTIVE_TYPES_MASK); }
    BOOL            IsGrpQuestionText()   { return BOOL (m_lGrpType & GRP_TYPE_QUESTIONTEXT); }
    BOOL            IsGrpNextPrevButtons(){ return BOOL (m_lGrpType & GRP_TYPE_NEXTPREVBUTTONS); } virtual void    Serialize(CArchive& ar);    // overridden for document I/o

// Implementation
// --------------
public:
#ifdef _DEBUG
    virtual void    AssertValid() const;
    virtual void    Dump(CDumpContext& dc) const;
#endif
};
//////////////////////////////////////////////////////////////////////////////
//////////////////////////////////////////////////////////////////////////////
```

```
///////////////////////////////////////////////////////////////////////////
///////////////////////////////////////////////////////////////////////////
// class CDlgData DEFINITION
//
//
class CDlgData : public CDialog
{
// Constructors / Destructor
//
public:
         CDlgData(CString RefName);    // Dlg Name Constructor
virtual  ~CDlgData();                  // destructor // Serialization
//
protected:
         CDlgData();                   // create from serialization only
         DECLARE_SERIAL(CDlgData)      // create from serialization only // Attributes
//
protected:
// Attributes as per DialogBoxHeader structure
//
DWORD   m_lDlgStyle;        // Specifies the Dialog-Window Style
BYTE    m_bDlgNumOfCtls;    // Number of controls in the dlg box
WORD    m_wX;               // X pos in dlg units
WORD    m_wY;               // Y pos in dlg units
WORD    m_wWidth;           // Width in dlg units
WORD    m_wHeight;          // Height in dlg units
CString m_MenuName;         // Menu Name - usually nul
CString m_ClassName;        // Class Name - usually nul
CString m_Caption;          // Title / Caption on the dlg window
WORD    m_wPointSize;       // always used as DS_SETFONT in "lDlgStyle"
CString m_FontName;         // always used as DS_SETFONT in "lDlgStyle"

// Attributes additional to DialogBoxHeader structure
//
DWORD   m_lDlgType;         // Surveys Dialog-Type - RB, CHK, GRID, COMBO
WORD    m_wNumOfGrps;       // Number of Grps in the dlg box
CString m_RefName;          // user's reference name - typically the same as m_Caption WORD    m_wModalFlag;       // Flag indicating its modal or modeless
CString m_PrevName;         // Records where user came from
CString m_NextName;         // Records where user went to
WORD    m_wDlgNumber;       // Records the Dlg creation sequence
WORD    m_wLastCClSeqNum;   // Records the Controls creation sequence numbers
```

-87-

```
         CObArray      m_GrpArray;              // Each element is a "CDlgGrpData"

// Non-serialised members
// ----------------------
CByteArray     m_ByteArray;                     // internal template
HGLOBAL        m_hTemplateMemory;               // Copy of handle for destructor
void FAR *     m_pTemplateMemory;               // pointer to template in memory // Operations
// ----------
protected:
   void        DumpTemplate();
   long        BuildTemplate(DWORD lDlgStyle = 0L);
   void        LoadTemplate( DWORD lDlgStyle = 0L);

public:
   CDlgData&   operator=(const CDlgData& Src);   // Assignment Operator

DWORD       GetDlgStyle()                     ( return m_lDlgStyle;           )
   void        SetDlgStyle( DWORD New )          ( m_lDlgStyle = New;            )
   DWORD       GetDlgType()                      ( return m_lDlgType;            )
   void        SetDlgType( DWORD New )           ( m_lDlgType = New;             )
   WORD        GetX()                            ( return m_wX;                  )
   void        SetX( WORD New )                  ( m_wX = New;                   )
   WORD        GetY()                            ( return m_wY;                  )
   void        SetY( WORD New )                  ( m_wY = New;                   )
   WORD        GetWidth()                        ( return m_wWidth;              )
   void        SetWidth( WORD New )              ( m_wWidth = New;               )
   WORD        GetHeight()                       ( return m_wHeight;             )
   void        SetHeight( WORD New )             ( m_wHeight = New;              )
   CString     GetDlgName()                      ( return m_RefName;             )
   void        SetDlgName( CString New )         ( return m_wPointSize;          )
   WORD        GetPointSize()                    ( return m_wPointSize;          )
   void        SetPointSize( WORD New )          ( m_wPointSize = New;           )
   CString     GetFontName()                     ( return m_FontName;            )
   void        SetFontName( CString New )        ( m_FontName = New;             )
   CString     GetPrevName()                     ( return m_PrevName;            )
   void        SetPrevName(CString New)          ( m_PrevName = New;             )
   void        ClrPrevName()                     ( m_PrevName.Empty();           )
   CString     GetNextName()                     ( return m_NextName;            )
   void        SetNextName(CString New)          ( m_NextName = New;             )
   void        ClrNextName()                     ( m_NextName.Empty();           )
   WORD        GetDlgNumber()                    ( return m_wDlgNumber;          )
   void        SetDlgNumber(WORD New)            ( m_wDlgNumber = New;           )
   int         GetLastCtlSeqNum()                ( return (int) m_wLastCtlSeqNum;)
   void        SetLastCtlSeqNum(int nNew)        ( m_wLastCtlSeqNum = (WORD) nNew;)
   CString     GetCaption()                      ( return m_Caption;             )
   void        SetCaption(CString New)           ( m_Caption = New;              )
   void        AddGroup(WORD wGrpNum, DWORD lGrpType);
   void        AddControl(WORD wGrpNum, CDlgCtlData*& pCtlData);
   void        RemoveGroup(CDlgGrpData*& pGrpData);
   int         GetNumOfGrps()                    ( return (int) m_wNumOfGrps;    )
```

```
int         GetNumOfActiveGrps(DWORD lWantedGrpType);
int         IsDuplicateOptionValue();
int         IsDuplicateOptionValue(int nCtlID, CString strFieldValue);
void        InitAllActiveGrps();
void        SetFirst();
void        ClearFirst();
int         GetDlgNumOfCtls()                    { return m_bDlgNumOfCtls;
int         GetGrpNumber(CDlgGrpData* pGrpData);

CDlgGrpData*  GetGrpWithCtlID(int nIDCtl);
CDlgCtlData*  GetCtlWithCtlID(int nIDCtl);

BOOL        IsDlgDisplayed();
CDlgGrpData* GetGrpFromGrpNum(int nWantedGrpNum);

#if SURVEY_AUTHOR

BOOL        ScanGroups();
void        ImportData(CString ImportPathName);

BOOL GetGrpDescriptions(WORD    wWantedGrpNum,          // Base 1
                        int     nSelectedCtlID,
                        CString& GroupDescription,
                        CString& ControlDescription,
                        CString& DatabaseFieldName,
                        CString& NeverSeenValue,
                        CString& FieldValueResult,
                        CString& SelectedFieldValue,
                        CString& GotoDlgName);

endif // SURVEY_AUTHOR ifdef _DEBUG
void        ShowValues(CString DescWhere);
#endif  // _DEBUG

// Implementation
//-------------
public:
    virtual void Serialize(CArchive& ar);    // overridden for document i/o ifdef _DEBUG
public:
    virtual void AssertValid() const;
    virtual void Dump(CDumpContext& dc) const;
endif
};
////////////////////////////////////////////////////////////////////////
////////////////////////////////////////////////////////////////////////
////////////////////////////////////////////////////////////////////////
////////////////////////////////////////////////////////////////////////
```

-89-

```
///////////////////////////////////////////////////////////////////
///////////////////////////////////////////////////////////////////
// Class CSurveyDataTypes
// ---------------------
class CSurveyDataTypes : public CObject
{
// Constructors / Destructor
// -------------------------
public:
    CSurveyDataTypes();
    virtual    ~CSurveyDataTypes();          // destructor // Attributes
// ----------
protected:
    CStringArray  m_strDataTypeArray;
    CWordArray    m_wDataTypeArray;

// Operations
// ----------
public:
    WORD     GetDataTypeWordFromString(CString strDatabaseFieldType);
    CString  GetDataTypeStringFromWord(WORD wDatabaseFieldType);
    int      GetNumberOfDataTypes();

// Implementation
// --------------
#ifdef _DEBUG
public:
    virtual void AssertValid() const;
    virtual void Dump(CDumpContext& dc) const;
endif
};

///////////////////////////////////////////////////////////////////
///////////////////////////////////////////////////////////////////
// Class CDataSetDataType
// ----------------------
class CDataSetDataType : public CObject
{
// Constructors / Destructor
// -------------------------
```

-90-

```
public:
    CDataSetDataType(CString strDataSetTypeName,      // (1) The DSN's DataType Name
                     WORD    wODBCDataType,           // (2) The ODBC DataType Number
                     CString strPrecision,            // (3) The DSN's Precision
                     CString strCreateParams    );    // (6) The DSN's Create Params str virtual        ~CDataSetDataType();               // destructor // Serialization
// -------------
protected:
    CDataSetDataType();                               // create for serialization only
    DECLARE_SERIAL(CDataSetDataType)                  // create for serialization only // Attributes
// ----------
protected:
    CString    m_strDataSetTypeName;                  // (1) The DSN's DataType Name
    WORD       m_wODBCDataType;                       // (2) The ODBC DataType Number
    CString    m_strPrecision;                        // (3) The DSN's Precision
    CString    m_strCreateParams;                     // (6) The DSN's Create Params str // Operations
// ----------
public:
    CDataSetDataType&  CDataSetDataType::operator=(const CDataSetDataType& Src);   // Assignment Operator int        GetDataTypeLevel(WORD wSurveyDataType);
    CString    GetDataSetTypeName()  { return m_strDataSetTypeName; }
    WORD       GetODBCDataType()     { return m_wODBCDataType;      }
    CString    GetPrecision()        { return m_strPrecision;       }
    CString    GetCreateParams()     { return m_strCreateParams;    } void       SetDataSetTypeName(CString strDataSetTypeName)   ( m_strDataSetTypeName = strDataSetTypeName; )
    void       SetODBCDataType(WORD wODBCDataType)              ( m_wODBCDataType      = wODBCDataType;      )
    void       SetPrecision(CString strPrecision)               ( m_strPrecision       = strPrecision;       )
    void       SetCreateParams(CString strCreateParams)         ( m_strCreateParams    = strCreateParams;    )

// Implementation
// --------------
public:
    virtual void  Serialize(CArchive& ar);            // overridden for document i/o ifdef _DEBUG
public:
    virtual void  AssertValid() const;
    virtual void  Dump(CDumpContext& dc) const;
#endif
};
//////////////////////////////////////////////////////////////////////////
//////////////////////////////////////////////////////////////////////////
```

-91-

```
////////////////////////////////////////////////////////
////////////////////////////////////////////////////////
////////////////////////////////////////////////////////
// class CQuestionnaire DEFINITION
//
class CQuestionnaire : public CObject
{
friend class CSurveyDoc;                    // Declare CSurveyDoc as a friend // Serialization
//
public:
    CQuestionnaire();                       // create for serialization only
    DECLARE_SERIAL(CQuestionnaire)          // create for serialization only // Attributes
//
protected:

// The Document Reference Name
    //
    CString    m_strSurveyMasterPathName;   // Name of this survey - long name for document // The Document Flags & Options
    //
    BOOL       m_bFlagPrePopulate;          // Pre-Populate Database - 'Update' instead of 'Insert'
    BOOL       m_bFlagRetainAfterReply;     // Keep for later use - effects DB index to include date received
    BOOL       m_bFlagFollowUp;             // Used when running from an previous survey
    BOOL       m_bFlagSpare;                // Spare // The DLG Info Follows
    //
    CString    m_strFirstDlgName;           // the first one to start with
    CString    m_strSelectedDlgName;        // Currently selected Dlg Name
    CString    m_strPreviousDlgName;        // Previously selected Dlg Name CMapStringToOb m_DlgMap;                // Each element is a "CDlgData"

WORD       m_wNumOfDlgs;                // Number of Dlgs in the survey
    WORD       m_wNextQuestionNum;          // Storage for Next Question Num
    WORD       m_wNextDBFieldNum;           // Storage for Next DB Field Num // The E-MAIL Info Follows
    //
    CRecipientData m_MailReplyToInfo;       // E-Mail Reply To Info // The DSN Info Follows
```

```
//   -----------
CString      m_strTableName;              // Name of this survey's Table within the Data Set
CString      m_strDataSetName;            // Name of this survey's Data Set
CString      m_strDataSetConnection;      // Completed Connection String for this Data Set
CObArray     m_DataSetDataTypeArray;      // Each element is a "CDataSetDataType"

// Font Info Follows
//   -----------
WORD         m_wPointSize;                // always used as DS_SETFONT in '1DlgStyle'
CString      m_strFontName;               // always used as DS_SETFONT in '1DlgStyle'

// DataBase Options
//   -----------
WORD         m_bFieldLendBaseCompliant;

// The Following Data Members are not serialized
//   -----------

CDlgData *   m_pSelectedDlg;              // ptr to currently selected Dlg
int          m_nCurrentQuestionNum;       // Storage for Current Question Num CSurveyDataTypes m_SurveyDataTypes;

// Operations
//   -----------
protected:
BOOL         GetSelectedDlg(CString &DlgName, CDlgData*& pDlgData);
POSITION     GetFirstDlgPos();
void         GetNextDlg(POSITION& pos, CDlgData*& pDlgData);
BOOL         IsDlgSelected();
BOOL         DeleteDlgSub(CString &strDlgName);

public:
// first In-line
//   =========

CString      GetSurveyMasterPathName()                         { return m_strSurveyMasterPathName; }
void         SetSurveyMasterPathName(CString strSurveyMasterPathName) { m_strSurveyMasterPathName = strSurveyMasterPathName; }

BOOL         GetFlagPrePopulate()          { return m_bFlagPrePopulate; }
BOOL         GetFlagRetainAfterReply()     { return m_bFlagRetainAfterReply; }
BOOL         GetFlagFollowUp()             { return m_bFlagFollowUp; }
BOOL         GetFlagSpare()                { return m_bFlagSpare; } void         SetFlagPrePopulate      (BOOL bNew) { m_bFlagPrePopulate      = bNew; }
void         SetFlagRetainAfterReply (BOOL bNew) { m_bFlagRetainAfterReply = bNew; }
void         SetFlagFollowUp         (BOOL bNew) { m_bFlagFollowUp         = bNew; }
void         SetFlagSpare            (BOOL bNew) { m_bFlagSpare            = bNew; }

WORD         GetNumOfDlgs()                { return m_wNumOfDlgs; }
```

```
WORD        GetNextQuestionNum()                            { return m_wNextQuestionNum; }
CString     GetFirstDlgName()                               { return m_strFirstDlgName; }
BOOL        IsFirstDlgSelected()                            { return ! m_strFirstDlgName.IsEmpty(); }
CString     GetSelectedDlgName()                            { return m_strSelectedDlgName; }
CString     GetPreviousDlgName()                            { return m_strPreviousDlgName; }

CString     GetTableName()                                  { return m_strTableName; }
CString     GetDataSetName()                                { return m_strDataSetName; }
CString     GetDataSetConnection()                          { return m_strDataSetConnection; }
void        SetTableName(CString strTableName)              { m_strTableName       = strTableName; }
void        SetDataSetName(CString strDataSetName)          { m_strDataSetName     = strDataSetName; }
void        SetDataSetConnection (CString strDataSetConnection) { m_strDataSetConnection = strDataSetConnection; }

// then normal
// ========== void        DeleteContents();
int         CopyDlgToDoc(CDlgData* pDlgData, BOOL bOverWrite, int &nListAction);
BOOL        CopyDlgFromDoc(CString &strDlgName, CDlgData* pDlgData);

void        GetMailReplyToInfo(CRecipientData &ReplyTo);
void        ReportSaveLoadException(const char* pszPathName, CException* e, BOOL bSaving, UINT nIDPDefault);

//=================================================================================================
// BEGIN : SURVEY AUTHOR ONLY Methods
//=================================================================================================
if SURVEY_AUTHOR // first In-Line
// =============

WORD        GetDataTypeWordFromString( CString strDatabaseFieldType )
            { return m_SurveyDataTypes.GetDataTypeWordFromString( strDatabaseFieldType ); }

CString     GetDataTypeStringFromWord( WORD wDatabaseFieldType )
            { return m_SurveyDataTypes.GetDataTypeStringFromWord( wDatabaseFieldType ); } int         GetNumberOfDataTypes()
            { return m_SurveyDataTypes.GetNumberOfDataTypes(); }

WORD        GetPointSize()                                  { return m_wPointSize; }
void        SetPointSize( WORD New )                        { m_wPointSize = New; }

CString     GetFontName()                                   { return m_strFontName; }
void        SetFontName( CString New )                      { m_strFontName = New; }

// DataBase Options
// ----------------
BOOL        GetFieldLendBaseCompliant()                     { return m_bFieldLendBaseCompliant; }
```

```
void         SetFieldLendBaseCompliant(BOOL bNew)     ( m_bFieldLendBaseCompliant = bNew; )

// then normal
// ========== void         SetFirstDlgName( CString &strDlgName);
void         RetrofitNextGotoDlgName(int         nEntrySequenceNumber);
void         RetrofitDeletedDlgName(CString &strDeletedDlgName, CString &strGotoDlgName);
BOOL         DeleteDlg(CString &strDlgName, CString &strGotoDlgName);
int          RenameDlgInDoc(CDlgData* pDlgData);

int          GetNextFieldSequenceNum();
void         SetNextFieldSequenceNum(int nFieldSeqNum);

void         GetNextNameFromEntrySeqNum(int nCurrentEntrySequenceNumber, CString &strDlgName);
void         GetPreviousNameFromEntrySeqNum(int nCurrentEntrySequenceNumber, CString &strDlgName);
int          GetPreviousEntrySequenceNumber(int nCurrentEntrySequenceNumber);
void         RetrofitChangedDlgName(CString &strOldDlgName, CString &strNewDlgName);

BOOL         IsDuplicateDatabaseFieldName(CString &strDlgName,
                                          int      nGrpNum,
                                          CString &strDatabaseFieldName);

void         InitAllActiveGrps();

// Display List Stuff Follows:
// ---------------------------
int          InitDlgsSelectionList(CListBox *pListBox, CString &CurSelection);
int          InitDlgsSelectionList(CListBox *pListBox, CString &CurSelection, int nSelectStyle);

void         SetDlgsFont();
void         InitQuestionnaire();

// E-Mail Stuff
// ------------
void         SetMailReplyToInfo(CRecipientData &ReplyTo);

// SVQ Save Stuff
// --------------
BOOL         SaveQuestionnaire(const char* pszPathName);

// ODBC DataTypes Stuff
// --------------------
void         AddDataSetDataType(CDataSetDataType*& pDataSetDataType);

#endif // SURVEY_AUTHOR

//======================================================================
// END ; SURVEY AUTHOR ONLY Methods
//======================================================================
```

```
//==========================================================================
// START : SURVEY-RESPONSE ONLY Code
//==========================================================================
if SURVEY_USER void    BuildSurveyResponseFile(CString &strMailDocFileName);
    BOOL    OpenQuestionnaire( const char* pszPathName );

#endif // if SURVEY_USER
//==========================================================================
// END : SURVEY-RESPONSE ONLY Code
//========================================================================== void    DeleteDataSetDataTypeArray();

// Implementation
public:
    virtual  ~CQuestionnaire();
    virtual void  Serialize(CArchive& ar);    // overridden for document i/o
#ifdef _DEBUG
    virtual void  AssertValid() const;
    virtual void  Dump(CDumpContext& dc) const;
#endif
};

///////////////////////////////////////////////////////////////////////
///////////////////////////////////////////////////////////////////////
///////////////////////////////////////////////////////////////////////
// class CSurveyDoc DEFINITION
// ---------------------------
//
class CSurveyDoc : public CDocument
{
protected: // create from serialization only
    CSurveyDoc();
    DECLARE_DYNCREATE(CSurveyDoc)

// Attributes
// ----------
protected:
    // The Document Type & Status
    // --------------------------
    LONG    m_lDocumentType;              // Document Type & Status
```

```
// The Questionnaire Document
// ---------------------------
CQuestionnaire m_SVQ;

// The E-MAIL Info Follows
// -----------------------
CString      m_strMailSubjectText;      // E-Mail Subject Text
CString      m_strMailNoteText;         // E-Mail Note Text
CRecipients  m_Recipients;              // The Recipients Object - Each element is a "CRecipientData"

// The ODBC Info Follows
// ---------------------
CObArray     m_DataSetDataTypeArray;    // Each element is a "CDataSetDataType"

// Question Box Options
// --------------------
WORD         m_wQuestionBoxLeftMargin;
WORD         m_wQuestionBoxTopMargin;
WORD         m_wQuestionBoxWidth;
WORD         m_wQuestionBoxHeight;
WORD         m_wQuestionTextWidth;
WORD         m_wQuestionTextHeight;
WORD         m_wQuestionTextLeftMargin;
WORD         m_wQuestionTextTopMargin;
WORD         m_wItemsLeftMargin;
WORD         m_wCentreQuestionText;

// Default Values
// --------------
CString      m_strNeverSeenValue;
CString      m_strNeverSeenSelection;
CString      m_strOptionChosenValue;
CString      m_strOptionChosenSelection;
CString      m_strCheckBoxTrueValue;
CString      m_strCheckBoxTrueSelection;
CString      m_strCheckBoxFalseValue;
CString      m_strCheckBoxFalseSelection;
CString      m_strNumericFieldType;
CString      m_strNumericTypeSelection;
CString      m_strGotoDlgName;
CString      m_strGotoDlgSelection;

// View Options
// ------------
BOOL         m_bDisplayToolBar;
BOOL         m_bDisplayStatusBar;
WORD         m_wEditStayOnTop;

// Properties Dialog Position
// --------------------------
WORD         m_wOptionButtonProperties_Xpos;
WORD         m_wOptionButtonProperties_Ypos;
```

```
WORD        m_wCheckBoxProperties_Xpos;
WORD        m_wCheckBoxProperties_Ypos;
WORD        m_wNumericFieldProperties_Xpos;
WORD        m_wNumericFieldProperties_Ypos;
WORD        m_wAlphaNumericProperties_Xpos;
WORD        m_wAlphaNumericProperties_Ypos;
WORD        m_wStaticTextProperties_Xpos;
WORD        m_wStaticTextProperties_Ypos;
WORD        m_wQuestionBoxProperties_Xpos;
WORD        m_wQuestionBoxProperties_Ypos;

// The Following Data Members are not serialized
// ----------------------------------------------

CSize       m_sizeDoc;

CObArray    m_DisplayInfoArray;   // Each element is a "CDisplayInfo"
int         m_nCurrentInfoRow;    // Currently Selected 'Row' in Info Array
int         m_nListType;          // Type of List For CSurveyView Display // Operations
// ----------
protected:
void        EmptyDlgsDisplayList();

public:
// first In-Line
// =============

CQuestionnaire *GetQuestionnaire()           ( return &m_SVQ; )

CSize       GetDocSize()                     { return m_sizeDoc; }
LONG        GetDocumentType()                { return m_lDocumentType; }

BOOL        GetFlagPrePopulate()             { return m_SVQ.m_bFlagPrePopulate; }
BOOL        GetFlagRetainAfterReply()        { return m_SVQ.m_bFlagRetainAfterReply; }
BOOL        GetFlagFollowUp()                { return m_SVQ.m_bFlagFollowUp; }
BOOL        GetFlagSpare()                   { return m_SVQ.m_bFlagSpare; } void        SetFlagPrePopulate      (BOOL bNew)  { m_SVQ.m_bFlagPrePopulate      = bNew; }
void        SetFlagRetainAfterReply (BOOL bNew)  { m_SVQ.m_bFlagRetainAfterReply = bNew; }
void        SetFlagFollowUp         (BOOL bNew)  { m_SVQ.m_bFlagFollowUp         = bNew; }
void        SetFlagSpare            (BOOL bNew)  { m_SVQ.m_bFlagSpare            = bNew; }

CString     GetSurveyMasterPathName()        { return m_SVQ.m_strSurveyMasterPathName; }
void        SetSurveyMasterPathName(CString strSurveyMasterPathName)
              { m_SVQ.m_strSurveyMasterPathName = strSurveyMasterPathName; }

WORD        GetNumOfDlgs()                   { return m_SVQ.m_wNumOfDlgs; }
CString     GetFirstDlgName()                { return m_SVQ.m_strFirstDlgName; }
```

-98-

```
BOOL        IsFirstDlgSelected()            { return ! m_SVQ.m_strFirstDlgName.IsEmpty(); }
CString     GetSelectedDlgName()            { return m_SVQ.m_strSelectedDlgName; }

CString     GetPreviousDlgName()            { return m_SVQ.m_strPreviousDlgName; }

CString     GetMailSubjectText()            { return m_strMailSubjectText; }
CString     GetMailNoteText()               { return m_strMailNoteText   ; } int         GetMailSubjectTextLength()
                { return m_strMailSubjectText.GetLength(); }
int         GetMailNoteTextLength()
                { return m_strMailNoteText.GetLength(); }

CString     GetTableName()                  { return m_SVQ.m_strTableName; }
void        SetTableName(CString strTableName)      = strTableName;
                { m_SVQ.m_strTableName CString     GetDataSetName()                { return m_SVQ.m_strDataSetName; }
void        SetDataSetName(CString strDataSetName)
                { m_SVQ.m_strDataSetName      = strDataSetName; }

CString     GetDataSetConnection()          { return m_SVQ.m_strDataSetConnection; }
void        SetDataSetConnection (CString strDataSetConnection)
                { m_SVQ.m_strDataSetConnection = strDataSetConnection; } void        FileSave()                              ( OnFileSave();    }
void        FileSaveAs()                            ( OnFileSaveAs();  }

// then normal
// =========== void        SetDocumentType(LONG lDocumentType);

void        DeleteDataSetDataTypeArray();
void        DeleteContents();
int         CopyDlgToDoc(CDlgData* pDlgData, BOOL bOverwrite,  BOOL bSetDocumentModified = TRUE);
BOOL        CopyDlgFromDoc(CString &strDlgName, CDlgData* pDlgData);

void        GetMailReplyToInfo(CRecipientData &ReplyTo);

//==========================================================================================
// BEGIN : SURVEY AUTHOR ONLY Methods
//========================================================================================== if SURVEY_AUTHOR

// first In-Line
// =============

WORD        GetDataTypeWordFromString( CString strDatabaseFieldType )
```

```
CString     GetDataTypeStringFromWord( WORD wDatabaseFieldType )
                                                                 ( return SurveyDataTypes.GetDataTypeWordFromString( strDatabaseFieldType ); )
            GetDataTypeStringFromWord( WORD wDatabaseFieldType )
                                                                 ( return SurveyDataTypes.GetDataTypeStringFromWord( wDatabaseFieldType ); )

int         GetNumberOfDataTypes()
                                                                 ( return SurveyDataTypes.GetNumberOfDataTypes(); )

int         GetListType()                       ( return m_nListType; )
void        SetListType(int nListType)          ( m_nListType = nListType; )
WORD        GetPointSize()                      ( return m_SVQ.m_wPointSize; )
void        SetPointSize( WORD New )            ( m_SVQ.m_wPointSize = New; )
CString     GetFontName()                       ( return m_SVQ.m_strFontName; )
void        SetFontName( CString New )          ( m_SVQ.m_strFontName = New; )

// DataBase Options
// ----------------
BOOL        GetFieldLendBaseCompliant()         ( return m_SVQ.m_bFieldLendBaseCompliant; )
void        SetFieldLendBaseCompliant(BOOL bNew) ( m_SVQ.m_bFieldLendBaseCompliant = bNew; )

// Question Box Options
// --------------------
WORD        GetQuestionBoxLeftMargin()          ( return m_wQuestionBoxLeftMargin; )
void        SetQuestionBoxLeftMargin(WORD wNew) ( m_wQuestionBoxLeftMargin = wNew; )
WORD        GetQuestionBoxTopMargin()           ( return m_wQuestionBoxTopMargin; )
void        SetQuestionBoxTopMargin(WORD wNew)  ( m_wQuestionBoxTopMargin = wNew; )
WORD        GetQuestionBoxWidth()               ( return m_wQuestionBoxWidth; )
void        SetQuestionBoxWidth(WORD wNew)      ( m_wQuestionBoxWidth = wNew; )
WORD        GetQuestionBoxHeight()              ( return m_wQuestionBoxHeight; )
void        SetQuestionBoxHeight(WORD wNew)     ( m_wQuestionBoxHeight = wNew; )
WORD        GetQuestionTextWidth()              ( return m_wQuestionTextWidth; )
void        SetQuestionTextWidth(WORD wNew)     ( m_wQuestionTextWidth = wNew; )
WORD        GetQuestionTextHeight()             ( return m_wQuestionTextHeight; )
void        SetQuestionTextHeight(WORD wNew)    ( m_wQuestionTextHeight = wNew; )
WORD        GetQuestionTextLeftMargin()         ( return m_wQuestionTextLeftMargin; )
void        SetQuestionTextLeftMargin(WORD wNew) ( m_wQuestionTextLeftMargin = wNew; )
WORD        GetQuestionTextTopMargin()          ( return m_wQuestionTextTopMargin; )
void        SetQuestionTextTopMargin(WORD wNew) ( m_wQuestionTextTopMargin = wNew; )

WORD        GetItemsLeftMargin()                ( return m_wItemsLeftMargin; )
```

-100-

```
void         SetItemsLeftMargin(WORD wNew)              { m_wItemsLeftMargin = wNew; }

WORD         GetCentreQuestionText()                    { return m_wCentreQuestionText; }
void         SetCentreQuestionText(WORD wNew)           { m_wCentreQuestionText = wNew; }

// Default Values
// --------------

CString      GetNeverSeenValue()                        { return m_strNeverSeenValue; }
void         SetNeverSeenValue(CString New)             { m_strNeverSeenValue = New; }

CString      GetNeverSeenSelection()                    { return m_strNeverSeenSelection; }
void         SetNeverSeenSelection(CString New)         { m_strNeverSeenSelection = New; }

CString      GetOptionChosenValue()                     { return m_strOptionChosenValue; }
void         SetOptionChosenValue(CString New)          { m_strOptionChosenValue = New; }

CString      GetOptionChosenSelection()                 { return m_strOptionChosenSelection; }
void         SetOptionChosenSelection(CString New)      { m_strOptionChosenSelection = New; }

CString      GetCheckBoxTrueValue()                     { return m_strCheckBoxTrueValue; }
void         SetCheckBoxTrueValue(CString New)          { m_strCheckBoxTrueValue = New; }

CString      GetCheckBoxTrueSelection()                 { return m_strCheckBoxTrueSelection; }
void         SetCheckBoxTrueSelection(CString New)      { m_strCheckBoxTrueSelection = New; }

CString      GetCheckBoxFalseValue()                    { return m_strCheckBoxFalseValue; }
void         SetCheckBoxFalseValue(CString New)         { m_strCheckBoxFalseValue = New; }

CString      GetCheckBoxFalseSelection()                { return m_strCheckBoxFalseSelection; }
void         SetCheckBoxFalseSelection(CString New)     { m_strCheckBoxFalseSelection = New; }

CString      GetNumericFieldType()                      { return m_strNumericFieldType; }
void         SetNumericFieldType(CString New)           { m_strNumericFieldType = New; }

CString      GetNumericTypeSelection()                  { return m_strNumericTypeSelection; }
void         SetNumericTypeSelection(CString New)       { m_strNumericTypeSelection = New; }

CString      GetGotoDlgName()                           { return m_strGotoDlgName; }
void         SetGotoDlgName(CString New)                { m_strGotoDlgName = New; }

CString      GetGotoDlgSelection()                      { return m_strGotoDlgSelection; }
void         SetGotoDlgSelection(CString New)           { m_strGotoDlgSelection = New; }

// View Options
// ------------
BOOL         GetDisplayToolBar()                        { return m_bDisplayToolBar; }
void         SetDisplayToolBar(BOOL wNew)               { m_bDisplayToolBar = wNew; }

BOOL         GetDisplayStatusBar()                      { return m_bDisplayStatusBar; }
```

```
void        SetDisplayStatusBar(BOOL wNew)              ( m_bDisplayStatusBar = wNew; )

WORD        GetEditStayOnTop()                          ( return m_wEditStayOnTop; )
void        SetEditStayOnTop(BOOL wNew)                 ( m_wEditStayOnTop = wNew; )

// Properties Dialog Position
// ---------------------------
WORD        GetOptionButtonProperties_Xpos()            ( return m_wOptionButtonProperties_Xpos; )
void        SetOptionButtonProperties_Xpos(WORD wNew)   ( m_wOptionButtonProperties_Xpos = wNew; )
WORD        GetOptionButtonProperties_Ypos()            ( return m_wOptionButtonProperties_Ypos; )
void        SetOptionButtonProperties_Ypos(WORD wNew)   ( m_wOptionButtonProperties_Ypos = wNew; )

WORD        GetCheckBoxProperties_Xpos()                ( return m_wCheckBoxProperties_Xpos; )
void        SetCheckBoxProperties_Xpos(WORD wNew)       ( m_wCheckBoxProperties_Xpos = wNew; )
WORD        GetCheckBoxProperties_Ypos()                ( return m_wCheckBoxProperties_Ypos; )
void        SetCheckBoxProperties_Ypos(WORD wNew)       ( m_wCheckBoxProperties_Ypos = wNew; )

WORD        GetNumericFieldProperties_Xpos()            ( return m_wNumericFieldProperties_Xpos; )
void        SetNumericFieldProperties_Xpos(WORD wNew)   ( m_wNumericFieldProperties_Xpos = wNew; )
WORD        GetNumericFieldProperties_Ypos()            ( return m_wNumericFieldProperties_Ypos; )
void        SetNumericFieldProperties_Ypos(WORD wNew)   ( m_wNumericFieldProperties_Ypos = wNew; )

WORD        GetAlphaNumericProperties_Xpos()            ( return m_wAlphaNumericProperties_Xpos; )
void        SetAlphaNumericProperties_Xpos(WORD wNew)   ( m_wAlphaNumericProperties_Xpos = wNew; )
WORD        GetAlphaNumericProperties_Ypos()            ( return m_wAlphaNumericProperties_Ypos; )
void        SetAlphaNumericProperties_Ypos(WORD wNew)   ( m_wAlphaNumericProperties_Ypos = wNew; )

WORD        GetStaticTextProperties_Xpos()              ( return m_wStaticTextProperties_Xpos; )
void        SetStaticTextProperties_Xpos(WORD wNew)     ( m_wStaticTextProperties_Xpos = wNew; )
WORD        GetStaticTextProperties_Ypos()              ( return m_wStaticTextProperties_Ypos; )
void        SetStaticTextProperties_Ypos(WORD wNew)     ( m_wStaticTextProperties_Ypos = wNew; )

WORD        GetQuestionBoxProperties_Xpos()             ( return m_wQuestionBoxProperties_Xpos; )
void        SetQuestionBoxProperties_Xpos(WORD wNew)    ( m_wQuestionBoxProperties_Xpos = wNew; )
WORD        GetQuestionBoxProperties_Ypos()             ( return m_wQuestionBoxProperties_Ypos; )
void        SetQuestionBoxProperties_Ypos(WORD wNew)    ( m_wQuestionBoxProperties_Ypos = wNew; )

// then normal
// ===========
void        SetFirstDlgName( CString &strDlgName);
void        RetrofitNextGotoDlgName(int nEntrySequenceNumber);
BOOL        DeleteDlg(CString &strDlgName);
int         RenameDlgInDoc(CDlgData* pDlgData);
```

SUBSTITUTE SHEET (Rule 26)

```
        void        GenerateQuestionReferenceName(CString& strWork);
        void        GenerateDatabaseFieldName(CString& strWork, int nPart = 1);

int         GetNextFieldSequenceNum();
        void        SetNextFieldSequenceNum(int nFieldSeqNum);

void        GetNextNameFromEntrySeqNum(int nCurrentEntrySequenceNumber, CString &strDlgName);
        void        GetPreviousNameFromEntrySeqNum(int nCurrentEntrySequenceNumber, CString &strDlgName);
        int         GetPreviousEntrySequenceNumber(int nCurrentEntrySequenceNumber);

void        RetrofitChangedDlgName(CString &strOldDlgName, CString &strNewDlgName);

BOOL        IsDuplicateDatabaseFieldName(CString &strDlgName,
                                                int      nGrpNum,
                                                CString &strDatabaseFieldName);

void        InitAllActiveGrps();

// Display List Stuff Follows:
//
        void        SortDlgsDisplayList();
        void        RemoveFromDlgsDisplayList(CString &strDlgName, BOOL bSortList = TRUE);
        void        AddToDlgsDisplayList(      CString &strDlgName, BOOL bSortList = TRUE);
        void        BuildDlgsDisplayList();
        void        GetOutputLineItems(int       nRow            ,
                                       CString&  strDlgName      ,
                                       CString&  DlgNumber       ,
                                       CString&  DlgDesc         ,
                                       CString&  DBaseFieldName  ,
                                       CString&  NeverSeenValue  ,
                                       CString&  FieldValueResult,
                                       CString&  FieldValueSelected,
                                       CString&  UnCheckedFieldValue,
                                       CString&  GotoDlgName     ,
                                       CString&  GroupDesc       ,
                                       CString&  CtlDesc         ,
                                       int&      nLineType       ,
                                       int&      nFieldNum       ,
                                       int&      nGrpNum         ,
                                       int&      nCtlID          );

int         GetActiveRow();
        int         GetRowCount();
        int         GetCtlIDFromSelectedRow(int nRow);
        void        ChangeSelectionToRow(CView* pView, int nRow);
        void        UpdateAllViewsWithDlgName(CView* pSourceView, CString &strDlgName);
        void        UpdateAllViewsWithRow(CView* pSourceView, UINT nDlgNumber);

int         InitDlgsSelectionList(CListBox *pListBox, CString &CurSelection);
        int         InitDlgsSelectionList(CListBox *pListBox, CString &CurSelection, int nSelectStyle);
```

```
    void       SetDlgsFont();
    void       CreateExitDlg();

void       InitNeverSeenValue(CComboBox *pcbNeverSeenValue,
                                  CString NeverSeenValue);
    void       InitOptionChosenValue(CComboBox *pcbFieldValueSelected,
                                     CString FieldValueSelected,
                                     BOOL bOptionButtonProperties);
    void       InitCheckBoxTrueValue(CComboBox *pcbCheckedFieldValue,
                                     CString CheckedFieldValue);
    void       InitCheckBoxFalseValue(CComboBox *pcbUnCheckedFieldValue,
                                      CString UnCheckedFieldValue);
    void       InitNumericField(CComboBox *pcbNumericFieldType,
                                CString strNumericFieldType);
    void       InitGotoDlgName(CComboBox *pcbGotoDlgName, CString CurrentDlgName,
                               CString GotoDlgName);
    void       InitDatabaseFieldType(CComboBox *pcbDatabaseFieldType,
                                     CString strDatabaseFieldType);

// E-Mail Stuff
//----------
    void       SetMailReplyToInfo(CRecipientData &ReplyTo);

void       DeleteRecipientArray();
    void       AddRecipient(CString strRecipientName, CString strRecipientAddress);
    CRecipients& GetRecipients();    // The Recipients Object - Each element is a "CRecipientData"

// SVQ Save Stuff
//----------
    BOOL       SaveQuestionnaire(const char* pszPathName);

protected:
    virtual BOOL OnNewDocument();

#endif // SURVEY_AUTHOR

//=====================================================================
// END  : SURVEY AUTHOR ONLY Methods
//=====================================================================

//=====================================================================
// BEGIN : SURVEY AUTHOR & SURVEY COLLATOR ONLY Methods
//=====================================================================
if SURVEY_AUTHOR || SURVEY_COLLATOR public:
    // first In-Line
    // =========
```

```
void         SetMailSubjectText(CString New) { m_strMailSubjectText = New; }
void         SetMailNoteText   (CString New) { m_strMailNoteText    = New; }
// then normal
// ==========
CRecipientData*  GetRecipient(int nNum);
int              GetNumOfRecipients();

CDataSetDataType* GetDataSetDataType(int nNum);
int               GetNumOfDataSetDataTypes();

BOOL    IsODBCDataTypeUsed(WORD wODBCDataType, WORD wAutoIncrement);
CString GetODBCTypePart(WORD wSurveyDataType, int nDatabaseFieldLen);

CString BuildCreateStatement(CString &strTableName);
CString BuildInitialRowCreateStatement(CString &strTableName, CString &strMailUserName, CString &strMailUserAddress,
                                       CString &strMailDateSent, CString &strMailDateReceived);

#endif   // end if SURVEY_AUTHOR || SURVEY_COLLATOR
//===========================================================================
// END : SURVEY AUTHOR & SURVEY COLLATOR ONLY Methods
//===========================================================================

// Implementation
public:
    ~CSurveyDoc();
    virtual BOOL SaveModified();
    virtual void Serialize(CArchive& ar);   // overridden for document i/o ifdef _DEBUG
    virtual void AssertValid() const;
    virtual void Dump(CDumpContext& dc) const;
endif protected:
    void InitDocument();

// Override of CDocument
    virtual BOOL OnOpenDocument( const char* pszPathName );

// Generated message map functions
protected:
    //{{AFX_MSG(CSurveyDoc)
    afx_msg void OnFileSave();
    afx_msg void OnFileSaveAs();
    afx_msg void OnFileClose();
    //}}AFX_MSG
    DECLARE_MESSAGE_MAP()
};

#if SURVEY_AUTHOR || SURVEY_COLLATOR
```

```
BOOL GetResponseInfoFromResponseFile(CString &strMailDocFileName, CString &strSurveyName, CString &strDataSetName,
                                     CString &strDataSetConnection, BOOL &bUpdate, BOOL &bRetainAfterReply);
BOOL BuildUpdateStatementFromFile(CString &strMailDocFileName, CString &strMailUserName, CString &strMailUserAddress,
                                  CString &strMailReceivedDate, CString &strUpdateStatement);
BOOL BuildInsertStatementFromFile(CString &strMailDocFileName, CString &strMailUserName, CString &strMailUserAddress,
                                  CString &strMailDateReceived, CString &strInsertStatement);
void DataSetError(HENV hEnv, HDBC hDBC, HSTMT hStmt, CString &strFunction, CString &strRoutine, CString &strStateCode);

#endif   // end if SURVEY_AUTHOR || SURVEY_COLLATOR

//////////////////////////////////////////////////////////////
//////////////////////////////////////////////////////////////
//////////////////////////////////////////////////////////////
// class CResponseGrpData DEFINITION
//
class CResponseGrpData : public CObject
{
// Constructors / Destructor
//  ----------------------
public:
    CResponseGrpData(DWORD       lGrpType);

virtual        ~CResponseGrpData();           // destructor

// Serialization
//  ----------------------
protected:
    CResponseGrpData();                            // create from serialization only
    DECLARE_SERIAL(CResponseGrpData)               // create from serialization only // Attributes
//  ----------------------
protected:
    DWORD          m_lGrpType;                     // Specifies Group Type - Option, Check, Numeric or Text, etc
    BYTE           m_bGrpNumOfCtls;                // Number of controls in the Group CString        m_DatabaseFieldName;            // Database Field Name for this (control) / (group of controls)
    WORD           m_wDatabaseFieldType;           // Database Field DataType - Survey's Data Type - Not ODBC Type
    WORD           m_wDatabaseFieldLen;            // Database Field Length - Used only for 'Text' fields
    CString        m_FieldValueResult;             // Final Value for dbfield when selections have been made // Operations
//  ----------------------
public:
```

```
CResponseGrpData&   CResponseGrpData::operator=(const CResponseGrpData& Src);   // Assignment Operator
CResponseGrpData&   CResponseGrpData::operator=(const CDlgGrpData& Src);        // Special Assignment Operator DWORD       GetGrpType()              ( return m_lGrpType;
CString     GetFieldValueResult()     ( return m_FieldValueResult;
CString     GetDatabaseFieldName()    ( return m_DatabaseFieldName;
WORD        GetDatabaseFieldType()    ( return m_wDatabaseFieldType;
WORD        GetDatabaseFieldLen()     ( return m_wDatabaseFieldLen;

void    SetFieldValueResult(CString FieldValueResult)      ( m_FieldValueResult   = FieldValueResult;
void    SetDatabaseFieldName(CString DatabaseFieldName)    ( m_DatabaseFieldName  = DatabaseFieldName;
void    SetDatabaseFieldType(WORD wDatabaseFieldType)      ( m_wDatabaseFieldType = wDatabaseFieldType;
void    SetDatabaseFieldLen(WORD wDatabaseFieldLen)        ( m_wDatabaseFieldLen  = wDatabaseFieldLen;

// Implementation
// ----------
public:
    virtual void    Serialize(CArchive& ar);    // overridden for document i/o ifdef _DEBUG
public:
    virtual void    AssertValid() const;
    virtual void    Dump(CDumpContext& dc) const;
#endif
);
///////////////////////////////////////////////////////////////
///////////////////////////////////////////////////////////////
///////////////////////////////////////////////////////////////
// class CResponseDlgData DEFINITION
// ----------
class CResponseDlgData : public CDialog
(
// Constructors / Destructor
// ----------
public:
    virtual         CResponseDlgData(CString RefName);    // Dlg Name Constructor
                    ~CResponseDlgData();                   // destructor // Serialization
// ----------
protected:
    CResponseDlgData();                         // create from serialization only
                                                // create from serialization only
    DECLARE_SERIAL(CResponseDlgData)

// Attributes
```

```
//-----------
protected:
    WORD        m_wNumOfGrps;           // Number of Active Grps in the dlg box
    CString     m_RefName;              // user's reference name - typically the same as m_Caption CString     m_PrevName;             // Records where user came from
    CString     m_NextName;             // Records where user went to
    CObArray    m_GrpArray;             // Each element is a "CResponseGrpData"

// Operations
//-----------
public:
    CResponseDlgData&   operator=(const CResponseDlgData& Src);     // Assignment Operator
    CResponseDlgData&   operator=(const CDlgData& Src);             // Special Assignment Operator CString     GetPrevName()                   { return m_PrevName; }
    void        SetPrevName(CString New)        { m_PrevName = New; }
    CString     GetNextName()                   { return m_NextName; }
    void        SetNextName(CString New)        { m_NextName = New; } int         GetNumOfGrps()
    int         GetNumOfActiveGrps(DWORD lWantedGrpType);
    int         GetGrpNumber(CResponseGrpData* pGrpData);

CResponseGrpData*   GetGrpFromGrpNum(int nWantedGrpNum);

// Implementation
//---------------
public:
    virtual void Serialize(CArchive& ar);       // overridden for document I/O ifdef _DEBUG
public:
    virtual void AssertValid() const;
    virtual void Dump(CDumpContext& dc) const;
endif
};

/////////////////////////////////////////////////////////////
/////////////////////////////////////////////////////////////
// class CResponseDoc DEFINITION
//----------------------------------------------------------- class CResponseDoc : public CObject
{
    friend class CQuestionnaire;                // Declare CQuestionnaires a friend
```

```
// Serialization
// -------------
public:
    CResponseDoc();                            // create for serialization only
    DECLARE_SERIAL(CResponseDoc)               // create for serialization only // Attributes
// ----------
protected:

// The Document Reference Name
    // ---------------------------
    CString    m_strSurveyMasterPathName;     // Name of this survey - long name for document // The Document Flags & Options
    // ----------------------------
    BOOL       m_bFlagPrePopulate;            // Pre-Populate Database - 'Update' instead of 'Insert'
    BOOL       m_bFlagRetainAfterReply;       // Keep for later use - effects DB index to include date received CMapStringToOb m_ResponseMap;             // Each element is a "CResponseDlgData"

WORD       m_wNumOfDlgs;                  // Number of Dlgs in the survey

// The DSN Info Follows
    // --------------------
    CString    m_strTableName;                // Name of this survey's Table within the Data Set
    CString    m_strDataSetName;              // Name of this survey's Data Set
    CString    m_strDataSetConnection;        // Completed Connection String for this Data Set
    CObArray   m_DataSetDataTypeArray;        // Each element is a "CDataSetDataType"

// DataBase Options
    // ----------------
    WORD       m_bFieldLendBaseCompliant;

// The Following Data Members are not serialized
    // ---------------------------------------------
    CResponseDlgData *  m_pSelectedResponseDlg;   // ptr to currently selected ResponseDlg
    CSurveyDataTypes    m_SurveyDataTypes;

// Operations
// ---------- protected:
    BOOL       GetSelectedResponseDlg(CString &DlgName, CResponseDlgData*& pResponseDlgData);
    POSITION   GetFirstResponseDlgPos();
    void       GetNextResponseDlg(POSITION& pos, CResponseDlgData*& pResponseDlgData);

public:
    // first In-Line
    // =============
```

-109-

```
CString    GetSurveyMasterPathName()         { return m_strSurveyMasterPathName; }
void       SetSurveyMasterPathName(CString strSurveyMasterPathName)
                                             { m_strSurveyMasterPathName = strSurveyMasterPathName; }

BOOL       GetFlagPrePopulate()              { return m_bFlagPrePopulate; }
BOOL       GetFlagRetainAfterReply()         { return m_bFlagRetainAfterReply; } void       SetFlagPrePopulate      (BOOL bNew) { m_bFlagPrePopulate     = bNew; }
void       SetFlagRetainAfterReply(BOOL bNew) { m_bFlagRetainAfterReply = bNew; }

WORD       GetNumOfDlgs()                    { return m_wNumOfDlgs; }

CString    GetTableName()                    { return m_strTableName; }
void       SetTableName(CString strTableName)
                                             { m_strTableName = strTableName; }

CString    GetDataSetName()                  { return m_strDataSetName; }
void       SetDataSetName(CString strDataSetName)
                                             { m_strDataSetName = strDataSetName; }

CString    GetDataSetConnection()            { return m_strDataSetConnection; }
void       SetDataSetConnection(CString strDataSetConnection)
                                             { m_strDataSetConnection = strDataSetConnection; }

// then normal
// =========== void       DeleteContents();
int        CopyDlgToDoc(CDlgData* pDlgdata);                // Special Copies 'Full' Dlg to SVR //======================================================================
// BEGIN : SURVEY AUTHOR and COLLATOR ONLY Methods
//====================================================================== if SURVEY_AUTHOR || SURVEY_COLLATOR

// first In-Line
// =============

WORD       GetDataTypeWordFromString( CString strDatabaseFieldType )
                                             { return m_SurveyDataTypes.GetDataTypeWordFromString( strDatabaseFieldType ); }

CString    GetDataTypeStringFromWord( WORD wDatabaseFieldType )
                                             { return m_SurveyDataTypes.GetDataTypeStringFromWord( wDatabaseFieldType ); } int        GetNumberOfDataTypes()
                                             { return m_SurveyDataTypes.GetNumberOfDataTypes(); }

// DataBase Options
// ----------------
BOOL       GetFieldLendBaseCompliant()       { return m_bFieldLendBaseCompliant; }
```

SUBSTITUTE SHEET (Rule 26)

-110-

```
void        SetFieldLendBaseCompliant(BOOL bNew)        ( m_bFieldLendBaseCompliant = bNew; )

// then normal
//==========

// SVR Save Stuff
//---------------
BOOL        SaveResponse(const char* pszPathName);

// ODBC DataTypes Stuff
//---------------------
void        AddDataSetDataType(CDataSetDataType*& pDataSetDataType);

#endif // if SURVEY_AUTHOR || SURVEY_COLLATOR

//==============================================================================
// END : SURVEY AUTHOR and COLLATOR ONLY Methods
//==============================================================================

//==============================================================================
// START : SURVEY-RESPONSE ONLY Code
//==============================================================================
if SURVEY_USER void        BuildSurveyResponseFile(CString &strMailDocFileName);

endif // if SURVEY_USER
//==============================================================================
// END : SURVEY-RESPONSE ONLY Code
//============================================================================== void        DeleteDataSetDataTypeArray();

// Implementation
public:
            ~CResponseDoc();
    virtual void    Serialize(CArchive& ar);    // overridden for document i/o ifdef _DEBUG
    virtual void    AssertValid() const;
    virtual void    Dump(CDumpContext& dc) const;
#endif
);

#if SURVEY_AUTHOR || SURVEY_COLLATOR
BOOL GetResponseInfoFromResponseFile(CString &strMailDocFileName, CString &strSurveyName, CString &strDataSetName,
                                      CString &strDataSetConnection, BOOL &bUpdate, BOOL &bRetainAfterReply);
BOOL BuildUpdateStatementFromFile(CString &strMailDocFileName, CString &strMailUserName, CString &strMailUserAddress,
```

-111-

```
                           CString &strMailReceivedDate, CString &strUpdateStatement);
BOOL BuildInsertStatementFromFile(CString &strMailDocFileName, CString &strMailUserName, CString &strMailUserAddress,
                           CString &strMailDateReceived, CString &strInsertStatement);
void DataSetError(HENV hEnv, HDBC hDbc, HSTMT hStmt, CString &strFunction, CString &strRoutine, CString &strStateCode);

#endif    // end if SURVEY_AUTHOR || SURVEY_COLLATOR
//////////////////////////////////////////////////////
//////////////////////////////////////////////////////
//////////////////////////////////////////////////////
```

We claim:

1. A system for obtaining and collating survey information from a plurality of computer users, said system comprising a processing apparatus including an input means via which a survey author may input data, and a survey authoring means enabling construction of a survey questionnaire document for each of a plurality of associated surveys, each survey questionnaire document including at least one question, for the respective associated survey, formulated in response to data input by a survey author;

transmission means for transmitting the survey questionnaire document for each survey to a plurality of respondents for each survey; and the processing apparatus including a collation means arranged to receive transmissions from the transmission means, to identify a response document responsive to a survey questionnaire document, which include responses to the at least one question from the plurality of respondents, and to process the response document for at least one of updating records and adding records to a database associated with the survey for the particular survey document, in accordance with the responses.

2. A system in accordance with claim 1, wherein the survey authoring means is arranged to construct a database for receiving database field values in response to the at least one question.

3. A system in accordance with claim 2, wherein each field in the database is identified by a "column" label associated with the at least one question and a "row" label associated with the identity of the respondent who is providing the response which is used to load the particular field.

4. A system in accordance with claim 3, wherein the collating means is arranged to add the "row" labels in response to the processing of received responses.

5. A system in accordance with claim 3, wherein the survey authoring means is arranged to construct the database including the "row" label in response to data input by the survey author.

6. A system in accordance with claim 3, wherein the survey authoring means is arranged to enable preparation of a survey questionnaire document which specifies a plurality of allowable answers to the at least one question so that respondents receiving the survey questionnaire document may select at least one of the allowable answers as a response.

7. A system in accordance with claim 6, wherein the survey authoring means is arranged to enable construction of a survey questionnaire document wherein, for a question, the plurality of allowable answers are specified by an option button grid, having rows and columns providing a matrix of cells for selection.

8. A system in accordance with claim 7, the option buttons grid having title heads for each row and column in the matrix, and wherein a database field value to be entered in the appropriate database field if the associated allowable answer is specified, is designated from components of the row and column head for the particular grid cell.

9. A system in accordance with claim 6, wherein the survey authoring means is arranged to enable construction of a survey questionnaire document wherein for a question, the plurality of allowable answers are specified by at least one of a check box grid and numeric field grid, having rows and columns providing a matrix of cells for receiving the allowable answers.

10. A system in accordance with claim 9, wherein the grids have row and column heads and wherein the survey authoring means is arranged to construct the database with a separate column label for each allowable answer available in at least one of the check box grid and numeric field grid, and the column labels are derived from components of row and column heads.

11. A system in accordance with claim 6, wherein the survey authoring means enables construction of a survey questionnaire document wherein, for a question, the allowable answers are specified by a mixture of at least two of a numeric field grid, option button, grid, check box grid, text field and numeric field.

12. A system in accordance with claim 6, wherein the survey authoring means enables construction of a survey questionnaire document wherein, for a question, the allowable answers are specified by at least one of a checked box, a plurality of checked boxes, an option button, and a plurality of option buttons.

13. A system in accordance with claim 3, wherein the survey authoring means is arranged to enable construction of a survey questionnaire document wherein, for a question, an allowable answer is in the form of at least one of a text and a numeric format to be input by the respondent.

14. A system in accordance with claim 13, wherein the survey authoring means enables the survey author to specify an allowable field length for the text or numeric answer.

15. A system in accordance with claim 3, wherein the survey authoring means enables construction of the survey questionnaire document so that if a question is not asked of a respondent a "never seen" value is included as the database field value in the database field for that question for that respondent.

16. A system in accordance with claim 3, wherein the survey authoring means enables the survey author to determine the column label for a particular question on the basis of data input by the survey author.

17. A system in accordance with claim 2, wherein the response document includes a data base construction means which is used to construct the database from information contained in the survey response document and obtained from the survey questionnaire document.

18. A system in accordance with claim 1, wherein the survey authoring means enables construction of a survey document containing a plurality of questions.

19. A system in accordance with claim 18, the survey authoring means enabling the construction of a survey questionnaire document structure in which at least one of the plurality of questions is linked, so that a determination of whether to ask additional questions of a respondent is dependent on responses provided by the respondent to previously asked questions.

20. A system in accordance with claim 18, the survey authoring means including a branch control means which enables construction of the linked survey questionnaire document structure on the basis of data input by the survey author, the branch control means including branch control operator commands selectable by the survey author to govern the linked structure.

21. A system in accordance with claim 1, wherein the survey authoring means is arranged to provide a respondent control means for transmission with the survey questionnaire document the respondent control means being arranged to control a respondent users computer to process the survey questionnaire document.

22. A system in accordance with claim 1, further comprising a respondent processing means including a respondent control means arranged to control the respondent processing means to process the survey questionnaire document.

23. A system in accordance with claim 1, wherein the processing of the survey questionnaire document on the respondent's computer is arranged to result in production of the response document including responses formulated from data input by the respondent, and further includes an identifier which identifies which survey questionnaire document the response document was produced from.

24. A system in accordance with claim 23, wherein the processing is arranged to automatically transmit the response document to the collating means.

25. A system in accordance with claim 1, wherein the transmission means is electronic mail, and the survey questionnaire document is transmitted to an electronic mail address.

26. A system in accordance with claim 25, wherein the electronic mail address may be at least one of a bulletin board address and an electronic mail address of at least one of individuals, groups and respondents to previous survey questionnaire documents.

27. A system in accordance with claim 26, wherein the processing results in a response document which includes the address of the collation means is attached to a mail message which includes the address of the collation means.

28. A system in accordance with claim 25, wherein the survey authoring means is arranged to construct the survey questionnaire document to include the electronic mail address of the collation means.

29. A system in accordance with claim 25, wherein the collation means is arranged to scan all electronic mail received at the processing apparatus, for response documents, to identify the response documents and to identify and locate the database for the particular survey questionnaire and to load the database.

30. A system in accordance with claim 29, wherein the collation means is arranged to identify electronic mail addresses of respondent users from response documents and messages accompanying response mail, and to load the database with the electronic mail addresses.

31. A system in accordance with claim 1, further including a scan test means arranged to scan a survey document to test for errors in the construction of the survey document, and to notify the survey author of any errors.

32. A method for obtaining and collating survey information from a plurality of computer users, comprising the steps of operating a processing apparatus including an input means via which a survey author may input data, and a survey authoring means enabling construction of a survey questionnaire document for each of a plurality of associated surveys, in order to produce a survey document including at least one question for a respective associated survey;

transmitting the survey document to a plurality of computer users;

operating the processing apparatus which includes a collation means arranged to receive transmissions, to identify a response document responsive to the survey questionnaire document, which includes responses to the at least one question from a plurality of respondents, to process the response document for at least one of updating records and adding records to a database associated with the survey for the particular survey document, in accordance with the responses.

33. A method in accordance with claim 32 further comprising the step of operating the processing apparatus to automatically construct the database including a field for receiving responses to the at least one question.

34. A method in accordance with claim 33, wherein the step of constructing the database includes the step of identifying each field in the database by a "column" label associated with the at least one question and a "row" label associated with the identity of the respondent providing the response used to load the particular field.

35. A method in accordance with claim 34, wherein the step of constructing the survey questionnaire document includes the step of specifying a plurality of allowable answers to the at least one question, so that respondents receiving the survey document may select at least one of the allowable answers as a response.

36. A method in accordance with claim 35, wherein the step of constructing the survey questionnaire document includes, for a question, the step of specifying the plurality of allowable answers by an option buttons grid, having rows and columns providing a matrix of cells for selection.

37. A method in accordance with claim 36, the step of specifying the option buttons grid including specifying title heads for each row and column in the matrix, and the step of designating the database field value to be entered in the appropriate database field if the associated allowable answer is specified, involves formulating the database field value from components of the row and column head for the particular grid cell.

38. A method in accordance with claim 35, wherein the step of specifying a plurality of allowable answers for a question includes specifying at least one of a check box grid and a numeric field grid, having rows and columns providing a matrix of cells for selecting the allowable answers.

39. A method in accordance with claim 38, wherein the step of specifying at least one of a numeric field grid and check box grid includes the step of specifying row and column heads, and wherein the step of constructing the database with a separate column label for each allowable answer available in at least one of the check box grid and numeric field grid, and deriving the column labels from components of row and column heads.

40. A method in accordance with claim 35, wherein the step of constructing the survey questionnaire document involves specifying an allowable answer in the form of at least one of a text and a numeric answer to be input by the respondent, and the further step of specifying an allowable field length for the answer.

41. A method in accordance with claim 35, wherein the construction of a survey questionnaire document includes the step of including a command in the survey document that if a question is not asked of a responding user, then, on collation, a "never seen" value will be included in the database field for that question for that respondent user.

42. A method in accordance with claim 32, the step of constructing the survey questionnaire document including constructing it to contain a plurality of questions.

43. A method in accordance with claim 42, wherein the step of constructing the survey questionnaire document including linking the plurality of questions to each other so that whether more than one question is asked of the respondent is dependent on responses by the respondent to previously asked questions and is also dependent on whether at least one question is asked of a respondent.

44. A method in accordance with claim 43, wherein the step of linking a plurality of questions includes providing branching control commands with the survey questionnaire document, the branching control commands governing the linked structure and being selectable by the survey author.

45. A method in accordance with claim 44, wherein the step of constructing the survey questionnaire document involves specifying, for a question, the allowable answers as a combination of at least two of a numeric field grid, option buttons grid, check box grid, and text field.

46. A method in accordance with claim 32, wherein the step of constructing the survey document includes providing a respondent control means for transmission with the survey questionnaire document the respondent control means being arranged to control a respondent users computer to process the survey questionnaire document.

47. A method in accordance with claim 46, wherein the step of controlling the respondent's terminal includes processing of the survey questionnaire document to produce a response document including a response formulated from data input by the respondent user, and an identifier which identifies which survey questionnaire document the response document was produced from.

48. A method in accordance with claim 32, further comprising the step of controlling a respondent users computer to process the survey questionnaire document.

49. A method in accordance with claim 48, including the step of automatically transmitting the response document to a location where the document will be collated, on completion of the processing to produce the response document.

50. A method in accordance with claim 32, wherein the step of processing the survey questionnaire document includes providing a response document with a database construction means which enables a database to be constructed on collation.

51. A method in accordance with claim 32, wherein transmissions of the survey document and response document are by electronic mail.

52. A method in accordance with claim 51, wherein the electronic mail address may be at least one of a bulletin board address and an electronic mail address of at least one of individuals and groups.

53. A method in accordance with claim 52, wherein the step of constructing the survey questionnaire document includes constructing the document to include the electronic mail address of the processing means which will carry out collation.

54. A method in accordance with claim 51, wherein the step of collating includes scanning all electronic mail received at the collation means address for response documents, to identify and locate the database for the survey and to load the database in accordance with the response.

55. A method in accordance with claim 54, wherein the step of collating includes controlling the collating processing means to identify electronic mail addresses of respondent users from response documents or attached messages and to load the database with the electronic mail addresses.

56. A method in accordance with claim 32, wherein the step of collating includes controlling the collating processing means to identify electronic mail addresses of respondents from response documents or attached messages and to load the database with the electronic mail addresses.

* * * * *